United States Patent [19]
Parente et al.

[11] Patent Number: 5,763,761
[45] Date of Patent: Jun. 9, 1998

[54] BALL STRIKING APPARATUS

[75] Inventors: Eugene R. Parente, 835 Sutter St., San Diego, Calif. 92103; Sean J. Dynes, Carlsbad, Calif.

[73] Assignee: Eugene R. Parente, San Diego, Calif.

[21] Appl. No.: 605,734

[22] Filed: Feb. 22, 1996

[51] Int. Cl.$^6$ ................................................. G01M 7/00
[52] U.S. Cl. .................. 73/12.14; 73/12.02; 73/12.09; 473/453
[58] Field of Search .................. 73/12.01, 12.02, 73/12.05, 12.07, 12.09, 12.11, 12.14; 473/257–261, 422, 451, 453

[56] References Cited

U.S. PATENT DOCUMENTS

| | | | |
|---|---|---|---|
| 1,703,507 | 2/1929 | Barnhart . | |
| 2,058,201 | 10/1936 | Young | 73/12.02 |
| 2,780,098 | 2/1957 | Maroth | 473/233 X |
| 3,373,612 | 3/1968 | Thompson et al. | 473/258 X |
| 3,444,729 | 5/1969 | Shobert . | |
| 3,855,842 | 12/1974 | Imabori et al. | 73/12.02 X |
| 4,062,222 | 12/1977 | Solheim | 73/13 |
| 4,996,867 | 3/1991 | Miyamae | 73/13 |
| 5,156,402 | 10/1992 | Hart | 473/453 X |
| 5,390,534 | 2/1995 | Feeney | 73/12.14 X |
| 5,390,915 | 2/1995 | Levantino | 473/453 |
| 5,589,628 | 12/1996 | Braly | 73/12.02 |

FOREIGN PATENT DOCUMENTS 03220049  9/1929  United Kingdom .

*Primary Examiner*—Elizabeth L. Dougherty
*Attorney, Agent, or Firm*—Gray, Cary, Ware & Freidenrich

[57] ABSTRACT

Generally, the invention can be used to strike an object with an implement. Two applications for which the invention is particularly useful are hitting a golf ball with a golf club, and hitting a baseball or softball with a baseball bat. The invention can be used to, for instance, test an implement (e.g., golf club or baseball bat) used to strike an object (e.g., golf ball or baseball), either to verify acceptable performance of the implement, or to provide information regarding the performance of the implement to assist in the further design of the implement. The invention can also be used to test the object (e.g., golf ball or baseball) being struck. Additionally, when the invention is used to hit a baseball or softball, the invention can be used to hit balls to enable one or more players to engage in fielding practice. An apparatus of the invention includes a frame, an arm rotatably mounted to the frame, and a drive mechanism adapted to rotate the arm, such that when the arm is rotated, an implement held by the arm strikes an object. The apparatus of the invention further includes one or more of several novel features that enable the apparatus to swing the arm in a desired fashion.

49 Claims, 31 Drawing Sheets

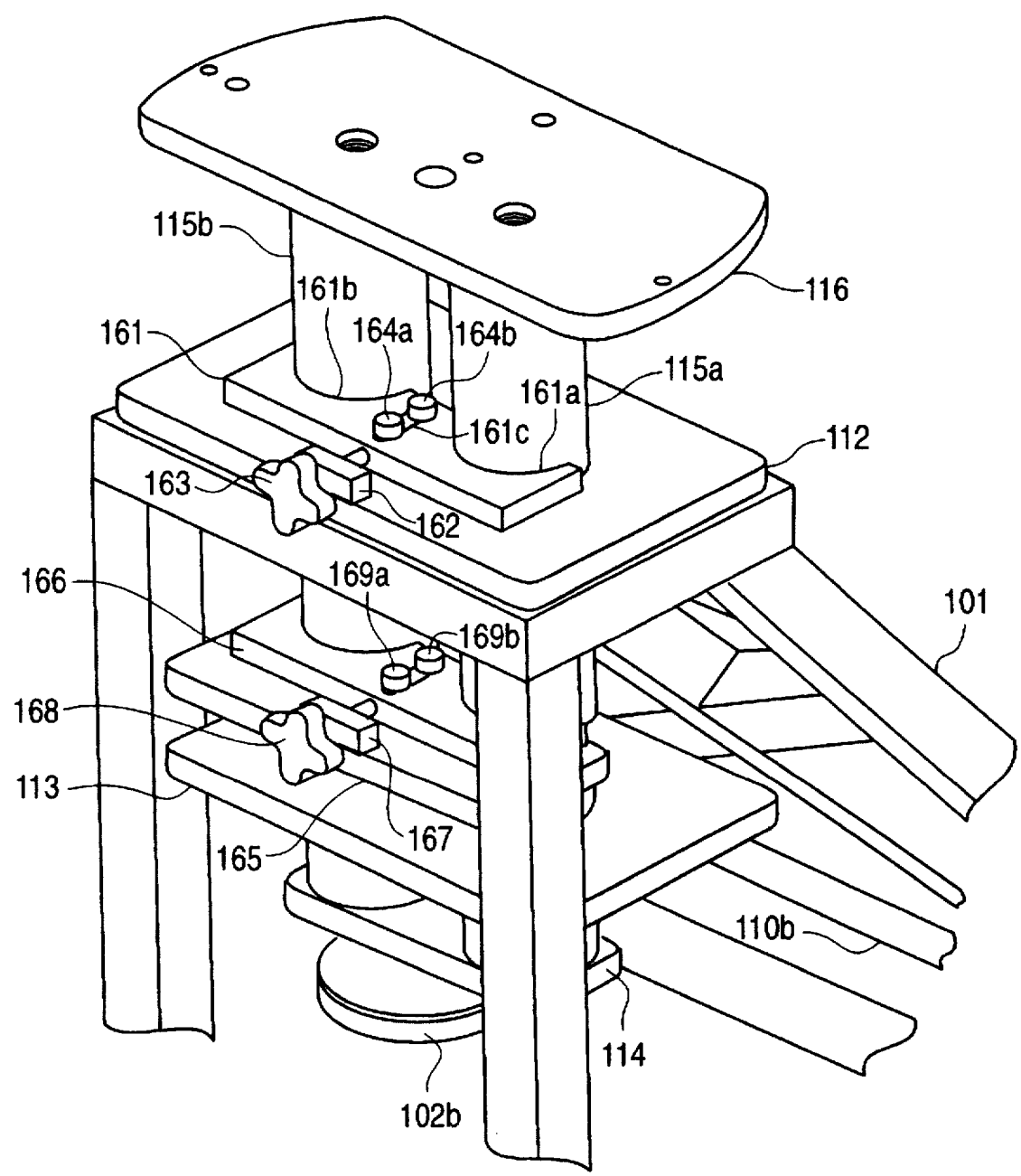

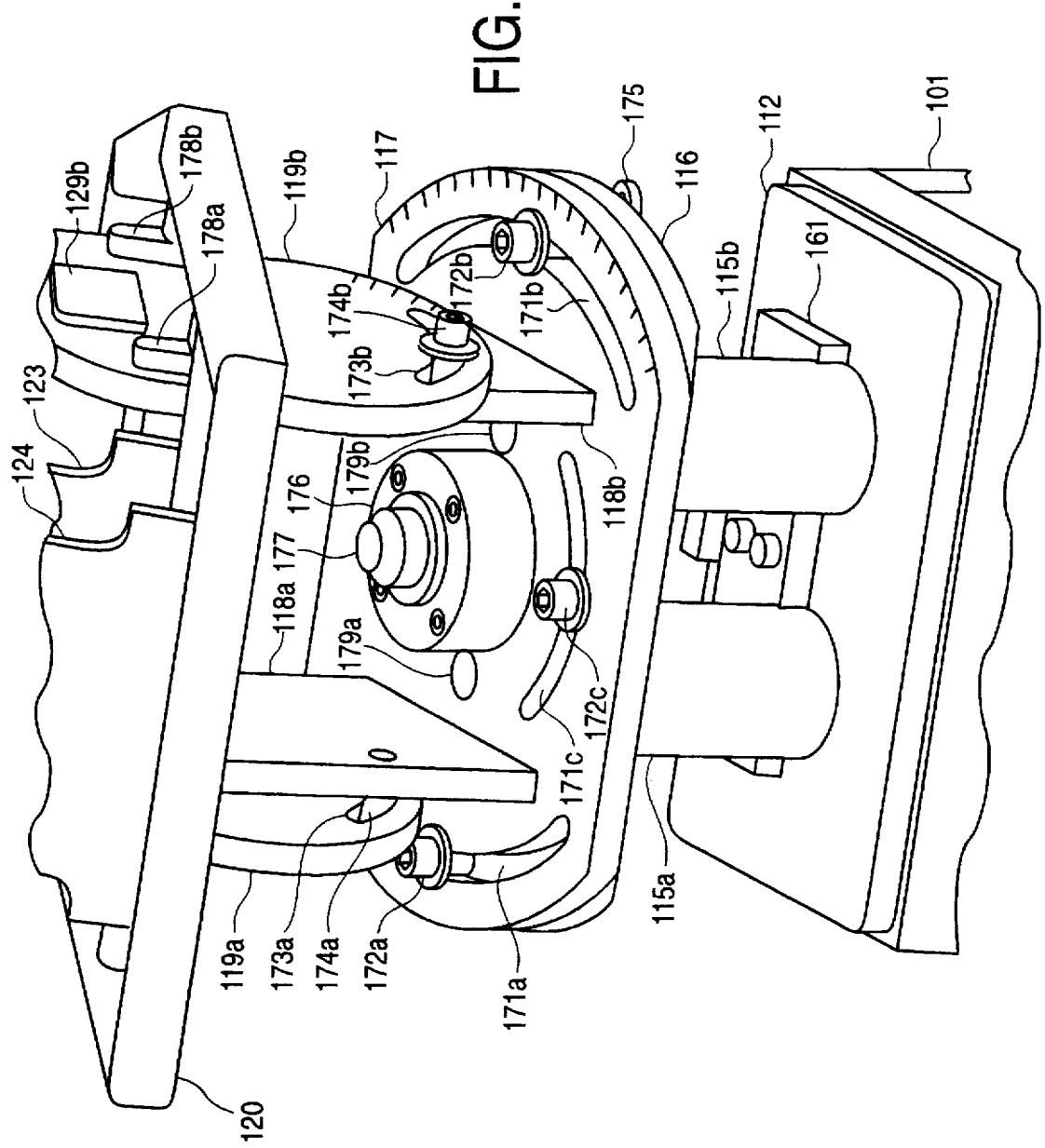

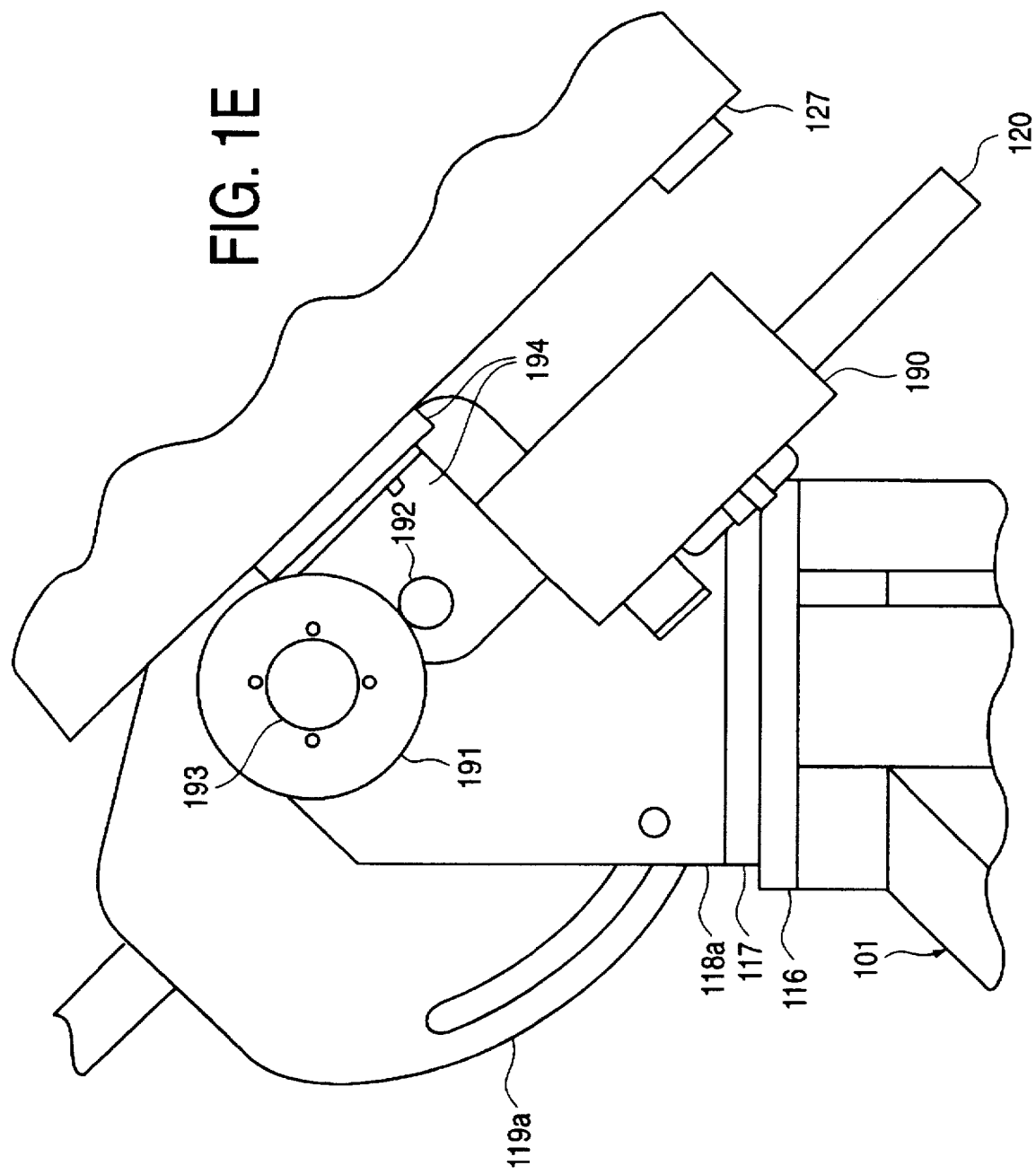

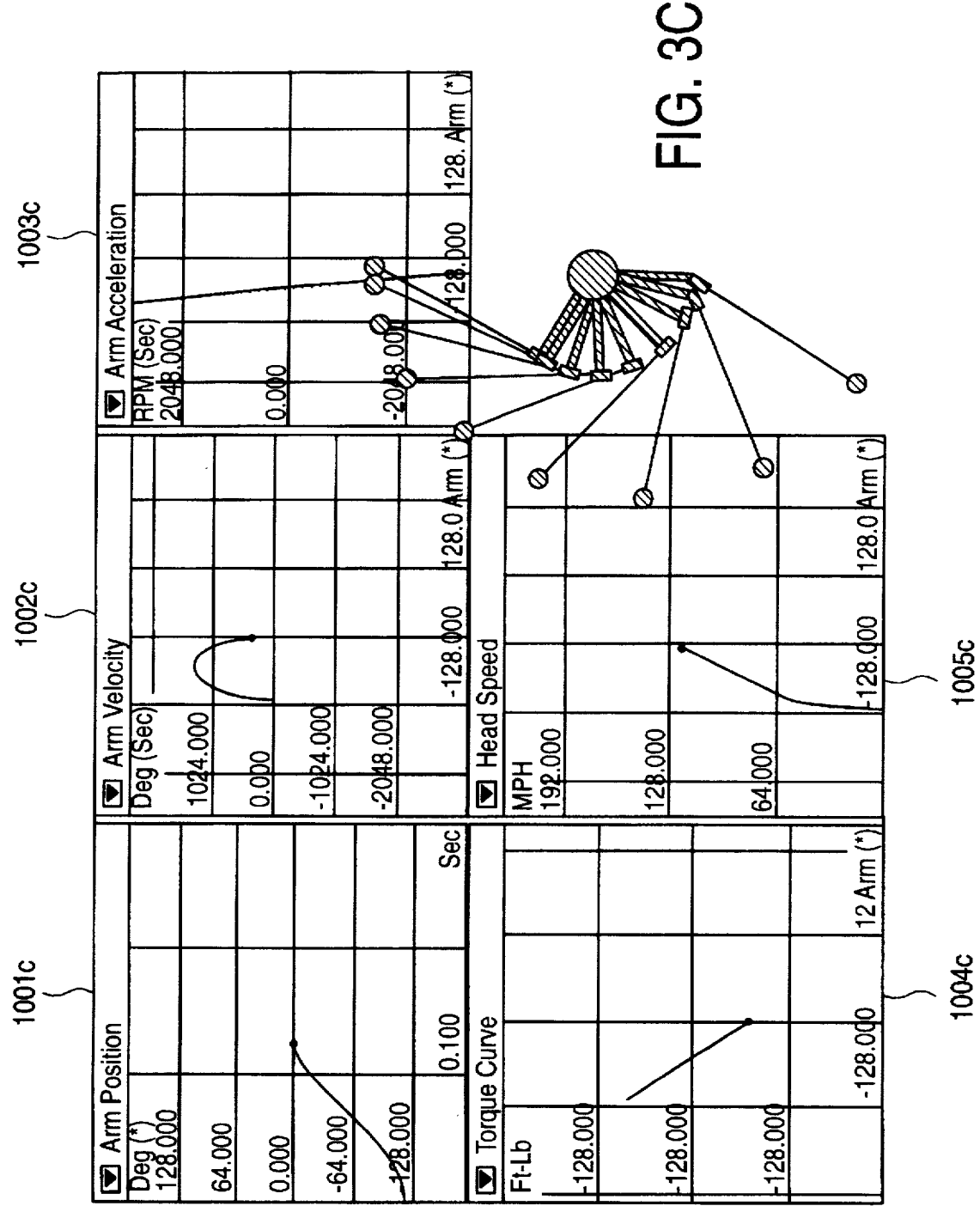

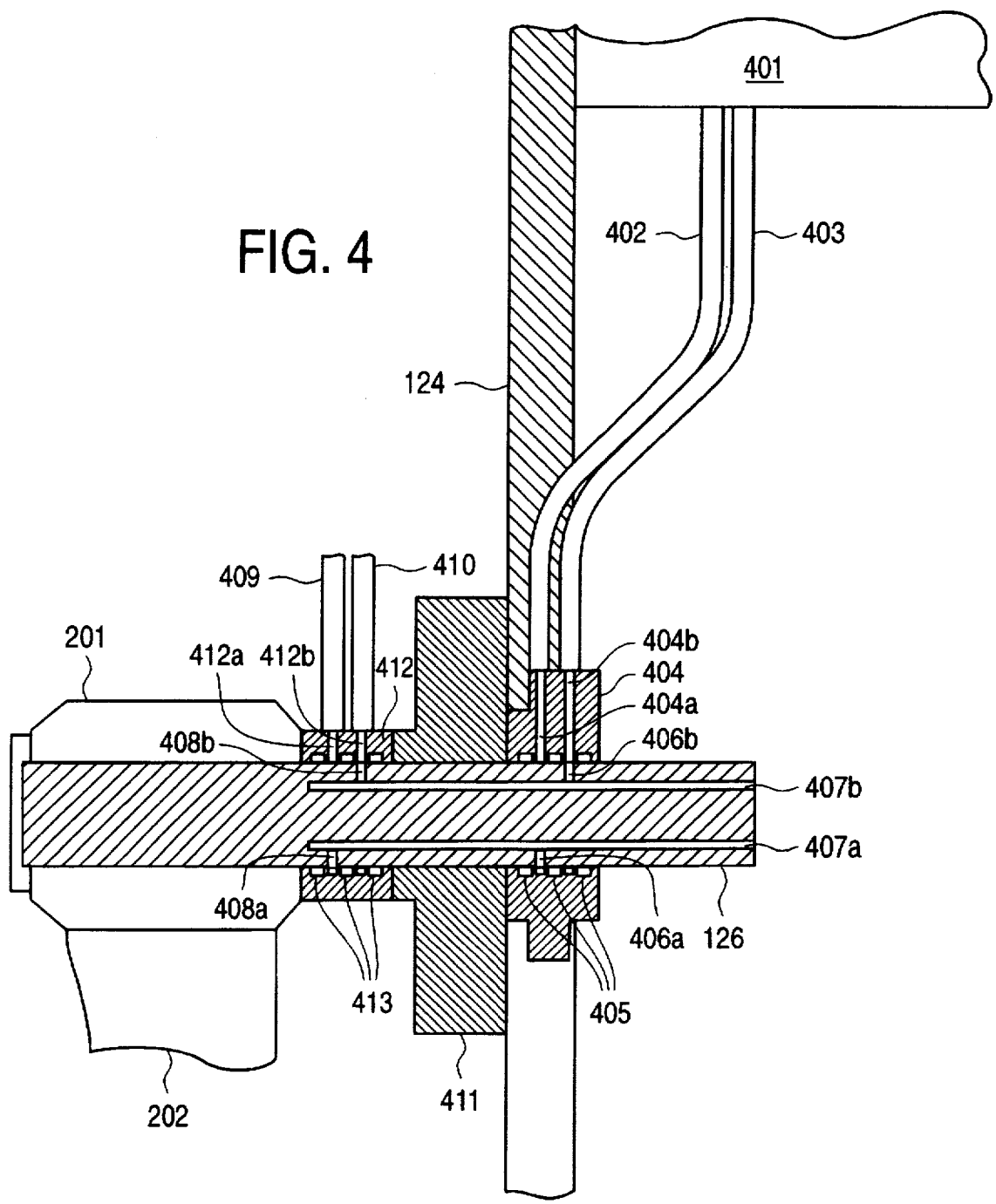

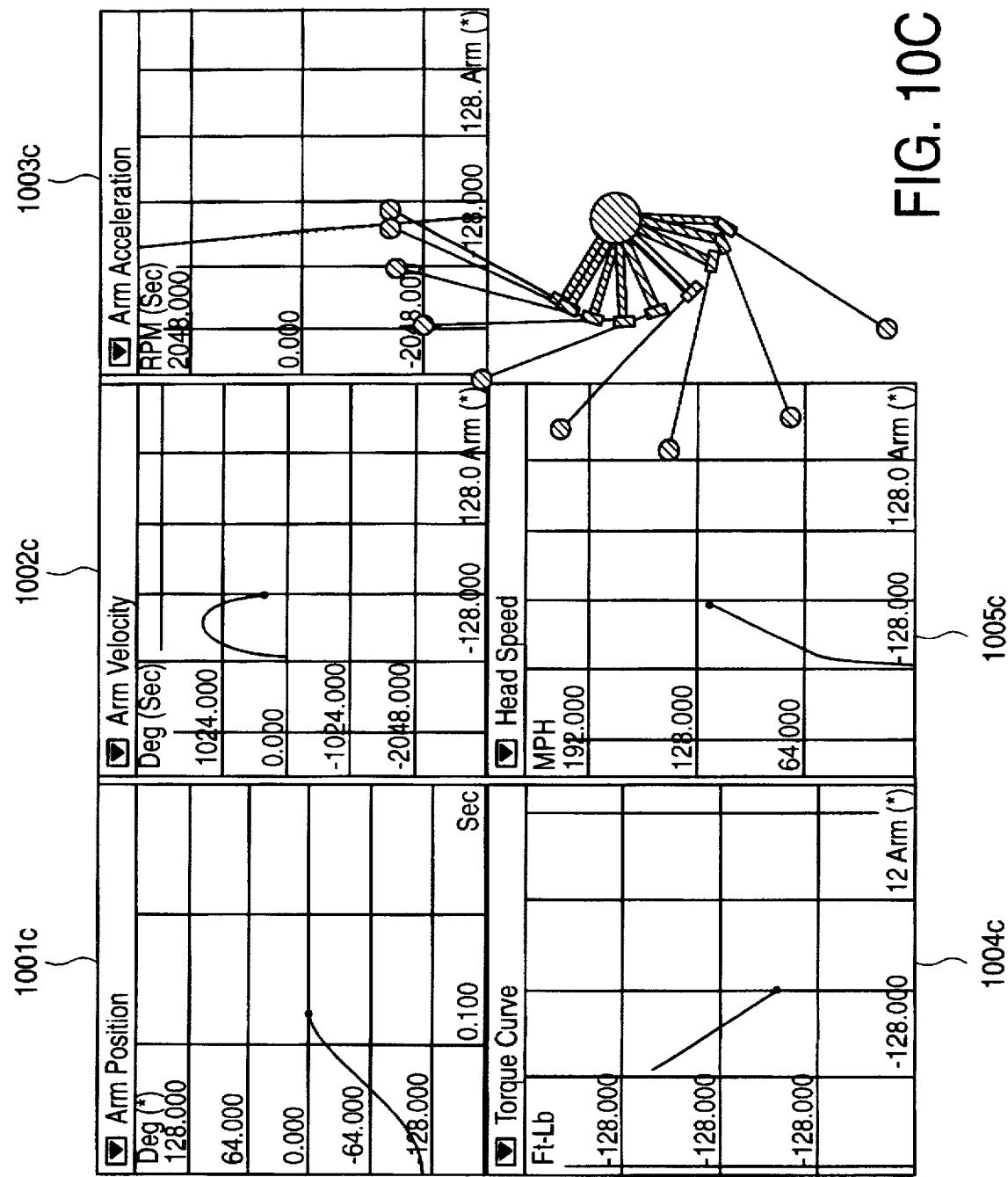

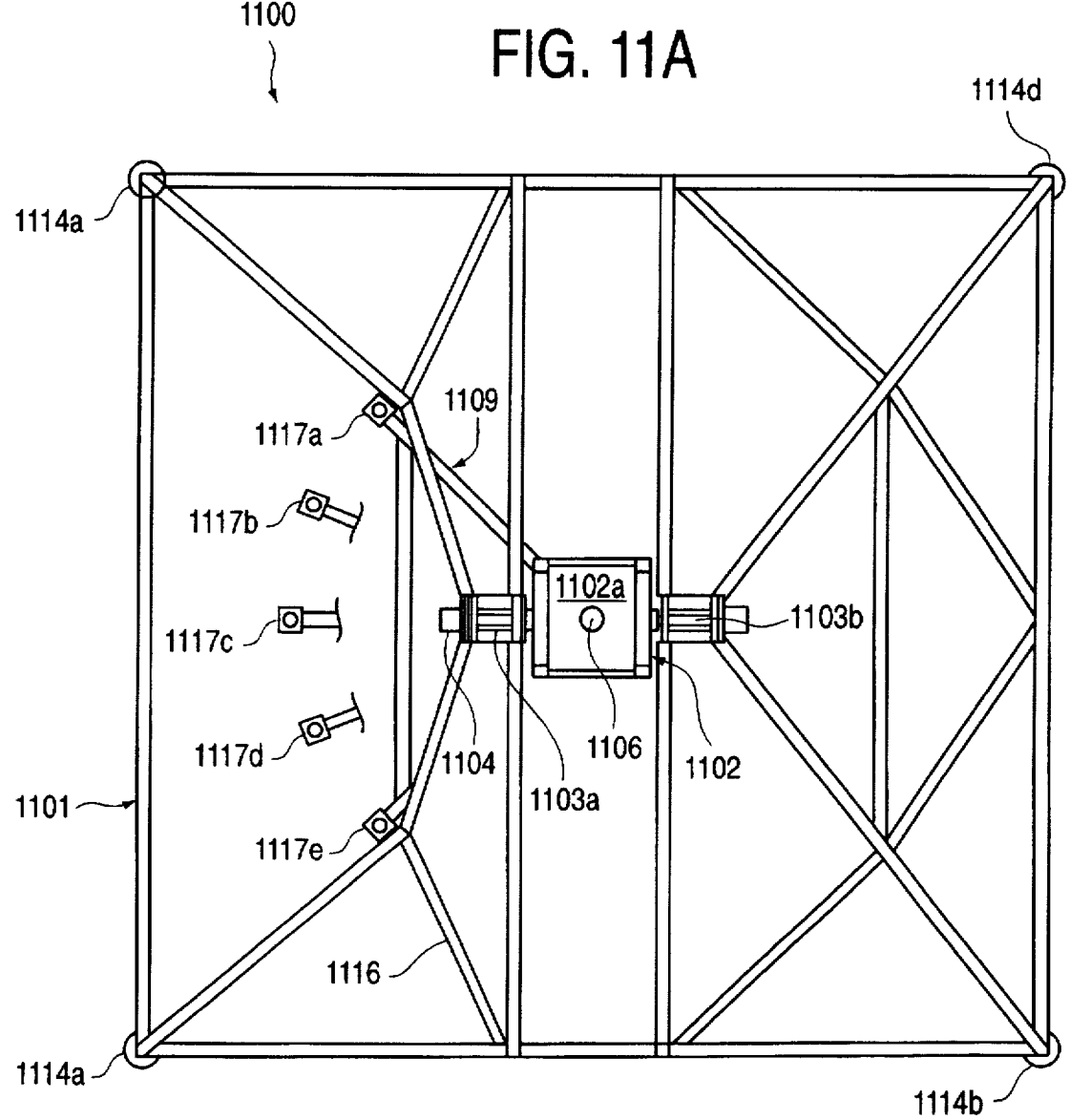

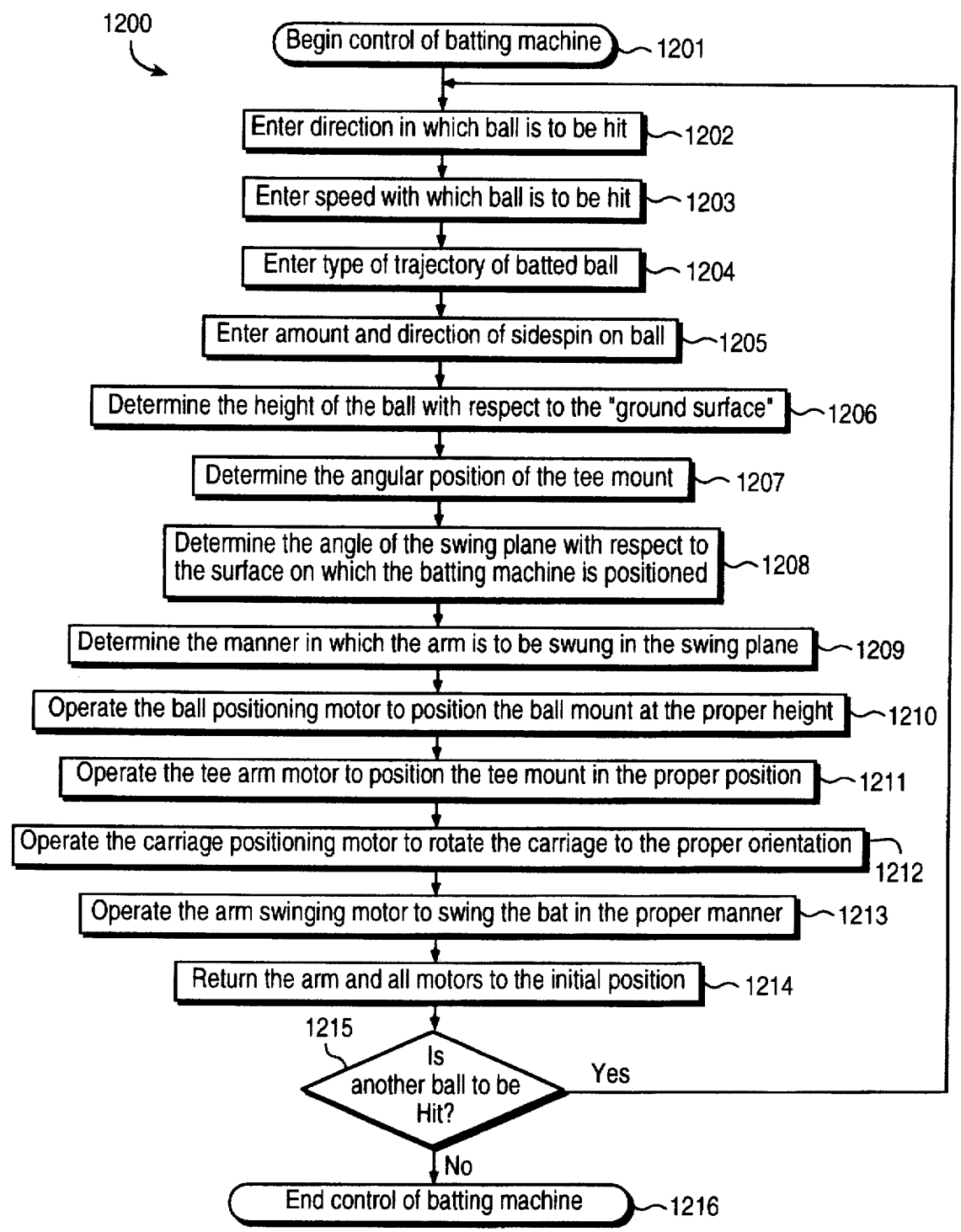

BALL STRIKING APPARATUS

BACKGROUND OF THE INVENTION

1. Field of the Invention

This invention relates to an apparatus for striking an object (in particular, a ball such as a golf ball, baseball or softball) using an appropriate implement (such as a golf club or baseball bat) and to methods for operating such an apparatus.

2. Related Art

Golf club manufacturers must test the clubs that they make, both as an aid in design of the clubs and as part of quality control during production of the clubs. To effect golf club testing, machines have been developed for swinging a golf club to hit a golf ball. Generally, golf club swinging machines include a frame, an arm that is movably attached to the frame, and a drive mechanism for rotating the arm. A golf club is held at one end of the arm and the arm is swung to cause the club to hit a golf ball.

As is well known by those conversant with golf, a golf club can be swung in a variety of ways, intentionally or not, to cause the golf ball to fly through the air in a particular manner. For example, the golf club can be swung so that the clubhead leads, lags or is even with the rest of the club at impact with the golf ball, this characteristic of the swing being controlled by the angular position of the wrist at impact. The golf club can also be swung with various swing planes (i.e., the plane in which the club rotates), e.g., "inside-out", "outside-in" or straight. Additionally, the golf club can be swung with various patterns of acceleration and velocity during the swing. It is desirable that a golf club swinging machine have maximum flexibility in reproducing these swing characteristics in a desired fashion, so that particular types of swings can be simulated. It is also desirable to be able to control the swing characteristics both during the swing and from swing to swing. The ability to reproduce swings of any type is very useful in designing and testing golf clubs, since clubs can be tailored for particular swing types or to accommodate as wide a variety of swing types as possible. Additionally, flexibility in producing particular swing characteristics is desirable because different types of clubs (e.g., driver, fairway wood, long iron, short iron), and clubs of the same type made by different manufacturers, are swung in different ways by the same golfer, due to the length, weight, lie angle and shaft flexibility of the club. If the appropriate swing characteristics are not produced, the fidelity of the design and testing of golf clubs is reduced.

One previous golf club swinging machine has an arm including two sections, with a hinged attachment of the sections that allows the sections to rotate with respect to each other. The hinge is located near the end of the arm at which the golf club is held, so that when the arm swings, the motion about the hinge simulates motion about the wrist in a swinging human arm. The two sections are mechanically linked in a manner that produces a predetermined positional relationship between the sections as the arm moves through a swing (i.e., the machine has a "linkage driven wrist"). It is possible to adjust the mechanical linkage between swings so that, from swing to swing, the positional relationship of the two sections can be changed. This allows, for example, the position of the two sections with respect to each other (i.e., the angular position of the "wrist") at impact to be changed from swing to swing. However, notwithstanding this ability to change the swing characteristics, the mechanical linkage still imposes limitations on the type of swing that can be produced, so that it is not possible to swing the club to produce any desired relative rotation of the two sections during the swing (i.e., swing type), but, rather, only a limited subset of possible relative rotations. For example, once the mechanical linkage is adjusted, the positional relationship of the two sections of the arm during the swing remains the same regardless of the particular velocity and acceleration profiles with which the arm is swung. Further, adjusting the mechanical linkage is a cumbersome and time consuming process; therefore, the swing of this machine cannot be quickly and easily modified to enable testing of clubs requiring different swing characteristics or to enable testing of a single club with a variety of swing types.

The drive mechanism of the above-described golf club swinging machine is pneumatic. Consequently, the velocity and acceleration profiles of the rotating arm, i.e., the magnitude of the velocity and acceleration as a function of position during a swing, cannot be easily varied, either during a swing or from swing to swing. Thus, it is not possible to easily simulate the velocity and acceleration profiles of a variety of types of swings, nor is it possible to vary the velocity and acceleration profiles according to the particular make and type of club being swung.

U.S. Pat. No. 4,026,222, entitled "Golf Club Swinging Apparatus", issued to Solheim on Dec. 13, 1977, describes another golf club swinging machine. This machine also has a hinged arm. In this machine, the two sections connected by the hinge can move freely with respect to each other during rotation of the arm; the relative motion of the two sections is determined by centrifugal force generated by rotation of the arm (i.e., the machine has a "centrifugally driven wrist"). This means that the exact positioning of the two sections of the arm with respect to each other during a swing is dependent upon the manner in which the arm is accelerated during the swing. Since the wrist motion cannot be controlled independently of the swing motion, this machine is also limited in its ability to simulate different types of swings.

Solheim discusses using a servomotor to drive the arm to rotate. However, Solheim does not discuss using the servomotor to vary the velocity and acceleration of the arm in any of a number of predefined ways during the swing so that the club can be swung in variety of ways. For example, the arm of a golf club swinging machine can be accelerated so that the club is aligned with the arm at impact with the ball. However, Solheim does not discuss using the servomotor to produce a variety of velocity and acceleration profiles that each result in alignment of the club with the arm at impact. The production of such various velocity and acceleration profiles is useful in enabling the simulation of a variety of different types of swings. Additionally, Solheim does not discuss using the servomotor to drive the arm using open loop control (in which the amount of torque applied by the motor to rotate the arm throughout the swing is controlled directly as a function of the angular position of the arm) as opposed to closed loop control (in which the angular position of the club at particular times during the swing is directly controlled). The use of open loop control is particularly advantageous for golf club swinging machines, since such control can provide a good simulation of the manner in which a human swings a golf club (e.g., with a given amount of torque, regardless of the size and weight of the club, rather than with the same angular position profile, regardless of the size and weight of the club).

U.S. Pat. No. 4,996,867, entitled "Golf Club Swinging Apparatus", issued to Miyamae on Mar. 5, 1991, describes another golf club swinging machine. Again, this machine includes an arm that is hinged to simulate a wrist. Further, the arm is driven by a servomotor that can be controlled to vary the rotational acceleration of the arm during the swing. However, this machine does not have a centrifugally driven wrist (like the machine described by Solheim), but rather has a linkage driven wrist in which the positional relationship of the hinged sections is an invariable function of the position of the arm during the swing. Consequently, this machine too is limited in its ability to simulate a wide range of golf swings.

Miyamae also discusses using a servomotor to drive the arm to rotate. However, like Solheim, Miyamae does not discuss using the servomotor to drive the arm using open loop control. Consequently, the Miyamae machine is also deficient in simulating the manner, e.g., with a given amount of torque, in which a human swings a golf club.

There are other situations in which it would be useful to have a machine for striking a ball with an implement, such as is done with a golf club swinging machine. For example, such a machine could be used to hit a baseball or softball with a bat. No such batting machines are known to exist. A batting machine would be useful for testing various bats or for hitting balls to allow players to engage in fielding practice.

Traditionally, players have obtained fielding practice by having someone ("fungo hitter") stand and hit balls to them. While some fungo hitters can hit the ball with great accuracy, it is still difficult for a fungo hitter to, on command, hit a ball having a particular direction, trajectory and speed.

For use in allowing players to engage in fielding practice, a machine exists that ejects balls under pressure from a tube, similar to machines that are used to eject tennis balls to enable a tennis player to practice returning the ball. However, such a ball ejecting machine has several disadvantages. First, the machine cannot be easily or precisely controlled to eject the ball at various speeds, in various directions or with various trajectories, so that the machine cannot be readily used to produce a large variety of types of "hits." The speed and acceleration with which the ball can be ejected from the machine may also be limited. In particular, existing ball ejecting machines are not powerful enough to eject the ball at the speeds at which highly skilled players can hit the ball. Additionally, since the ball is ejected from the machine rather than hit by a bat, the machine does not provide the visual or aural cues that a fielder encounters when fielding a ball in an actual game, thereby reducing the degree to which the practice experience accurately reproduces game conditions.

For a batting machine, it is also desirable to be able to vary the swing characteristics with which the bat is swung to cause the ball to be hit in a particular manner to enable a fielder to practice fielding hit balls of particular types. In particular, it is desirable to be able to vary the height of the ball with respect to the swing plane of the bat, the angle of the swing plane with respect to the ground, and the angle of the bat when the bat contacts the ball. None of the above-described machines for hitting a golf ball are adapted for swinging a bat to hit a ball at all, much less in a manner that affords the desired degree of flexibility.

Finally, it is desirable for a golf club swinging machine and, in particular, a batting machine to be capable of automatic operation so that balls can be repetitively hit according to predefined instructions with minimal or no operator intervention. In particular, an automatically operating baseball machine would be particularly advantageous for enabling a baseball team to simulate the play of an actual game (though any batting machine, automatic or not, would be desirable for such purpose). Simulation of a game using an actual pitcher and batter is not as effective as simulating a game with a batting machine, since the latter can be used to simulate a game with predetermined types of batted balls, while the former cannot.

SUMMARY OF THE INVENTION

Generally, the invention can be used to strike an object with an implement. The typical contemplated use of the invention is as a surrogate for a swinging human arm in situations in which it is desirable, for any of a number of reasons, to have a machine swing an implement to strike an object. However, the invention could be used for other purposes. Two applications for which the invention is particularly useful are hitting a golf ball with a golf club, and hitting a baseball or softball with a baseball bat. The invention can be used to, for instance, test an implement (e.g., golf club or baseball bat) used to strike an object (e.g., golf ball or baseball), either to verify acceptable performance of the implement, or to provide information regarding the performance of the implement to assist in the further design of the implement. The invention can also be used to test the object (e.g., golf ball or baseball) being struck. Additionally, when the invention is used to hit a baseball or softball, the invention can be used to hit balls to enable one or more players to engage in fielding practice.

An apparatus according to the invention includes a frame, an arm rotatably mounted to the frame, and a drive mechanism adapted to rotate the arm, such that when the arm is rotated, an implement held by the arm strikes an object. The apparatus of the invention further includes one or more of several below-described features that enable the apparatus to swing the arm in a desired fashion.

In one aspect of the invention, the drive mechanism can be operated to drive the arm according to any specified velocity and acceleration profiles. In particular, the drive mechanism can be operated using open loop control (i.e., by directly controlling, in any prescribed manner, the amount of torque applied by the drive mechanism to rotate the arm as a function of the angular position of the arm during the swing, rather than by rotating the arm through a swing according to a prescribed angular position profile that specifies angular position as a function of time), thus enabling accurate replication of the manner in which a human swings implements of various sizes and shapes (e.g., swinging different golf clubs such as a driver or pitching wedge with a given amount of torque). In one embodiment of the invention including this aspect, an apparatus includes an arm having first and second sections rotatably attached to each other, and a drive mechanism adapted to rotate the arm such that the torque applied to the arm during rotation can be varied, in a predetermined manner, as a function of the angular position of the arm, the first and second sections rotating with respect to each other in response to the manner in which torque is applied to the arm. The ability to drive the arm in any desired manner enables duplication of the swinging motion of a human arm swung in any manner. This versatility is useful, for example, when the apparatus of the invention is used to swing a golf club to hit a golf ball, since the swings of human golfers having different types of arm swings can be accurately reproduced. Thus, a particular golf club can be tested to determine how the club performs for one or more particular types of golf swing, enabling the design of the club to be tailored to produce optimum striking of a golf ball for that swing type or types. Further, different types of golf clubs can be swung in a manner that is appropriate for the particular type of club (e.g., driver, fairway wood, long iron or short iron), thereby increasing the fidelity with which clubs of different types are tested. Additionally, this aspect of the invention is useful in causing the object being struck (e.g., a ball) to be propelled in a desired manner. This characteristic of this aspect of the invention is particularly useful when an apparatus according to the invention is used to hit a baseball or softball to enable a player to practice fielding, since the apparatus can be used to hit different types of batted balls that enable the player to practice a variety of fielding skills.

In another aspect of the invention, the plane of rotation of the arm ("swing plane") can be varied among any of a wide variety of orientations. This aspect of the invention also provides a high degree of flexibility in establishing the characteristics of a particular swing. For example, when the apparatus of the invention is used to swing a golf club to hit a golf ball, this aspect of the invention can be used to produce an "inside-out" swing (that typically produces a "hooked" golf shot) or an "outside-in" swing (that typically produces a "sliced" golf shot). This aspect of the invention can also be used to produce a "flat" swing or a "steep" swing. This capability can be used, for example, to design golf clubs to accommodate swings having particular swing planes. This aspect of the invention can also be used to cause the object being struck to be propelled in a desired manner, a characteristic having benefits as described above.

In yet another aspect of the invention, the arm is divided into two sections that are hinged to allow rotation of the two sections with respect to each other (simulating the wrist motion in a human arm), and further includes a mechanism that enables the motion of the two sections to be controlled independently of each other. This aspect of the invention enables the wrist motion of a swing to be produced in any desired manner. Again, this flexibility is advantageous in the testing and design of the implement being swung (e.g., a golf club), as well as in causing the object being struck (e.g., a ball) to be propelled in a desired manner, with benefits as described above.

In still another aspect of the invention, an arm that is divided into two sections that are hinged to allow rotation of the two sections with respect to each other so that the wrist motion in a human arm can be simulated, is further constructed so that, when the implement being swung contacts the object being struck, the two sections rotate about the hinge with respect to each other in a controlled manner in response to the contact with the object. This aspect of the invention enables simulation of the loss of control of wrist motion that can occur in a human arm in response to the impact of the implement against the ball. In particular, such wrist motion often occurs during a golf swing. This aspect of the invention is useful in further increasing the fidelity with which a swing (and, in particular, a golf swing) can be produced by an apparatus according to the invention.

In still another aspect of the invention, the arm can be adapted so that the arm remains rigid during a swing. This aspect of the invention is useful in simulating human arm swings in which the arm remains rigid. Such rigid arm swings occur, in particular, during certain golf swings such as those made during a putt or chip shot. This aspect of the invention, then, can be used to enhance the fidelity of the testing of golf clubs used for such shots, such as putters or pitching wedges.

In still another aspect of the invention, an apparatus ("batting machine") can be controlled to hit a baseball or softball in a desired manner. No other batting machines for swinging a bat to hit a baseball or softball are known. Further, a method according to the invention can be used to control the batting machine to hit the ball as desired. The method can be implemented on, for example, a digital computer so that the method can be used to automatically control the batting machine.

This aspect (batting capability) of the invention provides a number of advantages. The batting machine eliminates the need for a human batter to hit balls for fielding practice. Further, the batting machine can hit balls with greater precision than can be produced by a human batter. The batting machine thus enables a player or players to practice fielding in a controlled fashion. For example, the batting machine can be controlled to hit balls having any desired direction, trajectory and speed. The batting machine can be easily controlled to vary, in any desired manner, the types of batted balls produced, thereby enhancing fielding practice for a player, both by providing practice fielding batted balls of any type and by providing practice fielding balls hit in unexpected ways. Additionally, the batting machine can be controlled to hit a series of batted balls of exactly the same type to enable a player to obtain concentrated practice fielding a particular type of batted ball. The batting machine could also be used to enable a baseball team to simulate the play of an actual game. Since the batting machine actually hits the ball (as opposed to a ball ejecting machine), the batting machine provides the visual and aural cues that a fielder encounters when fielding a ball in an actual game, thereby increasing the degree to which the practice experience accurately reproduces game conditions.

Use of a digital computer to automatically control a batting machine according to the invention increases the ease with which the batting machine can be controlled by the user to hit balls in a desired manner. Such automatic control also enables balls to be repetitively hit according to predefined instructions with minimal or no operator intervention. The computer control can be implemented in a manner that minimizes the complexity of the operation of the batting machine so that technologically unsophisticated users can easily operate the batting machine.

Finally, a batting machine according to the invention can be used to test various bats and balls to ascertain their characteristics to, for example, aid in modifications to the design of the bats and balls.

BRIEF DESCRIPTION OF THE DRAWINGS

FIG. 1B is a perspective view of a portion of the apparatus of FIG. 1A, illustrating the mechanism for holding the swinging mechanism of the apparatus in place in a direction perpendicular to the surface on which the apparatus is mounted.

FIG. 1C is a perspective view of a portion of the apparatus of FIG. 1A, illustrating the mechanisms for varying the swing plane of the implement being swung.

FIG. 1E is a cross-sectional view of a portion of the apparatus of FIG. 1A, illustrating the mechanism for rotating the vertical swivel plates.

FIG. 3C is a perspective view of a portion of the arm of FIG. 2, illustrating the construction of the gripper.

FIG. 4 is a cutaway cross-sectional view of a portion of the apparatus of FIG. 1A, illustrating the structure for supplying air to effect operation of the release latch and deceleration latch of the arm of FIG. 2.

FIG. 6A illustrates the gripper retaining section and gripper at the end of a backswing and prior to beginning a forward swing. FIG. 6B illustrates the gripper retaining section and gripper at the beginning of the forward swing, just after the release latch is opened. FIG. 6C illustrates the gripper retaining section and gripper when centrifugal force causes the gripper to begin rotating away from the release latch during the forward swing. FIG. 6D illustrates the gripper retaining section and gripper just before the gripper contacts the deceleration latch. FIG. 6E illustrates the gripper retaining section and gripper when the motion of the gripper relative to the gripper retaining section is being decelerated by the deceleration latch. FIG. 6F illustrates the gripper retaining section and gripper at the end of the forward swing, when the gripper is locked into the maximum follow-through position by the deceleration latch. FIG. 6G illustrates the gripper retaining section and gripper, just after the deceleration latch is opened, at the beginning of the return swing to position the implement in the ready position. FIG. 6H illustrates the gripper retaining section and gripper during the return swing when centrifugal force causes the gripper to begin rotating away from the deceleration latch. FIG. 6I illustrates the gripper retaining section and gripper at an intermediate position during the return swing when centrifugal force has caused the gripper to rotate past the gripper retaining section. FIG. 6J illustrates the gripper retaining section and gripper at the end of the return swing when the gripper is locked in place by the release latch. FIG. 6K illustrates the gripper retaining section and gripper at the end of the return swing, after release of the deceleration latch.

FIGS. 10A through 10C show various operating parameters during swings generated by different torque curves. FIG. 10A illustrates a torque curve that produces a swing in which the contact portion of the implement being swung neither leads nor lags the rest of the implement at impact. FIG. 10B illustrates a torque curve for a leading swing in which the contact portion of the implement leads the rest of the implement at impact. FIG. 10C illustrates a torque curve for a lagging swing in which the contact portion of the implement lags the rest of the implement at impact.

FIGS. 11A and 11B are a plan view and side view, respectively, of a batting machine according to the invention.

FIG. 12 is a flow chart of a method according to the invention for controlling a batting machine.

DETAILED DESCRIPTION OF EMBODIMENTS OF THE INVENTION

Figure 1A:
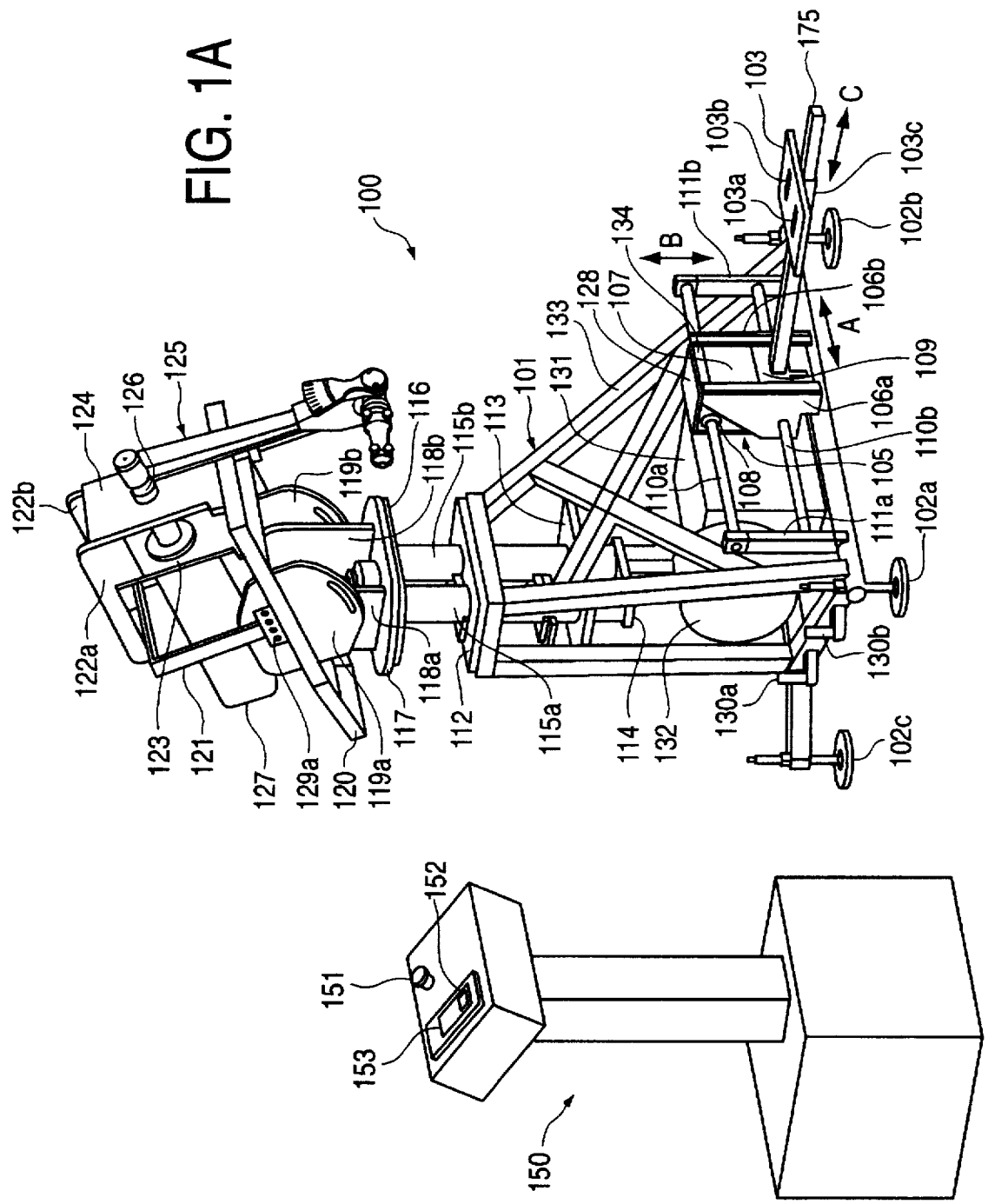
FIG. 1A is a perspective view of an apparatus according to the invention, shown together with a control stand for controlling the apparatus.

According to the invention, apparatus adapted generally to swing an implement to strike an object have several novel aspects that provide important advantages over previous such apparatus. Additionally, apparatus according to the invention can be operated using methods according to the invention that themselves have novel aspects. Further, these methods can be implemented to automatically control an apparatus of the invention. Though the apparatus and associated methods of the invention have general application, the apparatus and methods are particularly useful for swinging a golf club to hit a golf ball, or for swinging a baseball bat to hit a baseball or softball.

An apparatus of the invention can be operated so that the arm can be swung in any desired manner. For example, the arm can be swung according to any specified velocity and acceleration profile, with any specified angular distance from the beginning of the swing to the point of impact, and with any specified orientation of the swing plane. Additionally, the arm can be swung using either closed loop control (i.e., "position control" in which the arm is rotated through a complete swing according to a prescribed angular position profile) or open loop control (i.e., "torque curve control" in which torque is applied in a prescribed manner throughout the swing as a function of the angular position of he arm).

The swinging arm of the apparatus can be articulated to simulate a human wrist. Generally, the apparatus of the invention can be operated (e.g., the arm swung) to control the movement of the "wrist" in a desired manner. Moreover, in some embodiments of the invention, the articulated arm is configured so that the wrist motion can be controlled in a desired manner independently of the rotation of the arm. The wrist motion can also be made responsive to impact between the implement and the object being struck.

An apparatus according to the invention can also be operated with a "rigid" arm having no sections that move relative to each other during a swing. This can be accomplished either with a specially configured arm or by appropriately controlling the articulated arm so that sections of the arm remain fixed with respect to each other during a swing. The use of a rigid arm is particularly useful when the apparatus is used as a golf club swinging machine because the machine can then be enabled to accurately simulate putts and chip shots, a capability not found in previous golf club swinging machines.

Though other apparatus for swinging a golf club to hit a golf ball are known, an apparatus according to the invention for swinging a bat to hit a baseball or softball is believed to be the first such apparatus of its kind. When used to swing a bat to hit a baseball, an apparatus of the invention is particularly useful for enabling one or more players to practice fielding balls that are hit in a prescribed manner by the apparatus of the invention. A method of the invention can be implemented that accepts certain user-specified information as input and uses that information to control the apparatus to hit the ball in the manner desired by the user.

FIG. 1A is a perspective view of an apparatus 100 according to the invention, shown together with a control stand 150 for controlling the apparatus 100. The apparatus 100 is adapted for swinging an implement, held by an arm 125 of a swinging mechanism, to hit a ball (not shown) off of a platform 103 of the apparatus 100. The arm 125 ("centrifugal arm") shown in FIG. 1A includes a "centrifugally driven wrist", the construction and operation of which is described in more detail below with respect to FIGS. 2, 3A through 3D, 5 and 6A through 6K. However, rather than the centrifugal arm 125, the apparatus 100 could be used with an arm ("servo arm") that includes a servo-driven wrist according to the invention, such as, for example, the servo arm 700 described below with respect to FIGS. 7A through 7C.

The operation of the apparatus 100 simulates hitting the ball off of the ground, such as might be done in swinging a golf club to hit a golf ball. (In fact, as described below with respect to FIG. 8, the apparatus can be used to hit a ball off of the ground.) In the following description, reference is sometimes made to use of the apparatus 100 for swinging a golf club to hit a golf ball. Such references are for purposes of illustration only; it is to be understood that the apparatus 100, and the invention in general, can be used for other purposes. For example, as described in more detail below, the invention can be used to swing a baseball bat to hit a baseball or softball: with minor modification, the apparatus 100 described below can be used for that purpose (see FIGS. 11A and 11B).

The apparatus 100 includes a frame 101 that is supported by four legs (in FIG. 1A only three of the legs, legs 102a, 102b and 102c, are visible). Generally, the frame 101 can be supported by any number of legs that enable the frame 101 to be stably supported during operation of the apparatus 100. The frame 101 is constructed of a material and with a geometry and dimensions that are adequate to withstand the stresses to which the frame 101 is subjected during operation of the apparatus 100 and that provide sufficient weight to keep the apparatus 100 from tipping over during operation. Illustratively, the frame 101 can be made of a structural steel. The legs, e.g., legs 102a, 102b, 102c, are, likewise, constructed of a material and with a geometry and dimensions that provide sufficient strength to support the apparatus 100 and sufficient stability to prevent the apparatus 100 from wobbling during operation. Illustratively, the legs 102a, 102b, 102c are made of a structural steel.

Also shown in FIG. 1A are lock down mounts 130a and 130b. (Third and fourth lock down mounts, not visible in FIG. 1A, are formed an opposite side of the apparatus 100).

A pin (not shown in FIG. 1A) can be inserted through each of the lock down mounts and anchored in a suitable manner to the surface (e.g., a concrete surface) on which the apparatus 100 is mounted to provide additional stability to the apparatus 100. However, the lock down mounts (and associated pins) are not a necessary part of the apparatus 100 and need not be present.

The platform 103 is movably mounted on the frame 101 so that, as described below, the position of the platform 103 with respect to the frame 101 can be varied in each of three perpendicular directions, i.e., directions parallel to the axes A, B and C shown in FIG. 1A. The platform 103 can be made of any suitable material. Illustratively, the platform is made of aluminum. The surface of the platform 103 on which the ball is positioned can have any dimensions that are adequate to support the ball. It may be desirable to choose the dimensions of such platform surface to enable the ball to be positioned at a variety of locations with respect to the rest of the apparatus 100.

Slots 103a and 103b are formed through the platform 103. Conventional chronographs can be mounted on the side of the platform 103 opposite that on which the ball is positioned. The slots 103a and 103b enable the chronographs to optically measure the velocity of the part of the implement that passes over the slots 103a and 103b so that the velocity and acceleration of the implement being used to strike the ball can be determined, if desired. The measurements obtained by the chronograph can be used, for example, to calibrate the apparatus 100 so that an implement can be swung with a known velocity and/or acceleration, such calibration being desirable since the amount of force required to swing any given implement with a particular velocity and/or acceleration will vary according to the weight and the weight distribution for that implement. Such calibration information can be used to either automatically (e.g., by appropriately programming a digital computer that can be used to effect the desired control of the swinging mechanism of the apparatus 100) or manually control the swinging mechanism of the apparatus 100. For example, the calibration information could be used to establish one or more torque curves that are used to control the swinging mechanism in a particular manner (described in more detail below). The chronographs are electrically connected in a conventional manner to appropriate electronic components within the control stand 150 to enable control of the chronographs and to receive data regarding the chronograph's measurements. Illustratively, chronographs made by Oehler Research of Austin, Tex., such as the chronograph and printer having part no. 35P, can be used. While the chronographs provide useful information that can be used in the operation of an apparatus according to the invention, the chronographs are not a necessary part of the invention.

The platform 103 is attached to a rod 104. The platform 103 can be attached to the rod 104 in any suitable manner that allows the platform 103 to be easily detached from the rod 104 so that the platform 103 can be moved laterally (i.e., along a direction parallel to the axis C) with respect to the frame 101. In FIG. 1, a sleeve 103c is attached to the bottom of the platform 103 and fitted over the rod 104. The sleeve 103c can be attached to the rod 104 in any suitable manner (e.g., with screws). Thus, the platform 103 can be moved toward or away from the swinging mechanism of the apparatus 100, thereby enabling the position of the object to be struck to be varied to accommodate different implements or different ways of swinging implements, as discussed further below with particular reference to use of the apparatus 100 to swing a golf club to hit a golf ball.

The rod 104 is made of a material and has a geometry and dimensions that provide adequate strength to support the platform 103. In particular, the rod 104 must be sufficiently stiff to ensure that the platform 103 does not move during operation of the apparatus 100, since such movement could affect the precision with which the apparatus 100 is operated, i.e., the exact way in which the implement strikes the ball. Illustratively, the rod 104 is made of aluminum.

The rod 104 is fixedly attached to the rod attachment plate 109 in any suitable manner (such as, for example, by welding). The rod attachment plate 109 is detachably attached to the vertical positioning plate 107 in any suitable manner (such as with nuts and bolts). The rod attachment plate 109 and vertical positioning plate 107 are detachably attached to facilitate construction of the apparatus 100.

The vertical positioning plate 107 is attached to a platform positioning structure 105 that is, in turn, movably mounted on the frame 101. The vertical positioning plate 107 is detachably attached to the platform positioning structure 105 in any suitable manner. As shown in FIG. 1A, a slot 134 is formed in a plate of the platform positioning structure 105. A threaded member (not shown) extends from the plate 107 through the slot 134. A nut (not shown) is threaded onto the threaded member and tightened down to hold the plate 107 in place with respect to the platform positioning structure 105. The plate 107 can be positioned with respect to the platform positioning structure 105 (and, thus, the frame 101) at any location in a direction parallel to the axis B, limited only by the length of the slot 134. In other words, the platform 103 can be placed at any desired height relative to the swinging mechanism of the apparatus 100. It may be desirable to vary the height of the platform 103, for instance, to accommodate the particular length of the implement being swung. (As will be described below, it is also possible to move the swinging mechanism up and down to vary the height of the swinging mechanism relative to the platform 103.)

The vertical positioning plate 107 is positioned between a pair of parallel opposed guide plates 106a and 106b to aid in positioning the plate 107 with respect to the platform positioning structure 105. The guide plates 106a and 106b are each formed with a hole through which a guide rod 110b (attached to the frame 101, as explained below) extends. The guide plates 106a and 106b are rigidly attached to the platform positioning structure 105 in any suitable manner (such as, for example, by bolting).

The platform positioning structure 105 also includes two positioning bars (only the positioning bar 108 is visible in FIG. 1A). A guide rod 110a extends through the positioning bar 108. The guide rod 110b extends through the other positioning bar. The positioning bar 108 is rigidly attached (by, for example, bolting) to a second plate of the platform positioning structure 105. A threaded member 133 extends from the positioning bar 108 through a hole in the second plate. A nut 128 is threaded over the threaded member 133 and tightened down to hold the platform positioning structure 105 in position with respect to the guide rod 110a (i.e., with respect to the frame 101). The positioning structure 105 can be moved longitudinally (i.e., in a direction parallel to the axis A) with respect to the frame 101 by sliding the positioning bars along the corresponding guide rods 110a and 110b. Thus, the positioning structure 105 (and, therefore, the platform 103) can be positioned in any desired longitudinal position, subject only to the constraints imposed by the length of the guide rods 110a and 110b, with respect to the frame 101. In other words, the platform 103 can be moved forward or backward relative to the swinging mechanism of the apparatus 100, as necessary or desirable to enable different implements to be swung by the apparatus 100 or to enable variation in the manner in which an implement strikes the object on the platform 103.

The guide rods 110a and 110b are each attached at opposite ends to one or the other of a pair of guide rod supports 111a and 111b. The guide rods 110a and 110b can be attached to the supports 111a and 111b in any suitable manner (such as, for instance, by welding or with nuts and bolts). The supports 111a and 111b are themselves attached (by, for example, welding) to a beam of the frame 101. The guide rods 110a and 110b and the supports 111a and 111b can be of any suitable material, geometry and size that provide sufficient strength to support the platform positioning structure 105, rod 104 and platform 103, and sufficient stiffness to prevent movement of the platform 103 during operation of the apparatus 100. Illustratively, the guide rod supports 111a and 111b are made of a structural steel. The guide rods 110a and 110b are made of, for example, stainless steel and precision ground to ensure accurate positioning of the platform positioning structure 105.

A plate 112 is attached to the top of the frame 101. A plate 113 is attached to the frame 101 beneath the plate 112.

Each of the plates 112 and 113 are rigidly attached to the frame 101 in any suitable manner (such as, for example, by welding). Mounting posts 115a and 115b extend through the plates 112 and 113, which provide guidance and support for the mounting posts 115a and 115b. Each of plates 112 and 113 can be made of any suitable material having adequate strength and rigidity to hold the posts 115a and 115b in place during operation of the apparatus 100. Likewise, posts 115a and 115b can be made of any suitable material having adequate strength to support the rest of the swinging mechanism and having adequate rigidity to hold the swinging mechanism stably in place during operation. Illustratively, the plates 112 and 113, and the posts 115a and 115b are made of a structural steel.

FIG. 1B is a perspective view of a portion of the apparatus 100, illustrating the mechanism for holding the mounting posts 115a and 115b in place in a direction parallel to the longitudinal axis of the posts 115a and 115b (i.e., vertically, as viewed in FIG. 1A). Some parts (e.g., the air compressor 131 and tank 132, discussed below) of the apparatus 100 are not shown in FIG. 1B to increase clarity.

A clamp plate 161 is positioned on the plate 112. The clamp plate 161 is formed with recesses 161a and 161b, the recesses 161a and 161b shaped so as to fit around the corresponding mounting posts 115a and 115b, respectively. A block 162 is fixedly attached to the plate 112. A threaded hole is formed through the block 162. A clamp 163 includes a clamp handle and a threaded shaft that extends from the clamp handle. The threaded shaft of the clamp 163 can be screwed into the threaded hole in the block 162 so that the end of the shaft of the clamp 163 opposite the end at which the clamp handle is formed contacts the clamp plate 161. As the clamp 163 is screwed further into the hole of the block 162, the pressure of the shaft against the clamp plate 161 causes the recesses 161a, 161b of the clamp plate 161 to press against the corresponding mounting posts 115a, 115b, the frictional force between the recesses 161a, 161b and the mounting posts 115a, 115b acting to hold the posts 115a, 115b in place. A slot 161c is also formed through the clamp plate 161. Two threaded retention bolts 164a and 164b fit through the slot 161c and screw into corresponding threaded holes formed in the plate 112 to help hold the clamp plate 161 in place on the plate 112.

A similar arrangement is positioned on a mounting plate 165 that is located between the plates 112 and 113. The mounting plate 165 is rigidly attached (by, for instance, welding) to the frame 101. A clamp plate 166 is positioned on the mounting plate 165. A block 167 is fixedly attached to the mounting plate 165. A clamp 168 can be screwed into a hole in the block 167 to push the clamp plate 166 against the mounting posts 115a and 115b, thereby causing the clamp plate 166 to help hold the mounting posts 115a and 115b in place. Two threaded retention pins 169a and 169b fit through a slot in the clamp plate 166 and screw into corresponding threaded holes in the mounting plate 165 to hold the clamp plate 166 in place on the mounting plate 165. The clamp plate 166, block 167, clamp 168 and retention pins 169a, 169b each have the same size and shape as the clamp plate 161, block 162, clamp 163 and retention pins 164a, 164b, respectively.

Returning to FIG. 1A, a surface of a mounting plate 114 is rigidly attached to one end of the mounting posts 115a and 115b (by, for example, bolting). Illustratively, the mounting plate 114 can be made of a structural steel. A conventional motor (not shown in FIG. 1A) that is attached to the frame 101 can be operated to drive lead screws connected to the posts 115a and 115b so that the posts 115a and 115b are moved in a direction parallel to the longitudinal axis of the posts 115a and 115b. This enables the swinging mechanism to be raised and lowered with respect to the frame 101 (and, thus, the platform 103). This may be useful in accommodating the use of implements having different lengths, as noted above, or in enabling a ball to be struck while positioned on the ground, rather than on the platform 103. Illustratively, the apparatus 100 can be constructed so that the position of the swinging mechanism with respect to the platform 103 can be adjusted within a range of approximately 8–10 inches.

A surface of a plate 116 (the "horizontal swivel mounting plate") is attached to the ends of the posts 115a and 115b above the plate 112. This can be done, for example, using bolts. A swivel plate 117 (the "horizontal swivel plate") is rotatably attached, as described below, to the mounting plate 116. The swivel plate 117 can be rotated with respect to the mounting plate 116 (i.e., with respect to the frame 101), thereby changing the orientation of the plane ("swing plane") in which the implement is swung about an axis that is generally perpendicular to the surface on which the object to be struck is positioned, as described in more detail below. Illustratively, the mounting plate 116 and the swivel plate 117 can be made of a structural steel.

FIG. 1C is a perspective view of a portion of the apparatus 100, illustrating the swivel plate 117 in more detail. A bearing block 176 is positioned on the horizontal swivel plate 117. A knob-ended shaft 177 extends through the bearing block 176 and swivel plate 117, and is rigidly attached to the mounting plate 116. The swivel plate 117 rotates about the shaft 177.

Three slots 171a, 171b, 171c are formed through the swivel plate 117. Each slot 171a, 171b, 171c describes an approximately circular arc. Screws 172a, 172b, 172c fit through corresponding ones of the slots 171a, 171b, 171c into corresponding threaded holes in the mounting plate 116. When tightened down, the screws 172a, 172b, 172c press down corresponding washers to hold the swivel plate 117 fixed with respect to the mounting plate 116. Lockdown bolts (only lockdown bolt 175 is visible in FIG. 1C) extend through the mounting plate 116. The lockdown bolts are also tightened down to contact the swivel plate 117 and hold the swivel plate 117 fixed with respect to the mounting plate 116. When the screws 172a, 172b, 172c and lockdown bolts are loosened, the swivel plate 117 can be rotated so that the position of the swivel plate 117 with respect to the mounting plate 116 can be varied. In the apparatus 100, the swivel plate 117 is rotated manually; however, the swivel plate 117 could also be driven by a motor and operated automatically. The circular arc of the slots 171a, 171b, 171c ensures that the screws 172a, 172b, 172c will fit through the slots 171a, 171b, 171c into the threaded holes of the mounting plate 116, regardless of the position of the swivel plate 117 with respect to the mounting plate 116. The swivel plate 117 can thus be rotated into any desired angular position with respect to the frame 101, subject only to the limitation imposed by the lengths of the slots 171a, 171b, 171c.

FIG. 1C also illustrates a mechanism for varying the orientation of the swing plane about an axis that is generally parallel to the surface on which the object to be struck is positioned. Two plates 118a and 118b (the "vertical swivel mounting plates") are attached to the 10 surface of the swivel plate 117 opposite that contacting the mounting plate 116. The mounting plates 118a and 118b can be attached in any suitable manner (such as, for example, by welding or with nuts and bolts). A shaft (not shown) extends through holes formed in the mounting plates 118a and 118b, the shaft and holes being sized so as to allow bearings to fit therebetween to allow rotation of the shaft with respect to the mounting plates 118a and 118b. Swivel plates 119a and 119b (the "vertical swivel plates") are rotatably attached to the corresponding mounting plates 118a and 118b by rigidly attaching the swivel plates 119a and 119b to the shaft. In the apparatus 100 this is done by rigidly attaching the shaft to each of two plates (plate 129a is visible in FIG. 1A and plate 129b is visible in FIG. 1C) which are, in turn, attached (with, for example, nuts and bolts) to corresponding ones of the swivel plates 119a and 119b. Illustratively, the mounting plates 118a and 118b and the swivel plates 119a and 119b can be made of structural steel.

Slots 173a and 173b are formed through corresponding swivel plates 119a and 119b, the slots 173a and 173b describing an approximately circular arc and being positioned so that, when the swivel plates 119a and 119b are assembled into the apparatus 100, the slots 173a and 173b are at approximately the same height. Screws 174a and 174b fit through corresponding ones of the slots 173a and 173b into corresponding threaded holes in the corresponding mounting plates 118a and 118b. When tightened down, the screws 174a and 174b press down corresponding washers that hold the swivel plates 119a and 119b fixed with respect to the corresponding mounting plates 118a and 118b. In a manner similar to that described above with respect to the mounting plate 116 and swivel plate 117, the screws 174a and 174b can be tightened and loosened to either hold the swivel plates 119a and 119b in place with respect to the corresponding mounting plates 118a and 118b or to allow the swivel plates 119a and 119b to be rotated so as to vary the position of the swivel plates 119a and 119b with respect to the corresponding mounting plates 118a and 118b. Again, the circular arc of the slots ensures that the screws 174a and 174b will fit through the slots 173a and 173b and through the holes in the mounting plates 118a and 118b even though the position of the swivel plates 119a and 119b with respect to the mounting plates 118a and 118b is changed. The swivel plates 119a and 119b can thus be rotated into any desired angular position with respect to the frame 101, subject only to the limitation imposed by the lengths of the slots 173a and 173b. Rotation of the swivel plates 119a and 119b changes the angle of the arm 125 with respect to the platform 103.

making the plane in which the implement is swung either more or less perpendicular to the platform 103, i.e., making the swing plane either steeper or flatter. (When swinging a golf club, this is referred to as the "lie angle.") As described in more detail below, this enables different implements to be swung or a particular implement to be swung in a particular way.

FIG. 1C also shows holes 179a and 179b formed through the swivel plate 117. The bolts used to attach the mounting plate 116 to the posts 115a and 115b fit into the holes 179a and 179b. The bolt attachment must be configured so that no part of the bolts extend above the surface of the mounting plate 116 so that the swivel plate 117 can rotate as described above.

Figure 1D:
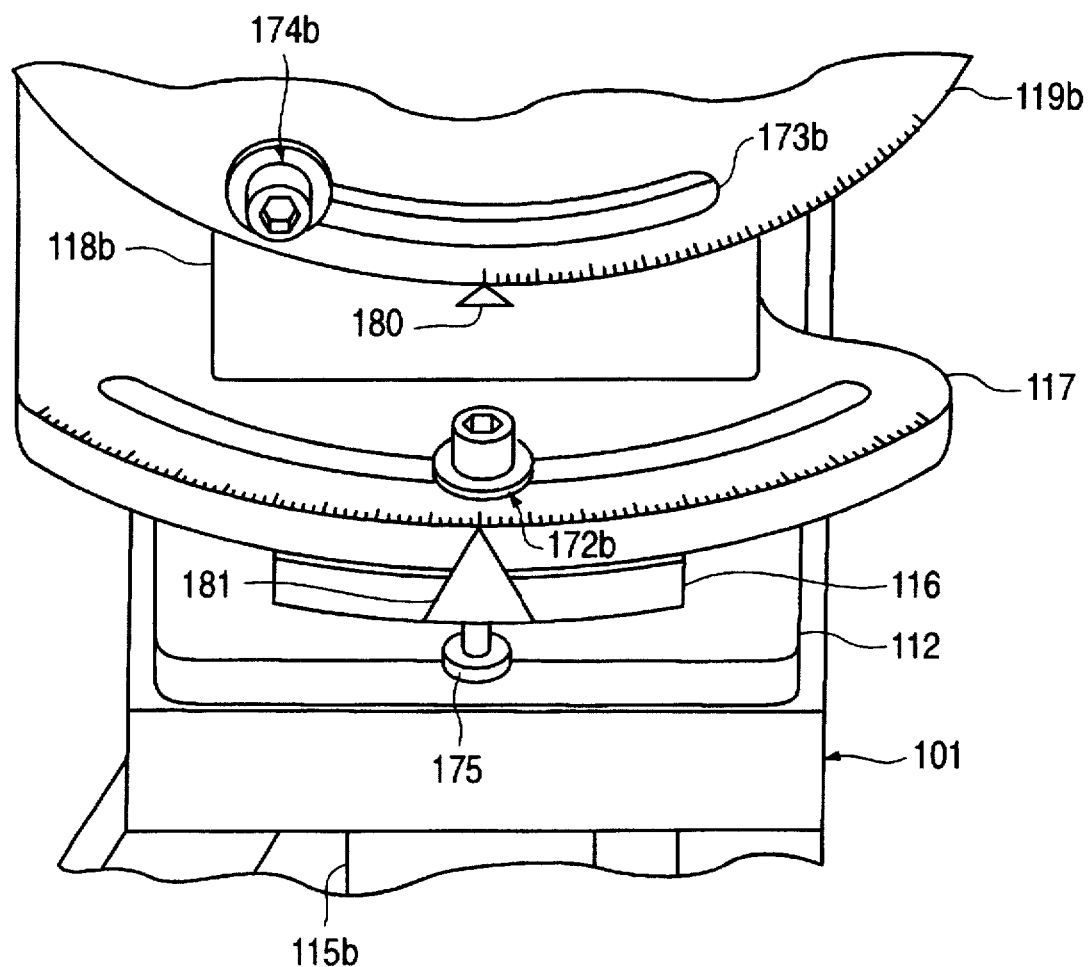
FIG. 1D is a perspective view of a portion of the apparatus of FIG. 1A, illustrating angular scales that can be used to control the position of the horizontal swivel plate and the vertical swivel plates.

FIG. 1D is a perspective view of a portion of the apparatus 100, illustrating angular scales that can be used to control the position of the horizontal swivel plate 117 and the vertical swivel plates 119a and 119b. A reference marker 180 is formed on the mounting plate 118b for use in establishing the angular orientation of the vertical swivel plate 119b. Illustratively, the angular orientation of the vertical swivel plates 119a and 119b can be varied between a 0 degree position and a 45 degree position, as shown in FIG. 1D. Likewise, a reference marker 181 is formed on the mounting plate 116 for use in establishing the angular orientation of the swivel plate 117. Illustratively, the angular orientation of the horizontal swivel plates 117 can be varied between a –45 degree position and a 45 degree position, as shown in FIG. 1D.

FIG. 1E is a cross-sectional view of a portion of the apparatus 100, illustrating the mechanism for rotating the vertical swivel plates 119a and 119b. A bracket 194 is rigidly attached (by, for example, bolting) between the swivel plates 119a and 119b. Two planet gears (only planet gear 192 is visible in FIG. 1E) are rigidly attached to corresponding ones of the swivel plates 119a and 119b. A sun gear 191 is rigidly attached in any suitable manner to a shaft 193 that extends between the mounting plates 118a and 118b. A conventional motor 190 is mounted on the bracket 194. The motor 190 is connected to a shaft (not shown) that extends between the planet gears so that the motor 190 can be operated to rotate the shaft. When the motor 190 rotates the shaft, the planet gears rotate about the sun gear 191, in turn causing the swivel plates 119a and 119b to rotate.

FIG. 1E also shows a motor 127 that is mounted on a plate 123 (not visible in FIG. 1E, see FIG. 1A). The motor 127 is used to rotate the arm 125, as discussed further below.

Returning to FIG. 1A, an upper frame 120 is attached to the swivel plates 119a and 119b using four brackets (brackets 178a and 178b are shown in FIG. 1C). The frame 120 provides stability and reinforcing strength to the swinging mechanism. A bracket 121 is also attached (by, for example, nuts and bolts) to the swivel plates 119a and 119b. In turn, two opposing, parallel, L-shaped plates 122a and 122b are attached (by, for instance, welding) to the bracket 121. Opposing, parallel plates 123 and 124 are attached (by, for instance, using nuts and bolts) to opposite sides of a leg of each of the L-shaped plates 122a and 122b. Illustratively, each of the frame 120, bracket 121, and plates 122a, 122b, 123 and 124 can be made of a structural steel.

A shaft 126 extends through holes in the plates 123 and 124, bearings being disposed between the shaft 126 and plates 123 and 124 to allow rotation of the shaft 126. The motor 127 is mounted on a surface of the plate 123 that is opposite the surface that faces the plate 124. The motor 127 can be engaged with the shaft 126 to cause the shaft 126 to rotate. The arm 125 is attached to an end of the shaft 126 that is opposite the end of the shaft that can be engaged by the motor 127. Rotation of the shaft 126 causes the arm 125, and, therefore, the implement held by the arm 125, to swing.

Generally, the motor 127 can be any conventional motor. However, preferably, the motor 127 is a servomotor that can be used to vary in a prescribed manner the torque with which the arm 125 is rotated during a swing, as described in more detail above and below. A servocontroller is used to control the operation of the servomotor as known by those skilled in the art. For example, a brushless DC servomotor having the following characteristics can be used: power rating of 7.8 horsepower, torque rating of 58 ft.–lb. (580 ft.–lb through a 10:1 gearbox), current draw of 120 amps, speed rating of 3000 rpm, encoder resolution of 8000 counts/rev., and position update time of 2 milliseconds.

As indicated above, when the motor 127 is a servomotor, the particular way in which the arm 125 is swung can be varied. Broadly, the arm, e.g., the arm 125, of an apparatus according to the invention can be swung with either open loop or closed loop control.

In closed loop control (also called "position control"), torque is applied to the motor driving the arm to cause the arm to traverse the entire extent of the swing according to a specified angular position profile, i.e., a specification of the angular position of the arm as a function of time. (Typically, the angular position profile is specified so that the angular position changes linearly with time.) Thus, for a particular control setting (i.e., angular position profile and angular swing length), the time required for the arm to complete a swing is the same for any implement swung. With respect to golf clubs, for example, this means that heavy clubs (e.g., a pitching wedge) are swung with the same speed and acceleration as light clubs (e.g., a driver). Since, in reality, this is not how golf clubs are swung by a human, closed loop control is not the best way to control the apparatus of the invention to swing a golf club.

To address this problem, the motor driving the arm can be operated using open loop control. In open loop control (also called "torque curve control"), the amount of torque applied to the motor to drive the arm during a swing is controlled directly as a function of the angular position of the arm during the swing, without regard for the time during the swing at which any angular position of the arm occurs. For example, constant torque can be applied during a swing. Or, as described below, torque can be varied during the swing according to a specified torque profile (or "torque curve"), such as linearly increasing. Thus, for a particular control setting (i.e., torque curve), the speed and acceleration with which a particular implement is swung depends upon the weight and geometry of that implement. With respect to golf clubs, for example, this means that, for the same torque curve, heavy clubs such as a pitching wedge are swung more slowly than light clubs such as a driver. As can be seen, open loop control can, therefore, more closely approximate the way in which golf clubs are actually swung by a person. This is useful in duplicating different types of swings, as will be apparent from the description below.

In a particular embodiment of the invention, the arm is initially swung using open loop control. At some point after contact with the object being struck has been made, the motor operation is switched to closed loop control. The use of closed loop control aids in decelerating the arm smoothly. It was found that such use of closed loop control to produce smooth braking of the arm helps to prevent breaking of the shaft of golf clubs when the clubs are swung with high speed (e.g., a speed that produces a clubhead speed at impact with the ball of over approximately 120 mph).

Returning to FIG. 1A, a conventional air compressor 131 and a tank 132 are each mounted within the frame 101. The air compressor 131 is used to supply air to the air cylinders of the latch actuating mechanisms of the arm 125, as described in more detail below with respect to FIGS. 2, 4 and 6A through 6K. The tank 132 holds air for use by the air compressor 131.

The control stand 150 can be used to control the apparatus 100 by transmitting appropriate electrical signals from electronic components within an operating console 154 of the control stand 150 through an electrical transmission line (not shown) to control the motors used to drive various parts of the apparatus 100, as is well-known by those skilled in the art. The operating console 154 includes a control pad 152 and control buttons 151a, 151b. The control pad 152 and buttons 151a, 151b can be embodied by conventional such apparatus. The control pad 152 and buttons 151a, 151b are used to control conventional electronic components, configured in a manner known by those skilled in the art of electronic control, to implement desired methods of control of the apparatus 100. Alternatively, the operating console 154 could include a touch screen instead of, or in addition to, the control pad 152 and buttons 151a, 151b. For example, the control stand 150 can include a computer that implements a control program for control of the apparatus 100, the pad 152 and buttons 151a, 151b being used for operator input to the control program. The control program can, for example, use the calibration information obtained by the chronograph to swing a particular implement with a desired velocity and acceleration. Additional features that could be implemented in such a control program are described in more detail below.

The operating console 154 of the control stand 150 also includes a display 153 for displaying information relevant to the operation of the apparatus 100. The display 153 can be, for example, a conventional LED or LCD display and can be used to display instructions and choices for operating the apparatus 100, and results of the operation of the apparatus 100. The display can also be used to display measurements from a chronograph, as described above, if a chronograph is used with the apparatus 100.

Figure 2:
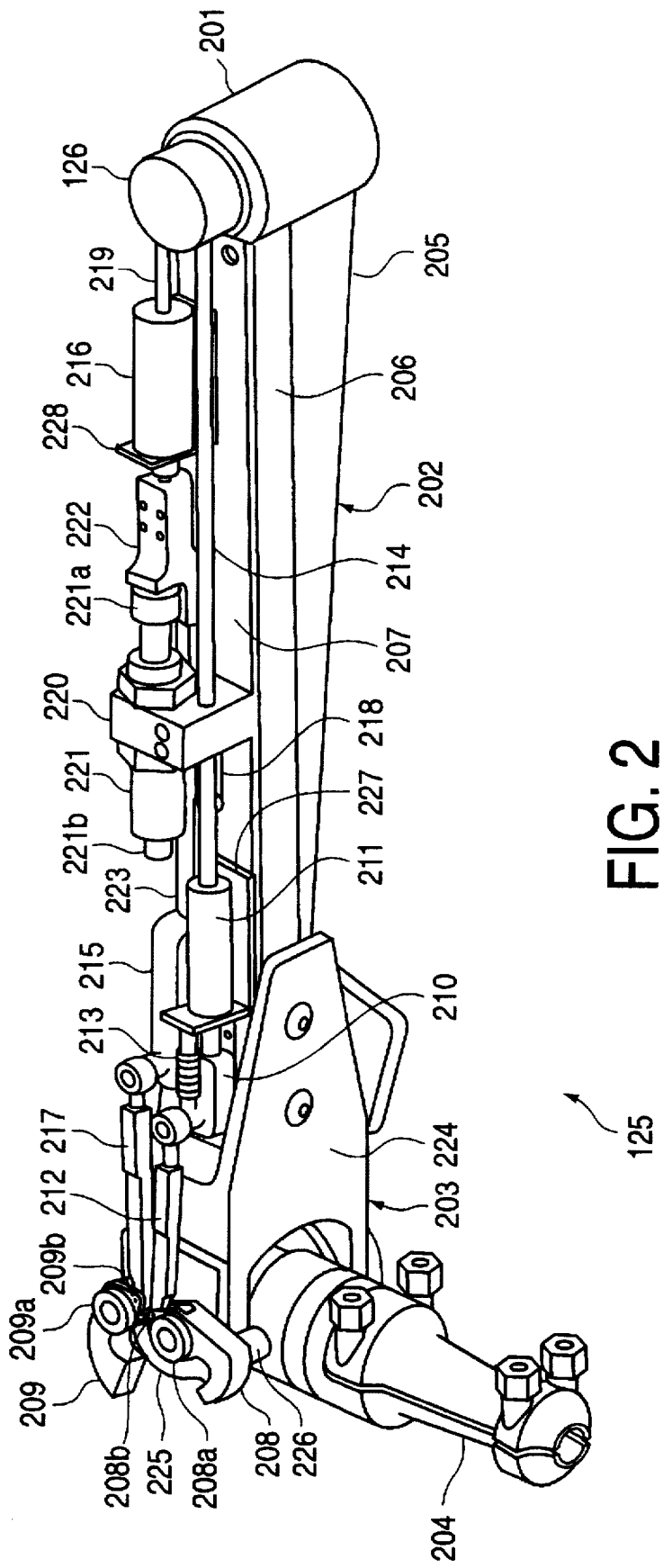
FIG. 2 is a perspective view of the articulated arm having a centrifugally driven wrist that is shown as part of the apparatus of FIG. 1A, illustrating the latch actuating mechanisms that are largely hidden from view in FIG. 1A.

FIG. 2 is a perspective view of the centrifugal arm 125 shown as part of the apparatus 100 in FIG. 1A, illustrating the latch actuating mechanisms that are largely hidden from view in FIG. 1A. The arm 125 includes four sections: a mounting boss 201, an actuator mount section 202, a gripper retaining section 203 and a gripper 204. The mounting boss 201 is fixedly attached to the shaft 126 (FIG. 1A) in any suitable manner. As shown in FIG. 1A, the boss 201 and shaft 126 are keyed to hold the boss 201 in place on the shaft 126. The boss 201 is rigidly attached to an end of the actuator mount section 202 in any suitable manner (such as, for example, welding). The opposite end of the actuator mount section 202 is, in turn, rigidly attached to an end of the gripper retaining section 203 in any suitable manner, such as, for example, screws which extend through holes in the gripper retaining section 203 into corresponding threaded holes in the actuator mount section 202. The gripper 204 is rotatably attached to the opposite end of the gripper retaining section 203 in a manner described in more detail below with respect to FIG. 3A.

When the shaft 126 is rotated to cause the arm 125 to swing, the mounting boss 201, actuator mount section 202 and gripper retaining section 203 rotate directly with the shaft 126. The gripper 204 can rotate with respect to the gripper retaining section 203 (i.e., with respect to the rest of the arm 125). Given the relative dimensions (as can be appreciated in FIGS. 1A and 2) of the sections 201 through 204 of the arm 125, the swinging arm 125, then, simulates the motion of a swinging human arm in which the elbow is held rigid and the wrist is allowed to rotate during the swing, the relative rotation between the gripper 204 and the gripper retaining section 203 simulating the wrist motion. The gripper 204, except for restraint at either end of the gripper's 204 range of motion, can rotate freely with respect to the rest of the arm 125, the position of the gripper 204 during a swing being determined by centrifugal forces acting on the arm 125. The manner in which the gripper 204 rotates with respect to the rest of the arm 125 is described in more detail below with respect to FIGS. 6A through 6K.

The actuator mount section 202 includes three plates 205, 206 and 207. The plates 205 and 206 are attached together in any suitable manner (such as, for example, by welding) and provide structural strength. The plates 205 and 206 can be made of any appropriate material that is sufficiently rigid to resist flexure during swinging of the arm 125. It is also desirable that the plates 205 and 206 be lightweight so that relatively less power is required to swing the arm 125. Illustratively, the plates 205 and 206 can be made of chromalloy or aluminum. The plate 207 is attached in any suitable manner (such as, for example, with nuts and bolts) to a surface of the plate 206 and is used to mount the latch actuating mechanisms described below. The plate 207 can be made of any appropriate material such as, for example, chromalloy or aluminum.

Two latch actuating mechanisms are mounted on the plate 207. A first latch actuating mechanism interacts with the release latch 208 that is rotatably attached to the gripper retaining section 203. A second latch actuating mechanism interacts with a deceleration latch 209 that is rotatably attached to the gripper retaining section 203. The latch actuating mechanisms, together with rotation of the arm 125, control the interaction of the latches 208 and 209 with a pin 226 of the gripper 204, as explained in more detail below with respect to FIGS. 6A through 6K, to control the manner in which the gripper 204 rotates with respect to the rest of the arm 125 at either end of the range of motion of the gripper 204, i.e., at the beginning and end of a swing.

The first latch actuating mechanism includes an actuator block 210, an air cylinder 211, an actuator rod 212, a spring 213 and an air supply line 214. The actuator block 210 is movably attached to the plate 207. For example, the actuator block 210 can be mounted on a slider bearing that is rigidly attached (by, for example, bolting) to the plate 207. Illustratively, the actuator block 210 can be made of a lightweight material such as aluminum. One end of the actuator rod 212 is attached to one end of the actuator block 210. The attachment can be accomplished, for example, using a screw that threads through a boss of the actuator rod into a threaded hole of the actuator block 210. The actuator rod 212 is made of any suitable material (e.g., steel) having adequate strength. The other end of the actuator rod 212 is attached, as described in more detail below, to the release latch 208, so that when the actuator block 210 moves, the actuator rod 212 causes rotation of the release latch 208. One end of the air cylinder 211 is rigidly attached to a leg of an L-bracket 227 by threading a threaded extension of the air cylinder 211 into a corresponding threaded hole formed in the leg of the L-bracket 227. A piston of the air cylinder 211 can extend from the threaded extension of the air cylinder 211. The piston of the air cylinder 211 is attached to (for example, threaded into) the actuator block 210. The other leg of the L-bracket 227 is, in turn, rigidly attached (by, for example, bolting) to the plate 207. The spring 213 is attached to and extends between the actuator block 210 and the leg of the L-bracket 227 to which the air cylinder 211 is attached. The spring 213 can be attached in any suitable manner. For example, one end of the spring 213 can be extended through a hole in the L-bracket 227 and crimped. while the other end can be threaded and screwed into a corresponding threaded hole formed in the actuator block 210. The spring 213 preferably has a spring constant of at least 30 lbf./in. to reduce oscillation of the implement being swung when the implement impacts and is restrained by the release latch 208, as described below. The air supply line 214 is connected to the end of the air cylinder 211 opposite the end attached to the L-bracket 227 using, for example, a conventional quick-disconnect fitting. Illustratively, the air supply line 214 can be made of a lightweight material such as aluminum. The air supply line 214 extends through and is supported by a stationary mounting block 220 so that the air supply line 214 is held in place on the plate 207. The stationary mounting block 220 is attached to the plate 207 in any suitable manner (e.g., with nuts and bolts) and, illustratively, can be made of a lightweight material such as aluminum.

The air compressor 131 (FIG. 1) supplies air to, or removes air from, the air cylinder 211 (as explained in more detail below with respect to FIG. 4) through the air supply line 214 to cause motion of the piston of the air cylinder 211. Motion of the piston, in turn, causes the actuator block 210 to move. The movement of the actuator block 210 causes the actuator rod 212 to move and, consequently, the release latch 208 to rotate. The spring 213 is configured to apply a force that tends to position the release latch 208 in a closed position. The interaction and operation of the above-described components of the first latch actuating mechanism during a swing of the arm 125 is described in more detail below with respect to FIGS. 6A through 6K.

The second latch actuating mechanism includes an actuator block 215, an air cylinder 216, an actuator rod 217, a spring 218, an air supply line 219, a shock absorber 221, a rear slider block 222 and an actuator rod 223. The construction and interconnection of the actuator block 215 and the actuator rod 217 can be the same as that of the actuator block 210 and the actuator rod 212, respectively, described above. The air cylinder 216 can be movably attached to the plate 207 in the same fashion as that described above for the air cylinder 211 (i.e., using an L-bracket 228). The construction and interconnection of the air cylinder 216 and air supply line 219 can be the same as that of the air cylinder 211 and air supply line 214, respectively, described above. The piston of the air cylinder 216 is attached to (for example, threaded into) an end of the rear slider block 222. The rear slider block 222 is movably attached to the plate 207, using, for example, a slider bearing that is rigidly attached (by, for example, bolting) to the plate 207. Illustratively, the rear slider block 222 can be made of a lightweight material such as aluminum. The end of the rear slider block 222 opposite the end connected to the piston of the air cylinder 216 is attached (by, for example, bolting) to an end of the actuator rod 223. The actuator rod 223 is made of any suitable material having adequate strength that, preferably, is lightweight (e.g., aluminum). The actuator rod 223 extends through a channel formed through the stationary mounting block 220 and is attached (by, for example, bolting) to the end of the actuator block 215 that is opposite the end attached to the actuator rod 217. The end of the rear slider block 222 connected to the actuator rod 223 is also adjacent a shock absorber 221. The shock absorber 221 is fixedly mounted in the stationary mounting block 220, using, for example, jam nuts on either side of the stationary mounting block 220. Two springs (only spring 218 is visible in FIG. 2) are attached to and extend between the stationary mounting block 220 and a location on the actuator rod 223. The springs can be attached in any suitable manner. The springs have a spring constant that is adequate to reduce oscillation of the implement being swung when the implement impacts and is restrained by the deceleration latch 208, as described below.

The air compressor 131 (FIG. 1) supplies air to, or removes air from, the air cylinder 216 (as explained in more detail below with respect to FIG. 4) through the air supply line 219 to cause motion of the piston of the air cylinder 216. Motion of the piston, in turn, causes the rear slider block 222 to move. The movement of the rear slider block 222 causes movement of the actuator rod 223 and, therefore, the actuator block 215. The movement of the actuator block 215 causes movement of the actuator rod 217 and, consequently, rotation of the deceleration latch 209. The springs are configured to apply a force that tends to position the deceleration latch 209 in a closed position. The interaction and operation of the above-described components of the second latch actuating mechanism during a swing of the arm 125 is described in more detail below with respect to FIGS. 6A through 6K.

As indicated above, the actuator rod 223 extends through the stationary mounting block 220 and is attached to the end of the rear slider block 222. The actuator rod 223 can move through the channel in the stationary mounting block 220 to cause the rear slider block 222 to move farther from or closer to the shock absorber 221. During a swing of the arm 125, as explained in more detail below, the rear slider block 222 can be moved to contact the bumper 221a of the shock absorber 221. The bumper 221a is made of any material, such as rubber, that can elastically absorb the force with which the rear slider block 222 contacts the shock absorber 221 during a swing of the arm 125. (The effect of this shock absorbing will be clearer in view of the description of FIGS. 6A through 6K below.) The shock absorber 221 also includes a dampening adjuster 221b which can be used to control an orifice of the shock absorber 221 to change the compression of the shock absorber 221, i.e., to change the force dampening capability of the shock absorber 221.

The gripper retaining section 203 includes a gripper mount 224, a latch mount 225 and the latches 208 and 209. The gripper mount 224 can be made of any sufficiently strong and rigid material. Illustratively, the gripper mount 224 is made of aluminum. Aluminum is desirable to minimize the weight of the gripper mount 224, so that the weight of the gripper mount 224 is small relative to the weight of the implement being swung, thereby minimizing the effect of the gripper mount 224 during a swing. Further, the gripper mount 224 can be formed of any appropriate shape that provides sufficient strength and rigidity, and that does not interfere with the movement of the moving parts of the latch actuating mechanisms. As shown in FIG. 2, the gripper mount 224 is formed with a recess that allows movement of the actuator blocks 210 and 215. The gripper mount 224 is also formed with a second recess within which an end of the gripper 204 is fitted so that the gripper 204 can be rotatably attached to the gripper retaining section 203 and so that interference between the gripper retaining section 203 and the gripper 204 does not occur during rotation of the gripper 204.

The latch mount 225 can be made of any suitable material (such as, for example, any metal) and attached to the gripper mount 224 in any suitable manner (such as, for example, by using nuts and bolts). (The hole 306 in FIG. 3A, below, is an attachment hole for the latch mount 225.) The latches 208 and 209 are each rotatably attached to the latch mount 225.

Each of the latches 208 and 209 are sandwiched by two thrust bearings and held in place by bolts 208a and 209a, respectively.

Each of the latches 208 and 209 is formed with a recessed portion within which an actuator rod attachment pin 208b or 209b, respectively, fits. The actuator rods 212 and 217 are attached to the pins 208b and 209b, respectively, in any suitable manner (such as, for example, by using nuts and bolts). Because the pins 208b and 209b are offset from the axis of rotation of the latches 208 and 209, respectively, movement of the actuator rods 212 and 217, respectively, causes rotation of the latches 208 and 209, respectively, about the corresponding shaft extensions. Each of the latches 208 and 209 is also formed with a recess that is sized and shaped to receive the pin 226 formed on the gripper 204. The interaction of the pin 226 with the recesses of the latches 208 and 209 can cause the gripper 204 to be locked in place with respect to the rest of the arm 125, as will be described in more detail below with respect to FIGS. 6A through 6K. Illustratively, each of the latches 208 and 209, and the pin 226 can be made of a suitably strong material such as high strength tool steel.

FIGS. 3A through 3D are views of a portion of the arm 125, illustrating the connection between the gripper retaining section 203 and the gripper 204 of the arm 125, the face angle plate 318, and the construction of the gripper 204. (Some parts of the arm 125 have been removed from FIGS. 3A and 3B for clarity.) As indicated above, the gripper retaining section 203 is formed with a recess within which the gripper 204 fits. This recess is defined by the arms 301a and 301b of the gripper retaining section 203. Holes 302a and 302b are formed through the arms 301a and 301b, respectively. Shaft extensions (not shown) are formed opposite each other on the gripper 204 and extend through the corresponding holes 302a and 302b of the gripper retaining section 203. Bearings (not shown) are disposed between the shaft extensions and the gripper retaining section 203 to enable the gripper 204 to rotate with respect to the gripper retaining section 203. The shaft extension that fits through the hole 302b is stepped so that the gripper 204 is pushed against the bearing associated with the arm 301a and a wrist control gear 304 (shown in more detail in FIG. 3B) that is positioned between the bearing and the arm 301a.

Figure 3A:
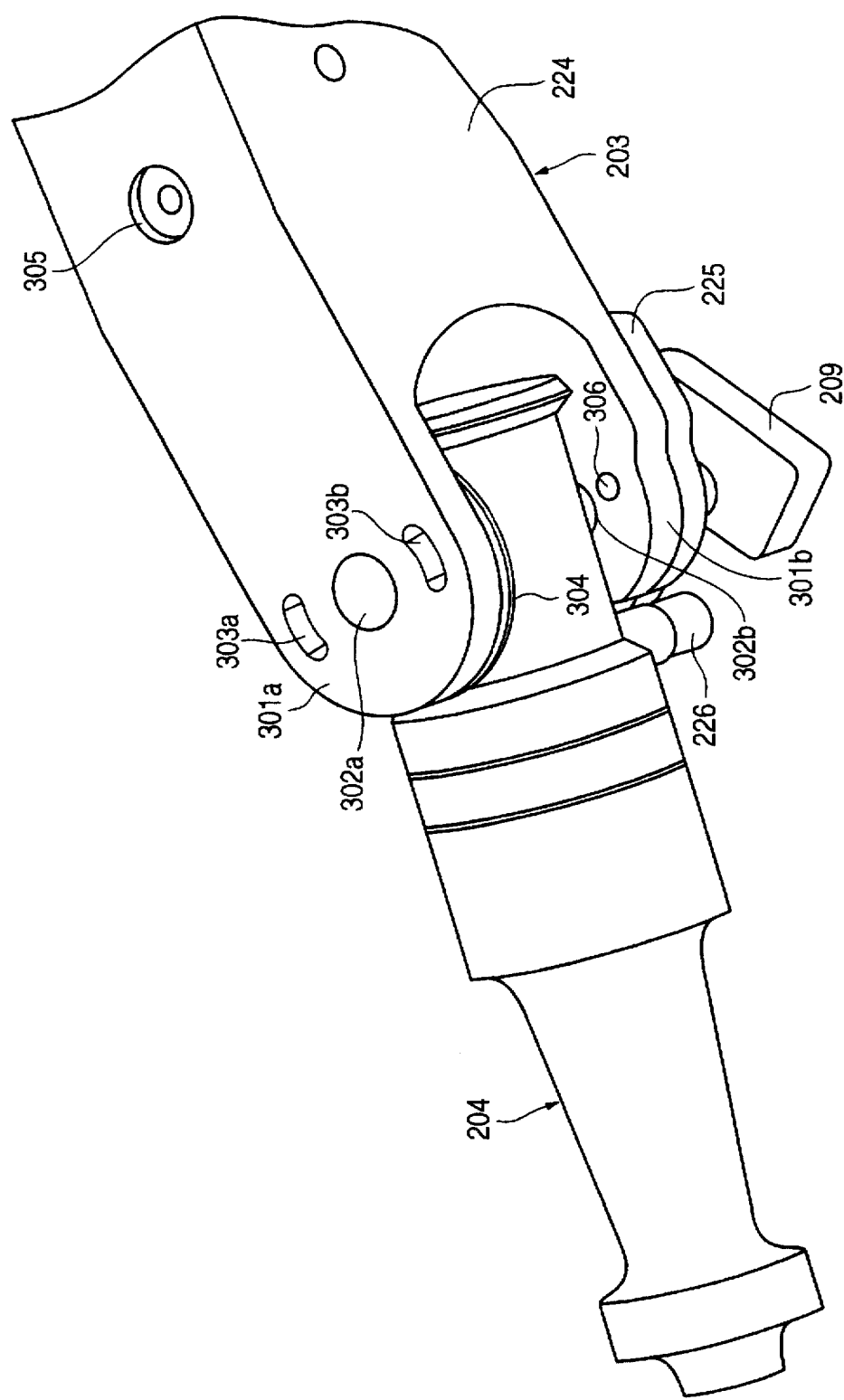
FIG. 3A is a perspective view of a portion of the arm of FIG. 2, illustrating the connection between the gripper retaining section and gripper of the arm.

As shown in FIG. 3C, a face angle plate 318 is positioned on the arm 301a of the gripper retaining section 203. The face angle plate 318 has a shaft extension (not shown) that fits into the hole 302a (FIG. 3A) so that the face angle plate 318 rotates about the axis of the hole 302a. The shaft extension of the face angle plate 318 fits into a hole formed in the shaft extension of the gripper 204 that also fits in the hole 302a, a bearing being disposed between the shaft extensions to allow rotation therebetween. The face angle plate 318 is held in place by screws 319, 320a and 320b. The screws 320a and 320b extend through corresponding gripper index slots 303a and 303b (FIG. 3A) formed in the arm 301a into threaded holes formed in the wrist control gear 304 to fasten the face angle plate 318 to the wrist control gear 304. The screw 319 threads into the hole 305 (FIG. 3A) to fasten the face angle plate 318 to the gripper retaining section 203. When the screws 319, 320a and 320b are loosened (note, however, that the screws 320a and 320b are not withdrawn from the corresponding holes in the wrist control gear 304), the face angle plate 318 (and, as a result, the wrist control gear 304) can be rotated about that axis of the hole 302a, so that the screws 320a and 320b are moved to any desired position within the slots 303a and 303b. As described below, this causes the gripper 204 to be rotated about a longitudinal axis (axis 323 in FIG. 3B) of the gripper 204. When the apparatus 100 is used to swing a golf club, this rotation about the longitudinal axis 323 of the gripper 204 affects the position of the face of the golf club at impact with the golf ball. (Note that the face angle plate 318 and associated wrist control gear 304 are not present on a batting machine according to the invention such as the batting machine 1100 shown in FIGS. 11A and 11B.) The face angle plate 318 is marked with a scale to indicate the angular position (for a golf club, the amount by which the clubface has been opened or closed) with respect to a reference position (for a golf club, when the clubface is "square").

Figure 3B:
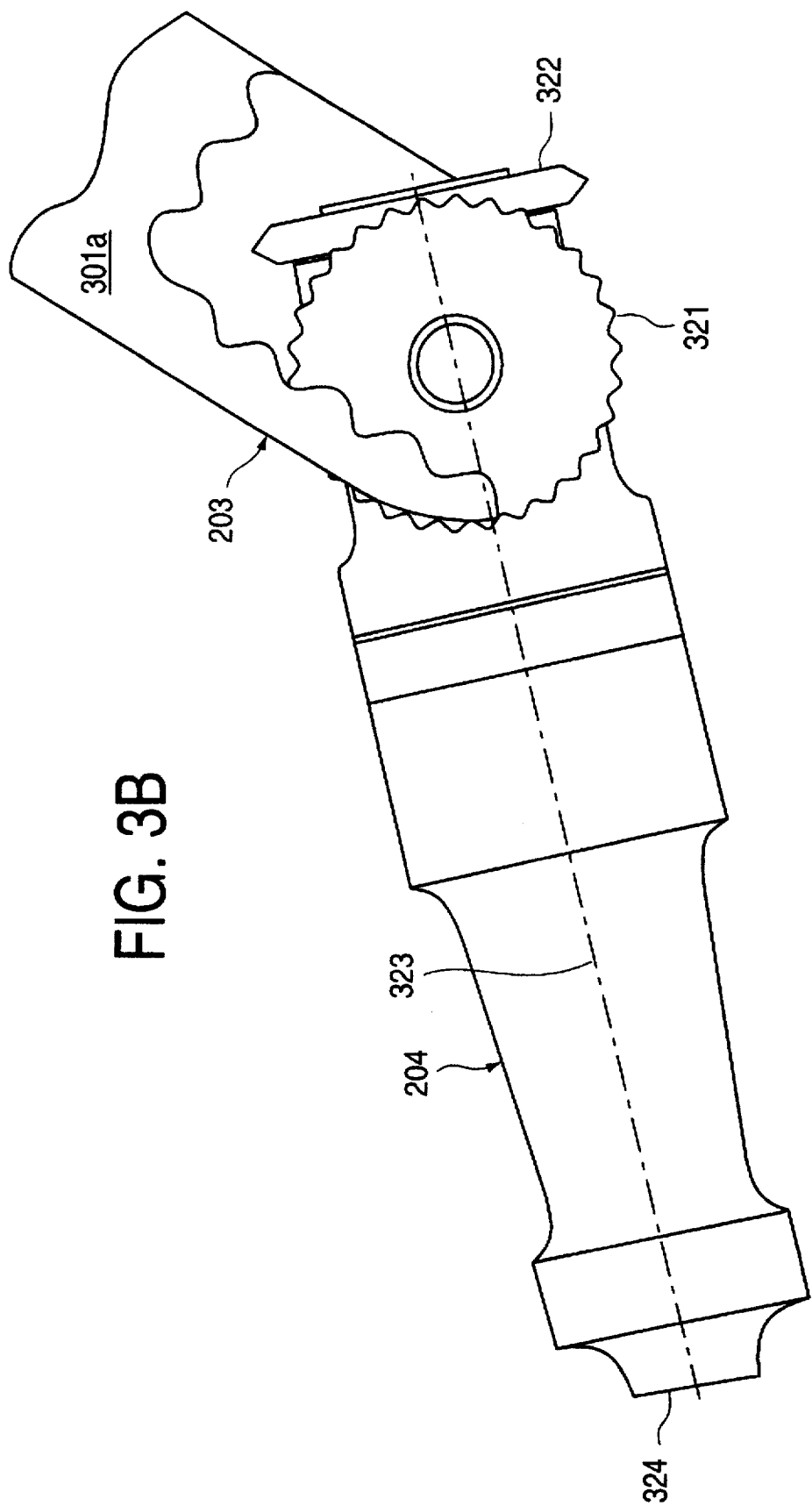
FIG. 3B is a cutaway plan view of the portion of the arm shown in FIG. 3A, illustrating the mechanism for rotating the gripper about the longitudinal axis of the gripper.

FIG. 3B is a cutaway plan view of the portion of the arm 125 shown in FIG. 3A, illustrating the mechanism for rotating the gripper 204 about the longitudinal axis 323 of the gripper 204. A driving gear 321 is rotatably mounted (e.g., with a bearing) on the shaft extension of the gripper 204 that fits within the hole 302a of the arm 301a. A driven gear 322 is rigidly attached (by, for example, being bolted and pinned) to the end of the gripper 204 that fits within the recess of the gripper retaining section 203. This positioning of the gears 321 and 322 causes the axes of rotation of the gears to be substantially perpendicular to each other. The gears 321 and 322 are positioned so that the teeth of the gears 321 and 322 mesh. Rotation of the gear 321, in turn, causes the gear 322 to rotate about the longitudinal axis 323. Since the gear 322 is rigidly attached to the gripper 204, the gripper 204 is also caused to rotate about the longitudinal axis 323. The implement, e.g., golf club, that is being swung is held in place, as described below, at the end 324 of the gripper 204. The amount of rotation of the gripper 204 that can be imparted by a given movement of the face angle plate 318 is determined by the gear ratio between the gears 321 and 322. Illustratively, the gear ratio can 1:1. Thus, since, as described below, during a swing the gripper 204 is rotated 180 degrees about the axis of rotation of the gear 321 (the lead/lag axis), the gripper 204 is also rotated 180 degrees about the axis (axis 323) of rotation of the gear 322 (the open/close axis). Movement of the face angle plate 318 causes the gear 321 (and, thus, the gear 322) to be rotated so that the angular position of the gripper 204 about the open/close axis is offset from the reference position.

FIG. 3C illustrates the construction of the gripper 204. The gripper 204 is formed in two sections 311 and 312. The section 311 includes threaded members 315a through 315d. The section 311 includes holes 314a through 314d. The section 311 is mated with the section 312 so that the threaded members 315a through 315d fit through corresponding holes 314a through 314d. Nuts 313a through 313d are screwed onto the corresponding threaded members 315a through 315d and tightened to hold the sections 311 and 312 together. Corresponding recesses 317 and 316 are formed in the sections 311 and 312, respectively, so that, when the sections 311 and 312 are assembled, a hole is formed in the gripper 204. The implement to be swung is positioned in one of the recesses 316 or 317 while the sections 311 and 312 are being assembled, so that when the sections 311 and 312 are fastened together, the implement is held in the gripper 204. The recesses 316 and 317 are appropriately sized and shaped as necessary to effect adequate gripping of the implement.

Figure 3D:
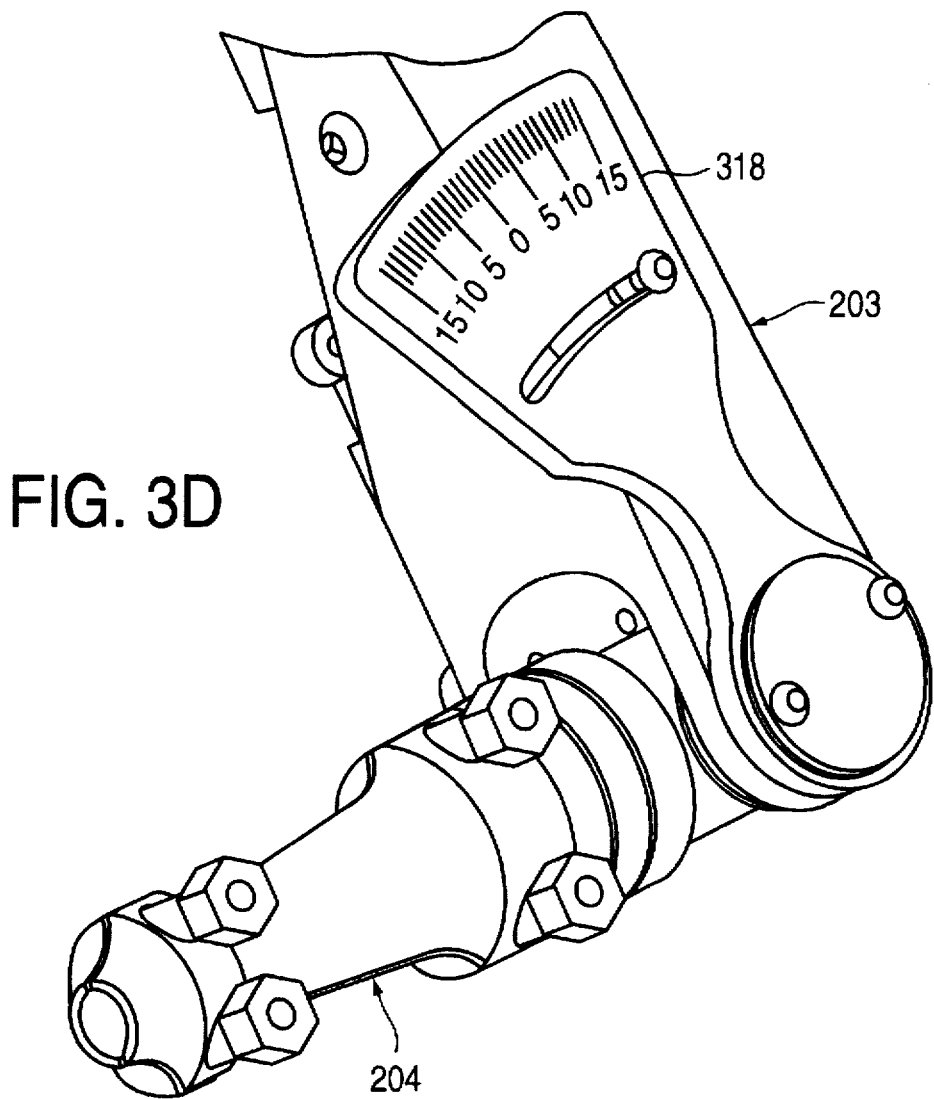
FIG. 3D is a perspective view of a portion of the arm of FIG. 2, illustrating the gripper fully assembled.

FIG. 3D illustrates the gripper 204 after the gripper 204 has been assembled (without insertion of an implement to be swung).

As indicated above, during a swing, air is supplied through the air supply lines 214 and 219 to control the release latch 208 and deceleration latch 209. FIG. 4 is a cutaway cross-sectional view of a portion of the apparatus 100 (FIG. 1A), illustrating the structure for supplying air to effect operation of the release latch 208 and deceleration latch 209 of the arm 125. (Some details of the apparatus 100 that are shown in FIG. 4 are not shown in FIG. 1A.) A control box 401 is attached to the plate 124 between the plate 124 and the plate 123 (FIG. 1A). The compressor 131 (FIG. 1A) supplies air to and removes air from each of two solenoid valves (not shown) positioned within the control box 401. The solenoid valves are controlled to supply air to, or remove air from, the corresponding air supply lines 402 and 403.

A stationary manifold block 404 is rigidly attached (by, for example, bolting) within a hole through the plate 124. The shaft 126 extends through the stationary manifold block 404. The shaft 126 is allowed to rotate with respect to the stationary manifold block 404 by bearing (dynamic) seals 405 positioned in grooves of the stationary manifold block 404 adjacent the shaft 126. The dynamic seals 405 also prevent air from escaping at the interface between the shaft 126 and the stationary manifold block 404. Two air passages 404a and 404b are formed in the stationary manifold block 404. The air supply lines 402 and 403 are attached to the stationary manifold block 404 so that the air supply lines 402 and 403 can supply air to the air passages 404a and 404b, respectively. The air passages 404a and 404b extend about the entire inner periphery of the stationary manifold block 404.

A rotating manifold block 412 is positioned on the shaft 126. A bearing 411 is rigidly attached (by, for example, bolting) to the plate 124 between the plate 124 and the rotating manifold block 412 so that the rotating manifold block 412 can rotate with respect to the plate 124. The shaft 126 extends through both the rotating manifold block 412 and the bearing 411. The mounting boss 201 of the arm 125 is attached to the shaft 126 on the other side of the rotating manifold block 412. The mounting boss 201 compresses the rotating manifold block 412 against the bearing 411 so that friction holds the rotating manifold block in place with respect to the rotating shaft 126 and mounting boss 201. Stationary seals 413 are positioned in grooves of the rotating manifold block adjacent the shaft 126, the stationary seals 413 preventing air from escaping at the interface between the shaft 126 and the rotating manifold block 412. Two air passages 412a and 412b are formed in the rotating manifold block 412. Flexible air supply lines 409 and 410 are rigidly attached to the rotating manifold block 412 so that the air supply lines 409 and 410 can receive air from, and supply air to, the air passages 412a and 412b, respectively. The air passages 412a and 412b extend about the entire inner periphery of the rotating manifold block 412.

Air passages 406a and 406b are formed in the shaft 126 so that the air passages 406a and 406b are connected to the air passages 404a and 404b, respectively. Similarly, air passages 408a and 408b are formed in the shaft 126 so that the air passages 408a and 408b are connected to the air passages 412a and 412b, respectively. An air passage 407a is formed longitudinally in the shaft 126 and extends between the air passages 406a and 408a. An air passage 407b is formed longitudinally in the shaft 126 and extends between the air passages 406b and 408b.

During operation of the apparatus 100, the appropriate solenoid valve in the control box 401 can be controlled (automatically, if desired, by a digital computer) to control the flow of air between the air compressor 131 and the air cylinder 211 or 216 to control the release latch 208 and deceleration latch 209, respectively, as described in more detail below. The air to the air cylinder 211 follows a path from the air compressor 131 through the air supply line 403, the air passages 404b, 406b, 407b, 408b, 412b, and the air supply lines 410 and 214 (FIG. 2). The air to the air cylinder 216 follows a path from the air compressor 131 through the air supply line 402, the air passages 404a, 406a, 407a, 408a, 412a, and the air supply lines 409 and 219 (FIG. 2).

Figure 5:
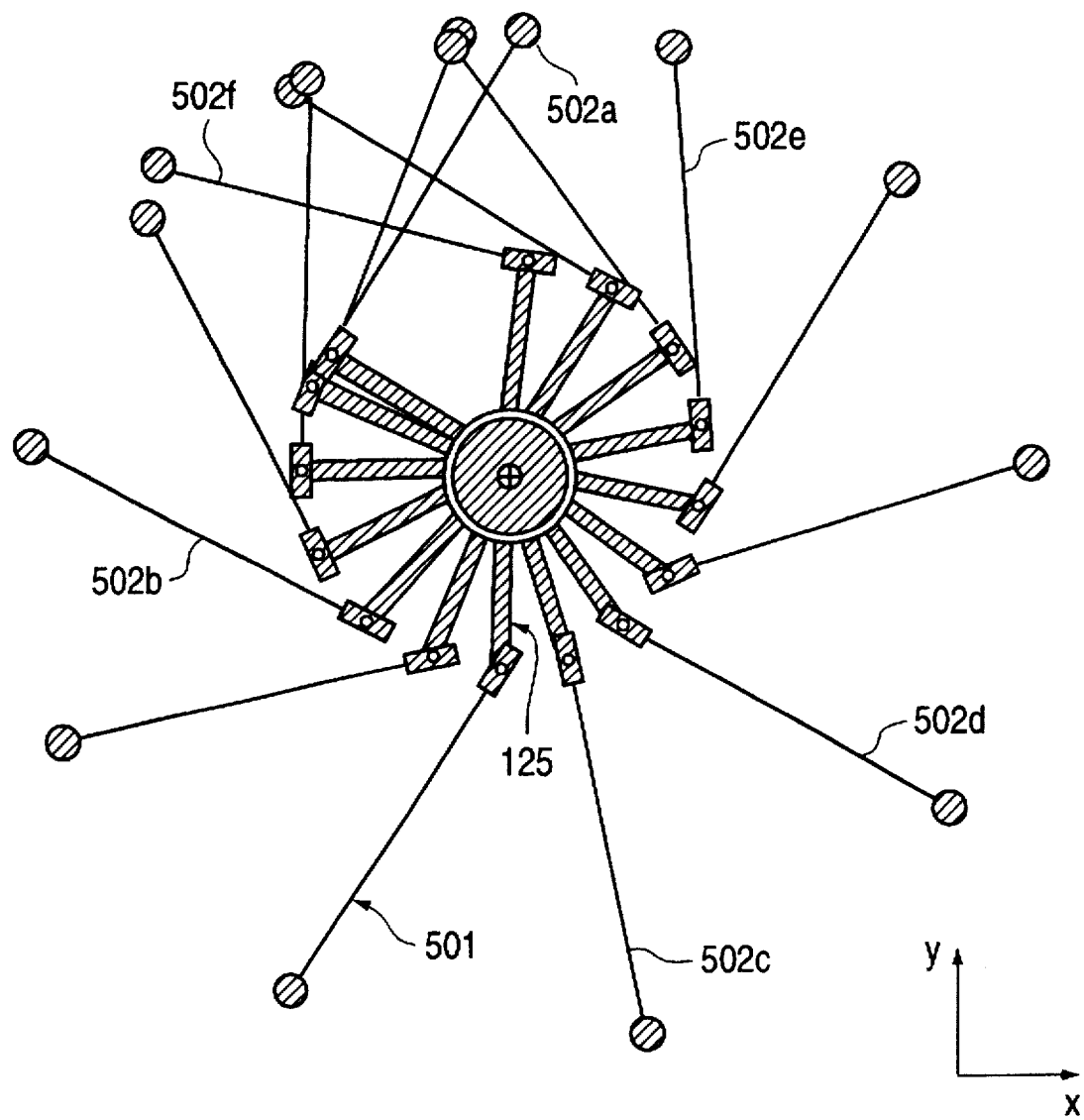
FIG. 5 is a simplified plan view of the arm shown in FIG. 1A, viewed in a direction parallel to the axis of rotation of the arm, illustrating the swing motion of the arm and an implement being swung by the arm.

As indicated above, when the arm 125 swings an implement, the gripper 204 and gripper retaining section 203 rotate with respect to each other, simulating the wrist rotation of a human arm during a swinging motion. FIG. 5 is a simplified plan view of the arm 125, viewed in a direction parallel to the axis of rotation of the arm 125, in each of a multiplicity of positions, illustrating, during a forward swing, the motion of the arm 125 and an implement 501 (which has the same orientation as the gripper 204 of the arm 125) being swung by the arm 125. FIGS. 6A through 6K are plan views of a portion of the arm 125, viewed in a direction opposite that of FIG. 5, illustrating the gripper retaining section 203 and gripper 204 during various stages of a swinging motion of the arm 125. In FIGS. 5 and 6A through 6K, the illustrated swinging motion is one which can be used in swinging, for example, a golf club. However, the implement 501 can be any other device. In FIGS. 5 and 6A through 6K, an x-y coordinate system is superimposed on the figures to make clear the orientation of the gripper retaining section 203 and gripper 204 in each figure.

Prior to beginning a swing, the arm 125 is held in a ready position in which the arm 125 is generally pointed down at the platform 103 (FIG. 1A) in the "6 o'clock position", i.e., in the direction of the negative y-axis in FIG. 5, or down, as viewed in FIG. 5. (This position is not shown in FIG. 5.) The gripper 204 (and, thus, the implement) is held at a 90 degree angle with respect to the rest of the arm 125, as described below.

Figure 6A:
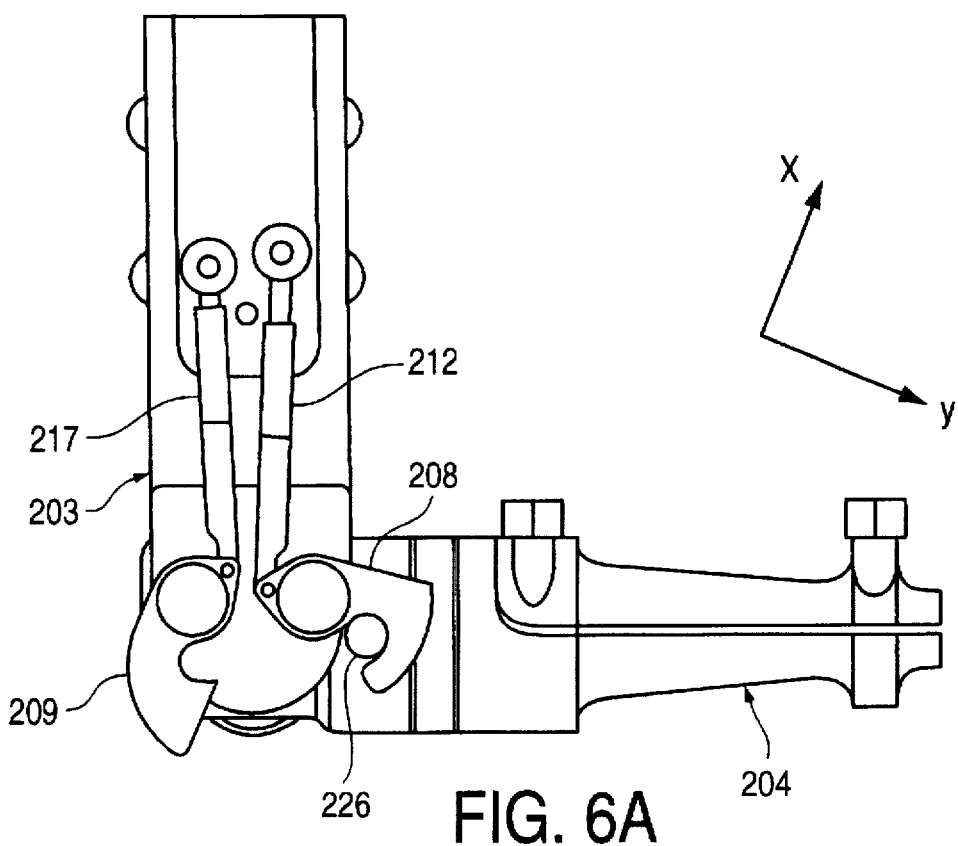
FIGS. 6A through 6K are plan views of a portion of the arm of FIG. 2, viewed in a direction opposite that of FIG. 5, illustrating the gripper retaining section and gripper during various stages of a swinging motion of the arm.

FIG. 6A illustrates the relative positions of the gripper retaining section 203 and gripper 204 in the above-described ready position. (Note, however, that the orientation of the gripper retaining section 203 and gripper 204 with respect to the x-y axis system, when in the ready position, is not as shown in FIG. 6A; the orientation shown in FIG. 6A corresponds to the position 502a shown in FIG. 5, as described below.) In the ready position, the release latch 208 engages the pin 226 to hold the gripper 204 in place at a 90 degree angle with respect to the gripper retaining section 203. The release latch 208 is held in the position shown in FIG. 6A by the first latch actuating mechanism. When the arm 125 is in the ready position, no air is supplied to the air cylinder 211. The corresponding "natural" position of the piston of the air cylinder 211 causes the spring 213 to be elongated from an unstressed position, thereby imparting a force on the actuator block 210 that pulls the actuator block 210 away from the release latch 208. The actuator block 210, in turn, pulls the actuator rod 212 so that a clockwise rotation (as viewed in FIG. 2) is imparted to the release latch 208. Thus, the release latch 208 remains positioned against the pin 226, as shown in FIG. 5, a portion of the release latch 208 encircling the pin 226 to hold the pin 226 (and, thus, the gripper 204) in place against the force of gravity.

Each swing includes two parts: a backswing and a forward swing. The backswing (i.e., rotation of the arm 125 in a clockwise direction, as viewed in FIG. 5) begins from the above-described ready position. During the backswing, the gripper retaining section 203 and gripper 204 remain in the above-described relative position, i.e., at a 90 degree angle with respect to each other. The gripper 204 is held in this position by engagement of the release latch 208 with the pin 226. The backswing ends when the arm reaches the position 502a in FIG. 5. The gripper retaining section 203 and gripper 204 are shown in this position in FIG. 6A.

Figure 6B:
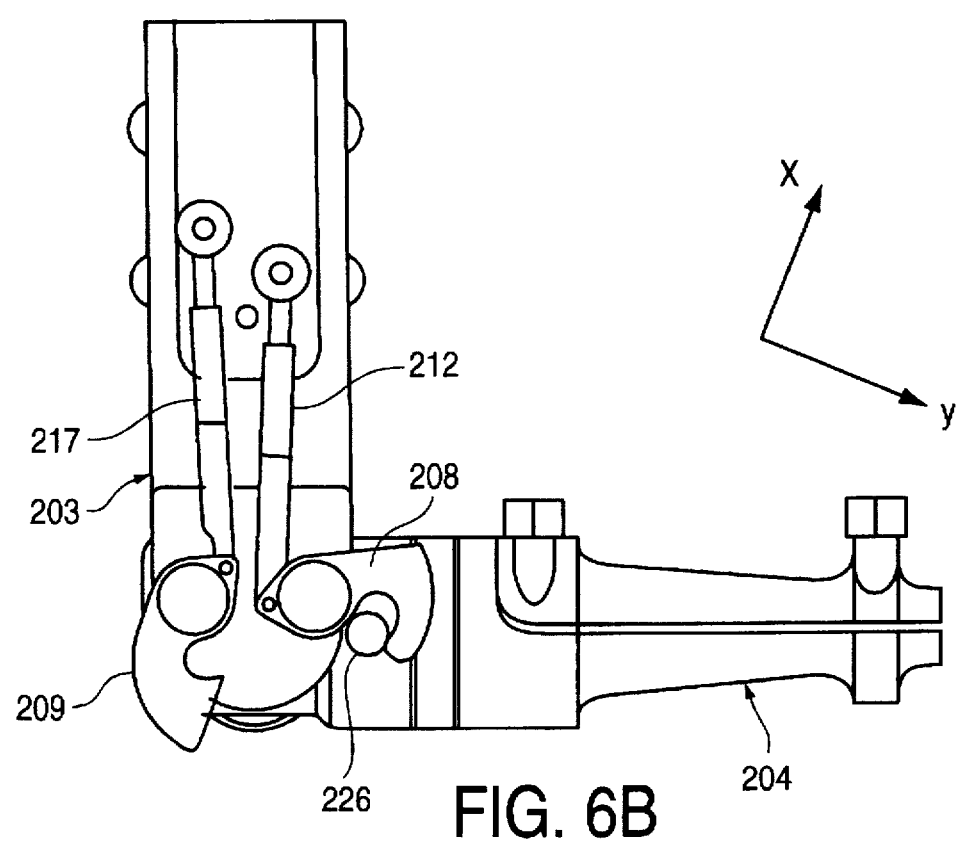

At the initiation of the forward swing (i.e., the arm 125 begins to rotate counterclockwise, as viewed in FIG. 5), the release latch 208 is rotated to disengage the release latch 208 from the pin 226, as described below. At this point, both the gripper retaining section 203 and the gripper 204 are in essentially the same positions as at the end of the backswing (i.e., in the same position as shown in FIG. 6A). FIG. 6B illustrates the gripper retaining section 203 and gripper 204 just after the release latch 208 has opened. Referring back to FIG. 2, air is supplied to the air cylinder 211, causing the piston of the air cylinder 211 to move toward the actuator block 210, thereby causing the actuator block 210 to move toward the release latch 208. The movement of the actuator block 210 pushes the actuator rod 212 so that a counterclockwise rotation (as viewed in FIG. 2) is imparted to the release latch 208. Consequently, as seen in FIG. 6B, the release latch 208 disengages from the pin 226 and the gripper 204 is free to rotate with respect to the gripper retaining section 203.

Figure 6C:
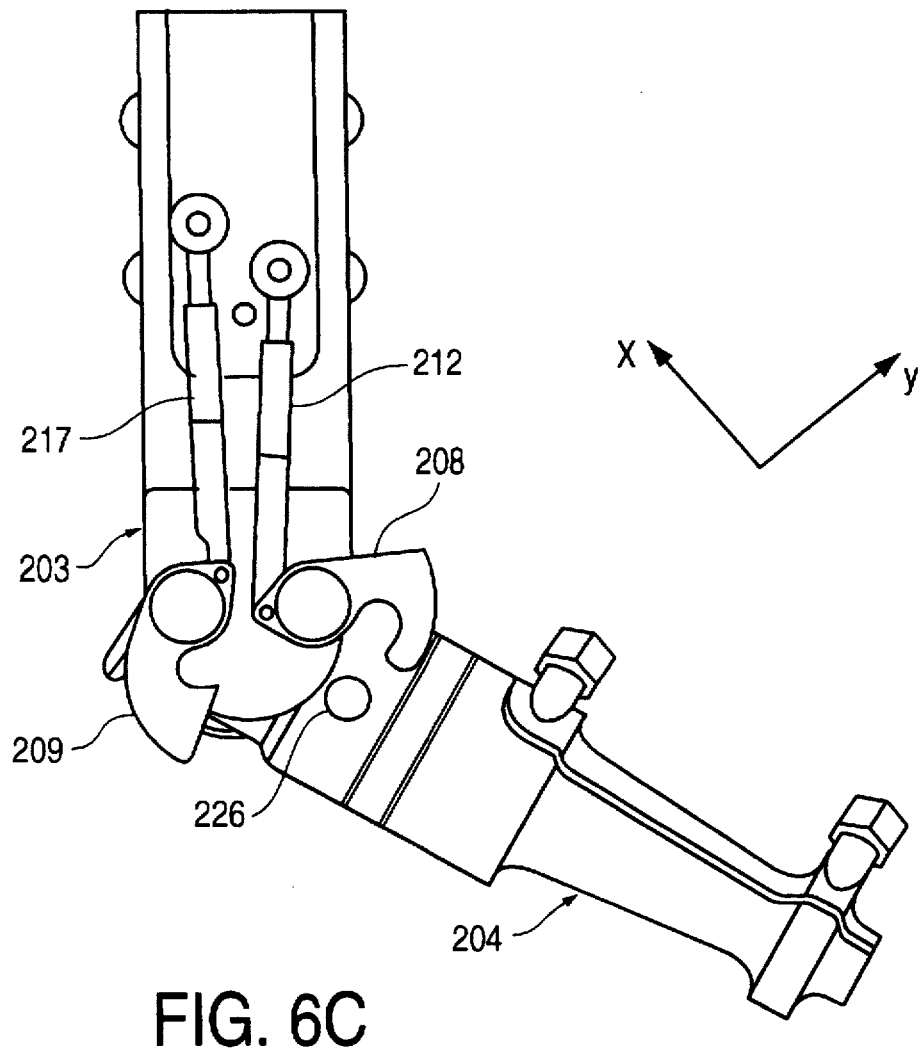

During the swing, the latch actuating mechanisms do not operate and the gripper 204 rotates freely with respect to the rest of the arm 125 (aside from the restraint imposed by the deceleration latch 209, as described below). When the arm 125 begins swinging, centrifugal force associated with the swing causes the implement 501 to rotate so as to align with the arm 125. In other words, the gripper 204 rotates with respect to the gripper retaining section 203 in a counterclockwise direction, as viewed in FIG. 5 (and a clockwise direction, as viewed in FIG. 6B), relative to the rest of the arm 125. The position 502b shown in FIG. 5 is a position at which such relative rotation of the gripper 204 is occurring. FIG. 6C illustrates the gripper retaining section 203 and gripper 204 in the position 502b. As discussed below, the arm 125 can be rotated with any desired velocity and acceleration profiles to cause the implement 501 to rotate with respect to the arm 125 in a particular manner.

Figure 6D:
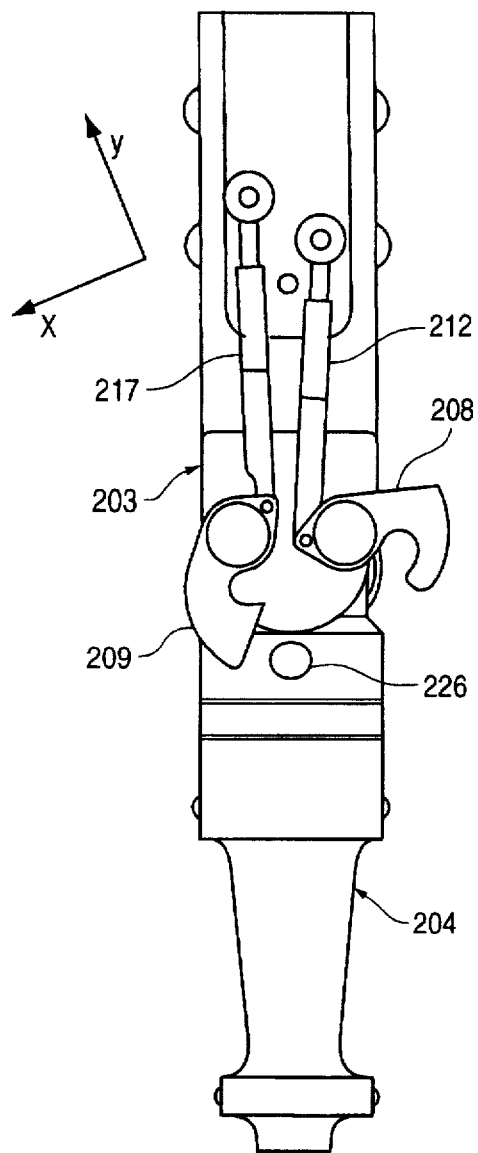

FIG. 6D illustrates the gripper retaining section 203 and gripper 204 in a position just before the deceleration of the arm 125 causes the gripper 204 to contact the deceleration latch 209. The position shown in FIG. 6D is intermediate the positions 502c and 502d shown in FIG. 5 (thus, the swing illustrated in FIG. 5 is a lagging swing, as discussed in more detail below, and illustrated also in FIG. 10C).

Figure 6E:
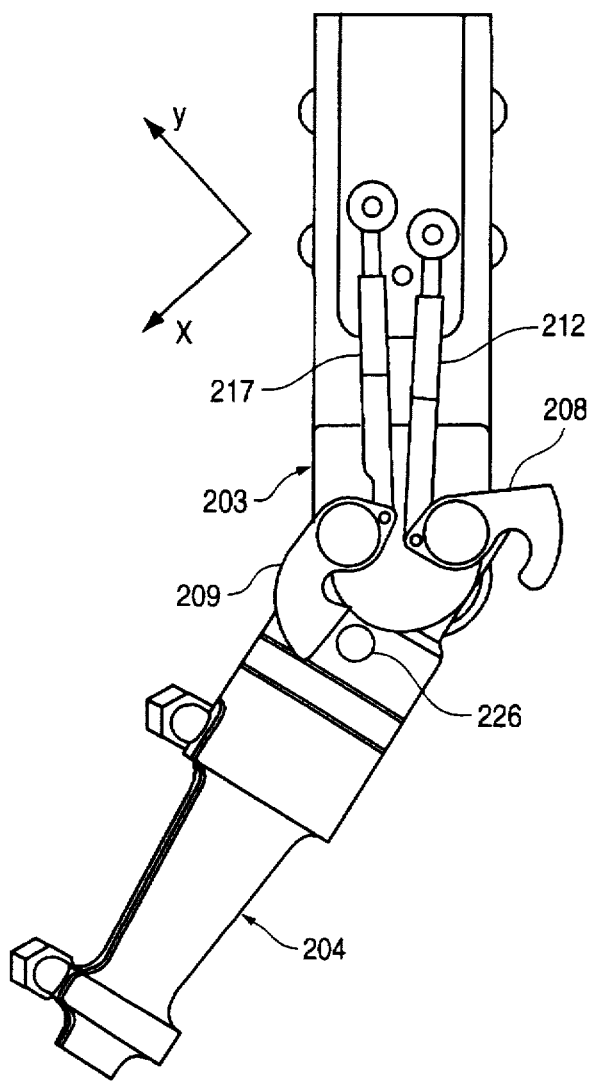

Eventually, the gripper 204 rotates far enough with respect to the rest of the arm 125 so that the pin 226 on the gripper 204 contacts the deceleration latch 209. The position 502d is in a position in which such contact has occurred. FIG. 6E illustrates the gripper retaining section 203 and gripper 204 in the position 502d. When the piston contacts the deceleration latch 209, the deceleration latch 209 is caused to rotate in a clockwise direction (as viewed in FIG. 6E). Referring back to FIG. 2, when the deceleration latch 209 rotates in a clockwise direction, the actuator rod 217 and, therefore, the actuator block 215 are pulled toward the deceleration latch 209. The movement of the actuator block 215 also pulls the actuator arm 223 and, therefore, the rear slider block 222 toward the deceleration latch 209. The rear slider block 222 contacts the shock absorber 221. The shock absorber 221 slows the above-described movement of the second latch actuating mechanism. Consequently, the rotation of the deceleration latch 209 (and, thus, the gripper 204 and implement 501) is slowed.

Eventually, the shock absorber 221 causes the deceleration latch 209 to bring the rotation of the implement 501 relative to the rest of the arm 125 to a halt. This occurs approximately at the position 502e in FIG. 5.

Figure 6F:
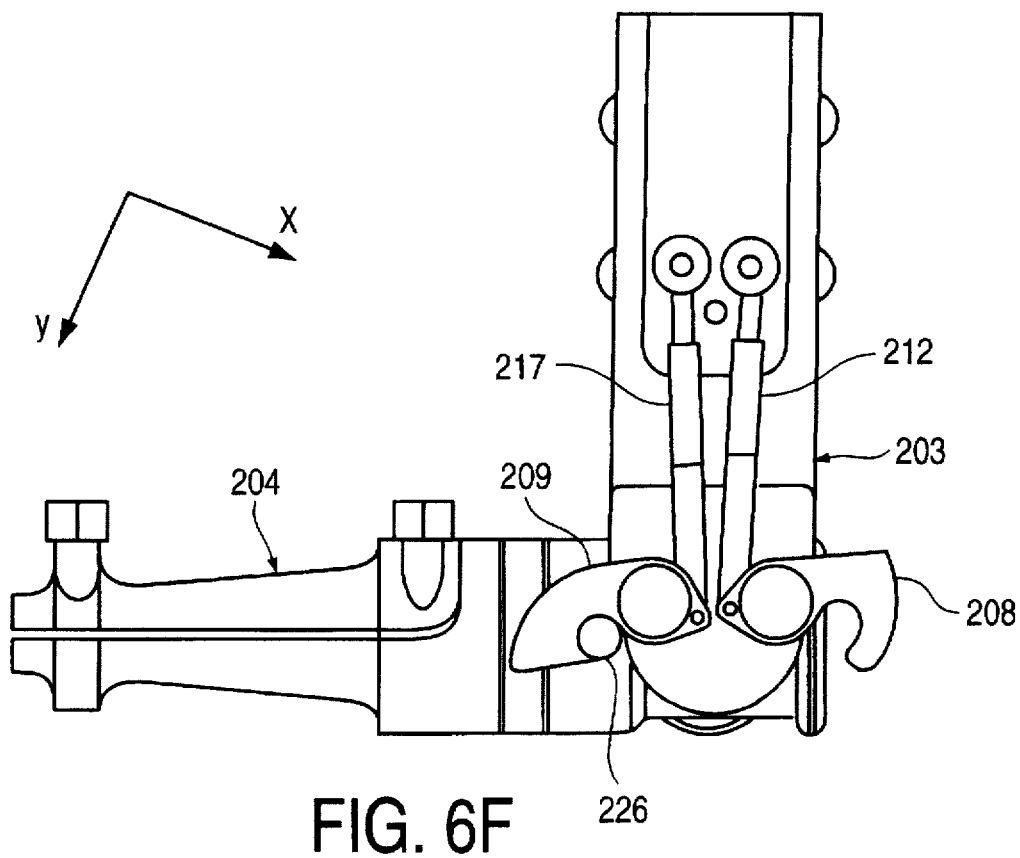

Finally, the arm 125 reaches a position 502f at which rotation of the arm 125 stops. FIG. 6F illustrates the relative positions of the gripper retaining section 203 and gripper 204 in the position 502f. In this position, the pin 226 is fully engaged in the deceleration latch 209.

Figure 6G:
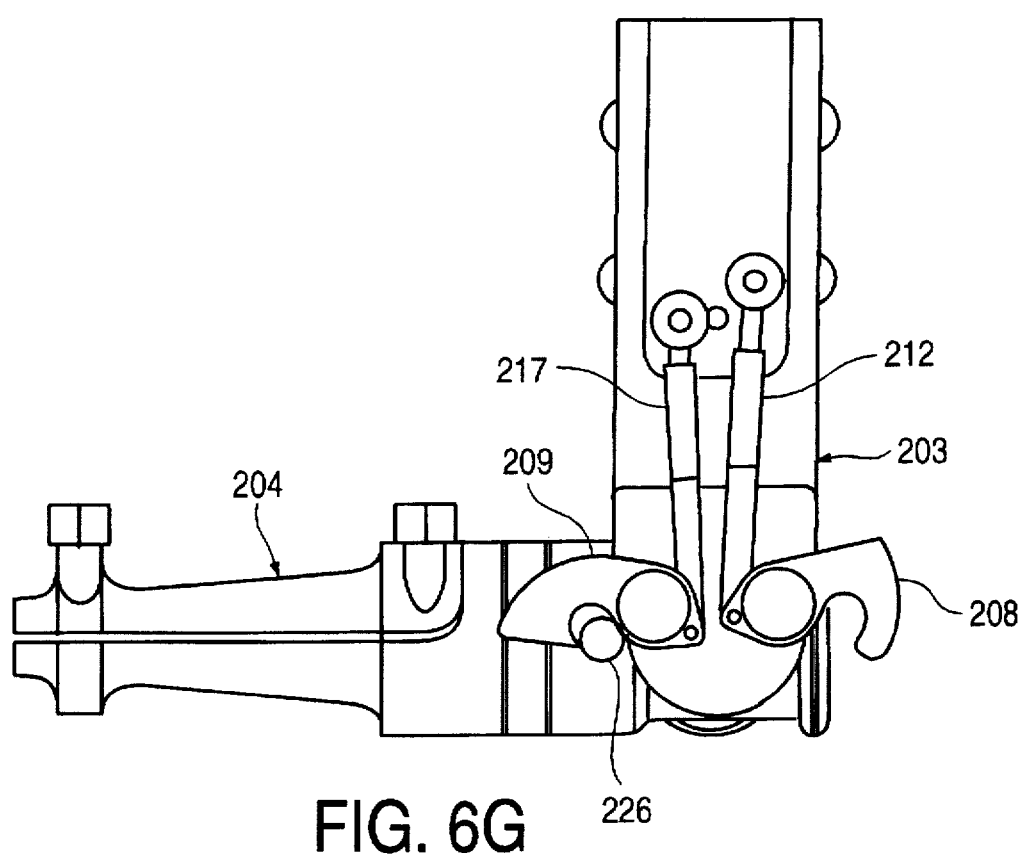

Once the forward swing has been completed, the arm 125 must be swung back to the ready position. Just prior to beginning to swing the arm 125 back to the ready position, the deceleration latch 209 is rotated to disengage the deceleration latch 209 from the pin 226. FIG. 6G illustrates the gripper retaining section 203 and gripper 204 just after the deceleration latch 209 is opened. Referring back to FIG. 2, air is supplied to the air cylinder 216, causing the piston of the air cylinder 216 to move toward the rear slider block 222 away from the air cylinder 216. The motion of the rear slider block 222 causes the actuator rod 223 to move the actuator block 215, which, in turn, pushes the actuator rod 217 so that the deceleration latch 209 is rotated in a clockwise direction, thus disengaging the deceleration latch 209 from the pin 226.

Figures 6H, 6I:
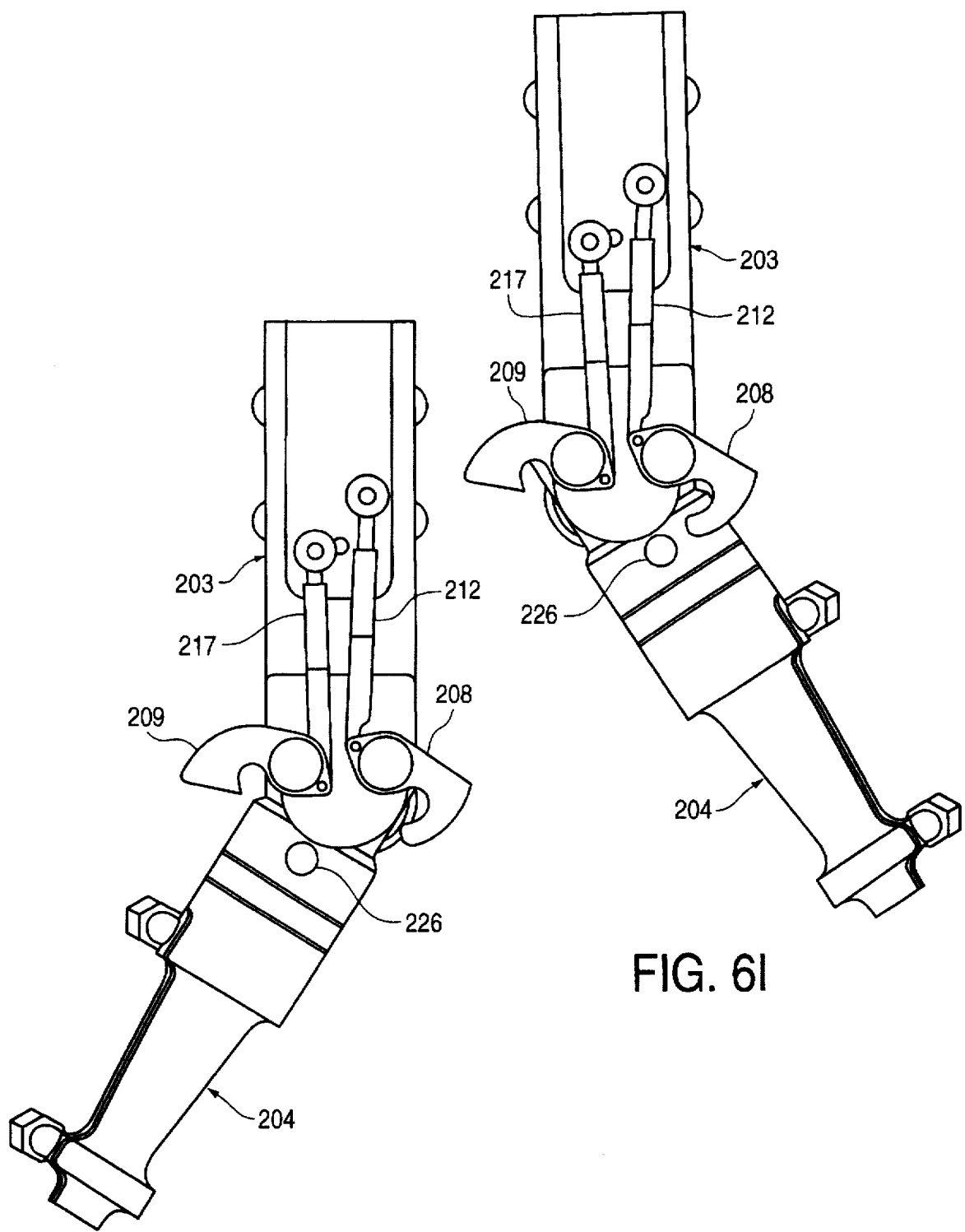
Figure 6J:
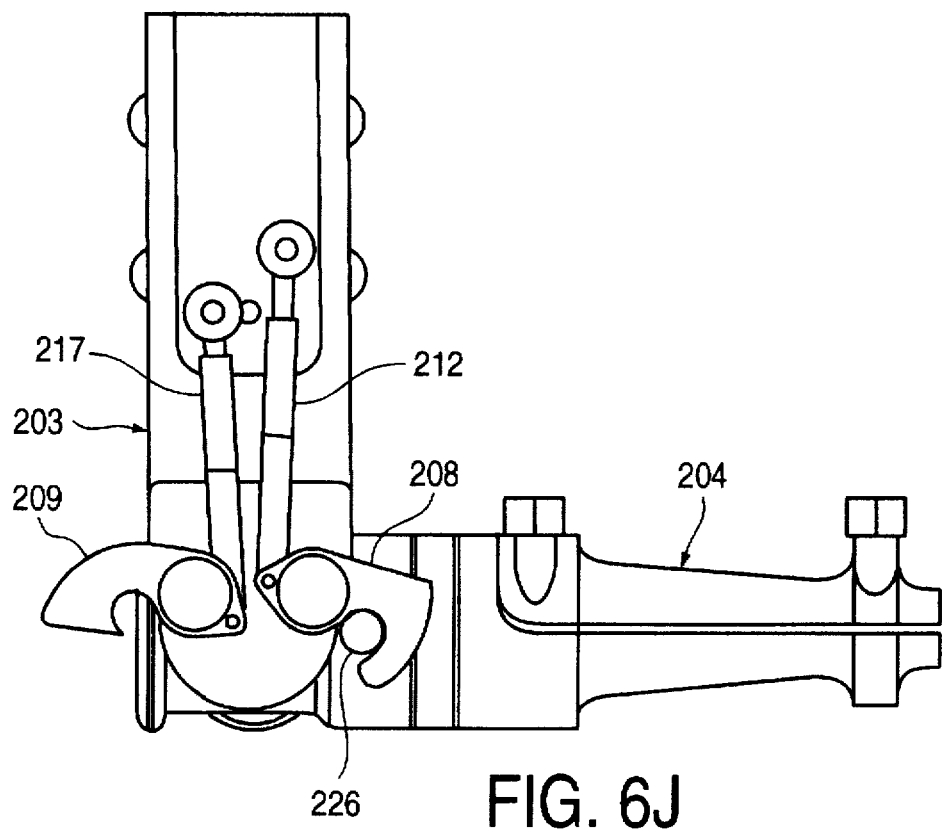

As the arm 125 begins rotating back to the ready position, the air is released from the air cylinder 211. The force of the spring 213, which was elongated by the release of the release latch 208, causes the actuator block 210 to move back away from the release latch 208, moving the release latch 208 into a closed position (see FIG. 6H). The force of gravity eventually causes the gripper retaining section 203 to begin to rotate away from the deceleration latch 209 (somewhere between the positions 502e and 502d shown in FIG. 5). FIGS. 6H and 6I show successive positions of the gripper 204 and gripper retaining section 203 during this rotation of the arm 125 that illustrate the relative rotation of the gripper 204 with respect to the gripper retaining section 203. Eventually, the gripper 204 is rotated so that the pin 226 engages with the release latch 208 again, as shown in FIG. 6J.

Figure 6K:
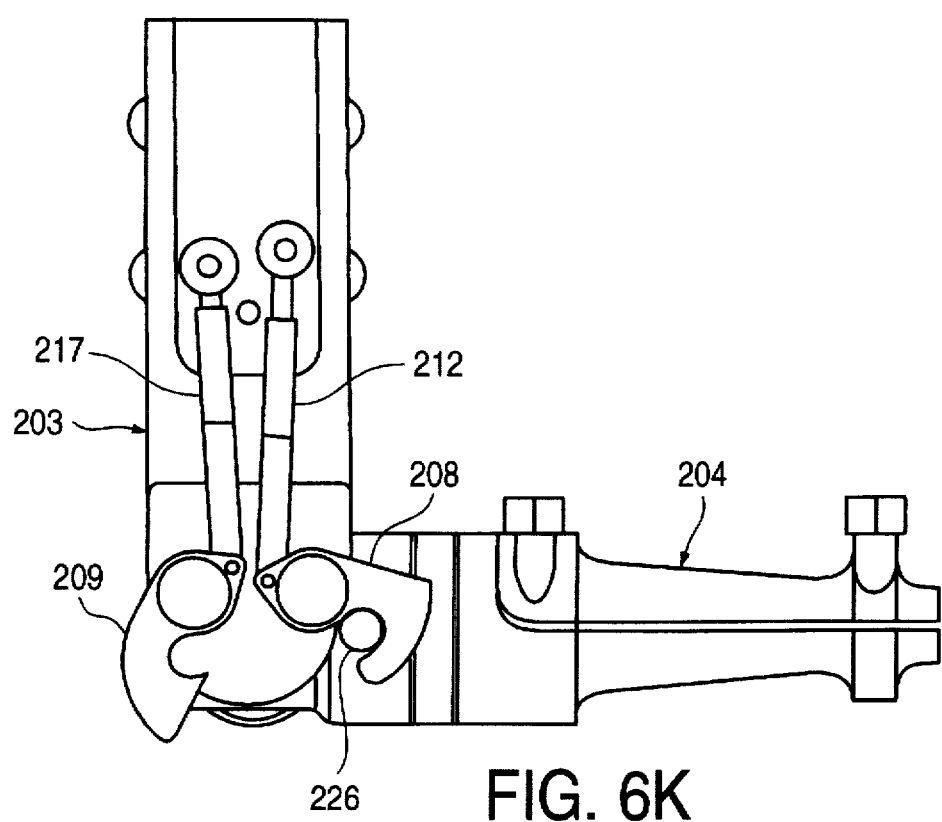

When the arm 125 finally reaches the ready position, rotation of the arm is stopped, and the deceleration latch 209 is released, as shown in FIG. 6K. Referring back to FIG. 2, air is released from the air cylinder 216, causing the piston of the air cylinder 216 to move away from the rear slider block 222 back to the "natural" position of the piston. This movement causes the rear slider block 222 to pull the actuator rod 223, actuator block 215, and actuator rod 217 so that the deceleration latch 209 is rotated in a counterclockwise direction back to the closed position of the deceleration latch 209. In the closed position, the deceleration latch 209 is again ready to act as a brake that retards the motion of the gripper 204 during the forward swing part of a swing.

Above the "wrist motion" of the centrifugal arm 125 has been described during a swing. With minor modification, the apparatus 100 can also be operated with an arm including a servo-driven wrist that enables the "wrist motion" to be controlled independently of the rotation of the arm.

Figure 7A:
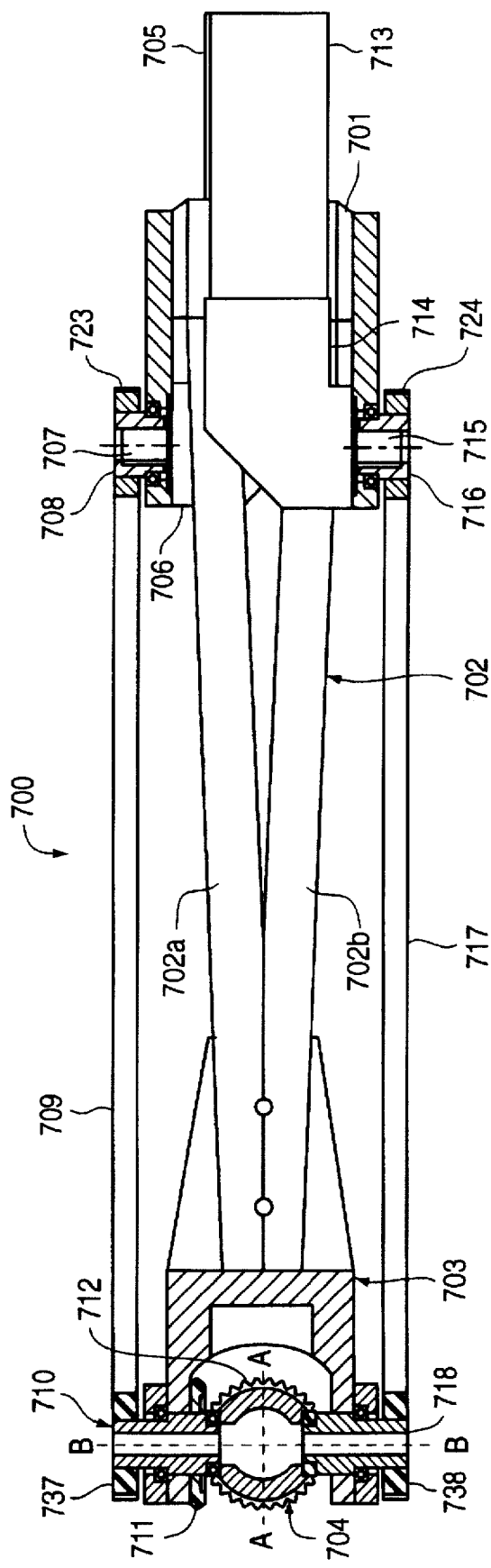
FIG. 7A is a side view, partially cut away to show certain cross-sections, of an articulated arm having a servo-driven wrist that can be used with the apparatus of FIG. 1A instead of the articulated arm having a centrifugally driven wrist that is shown in FIG. 2.
Figure 7B:
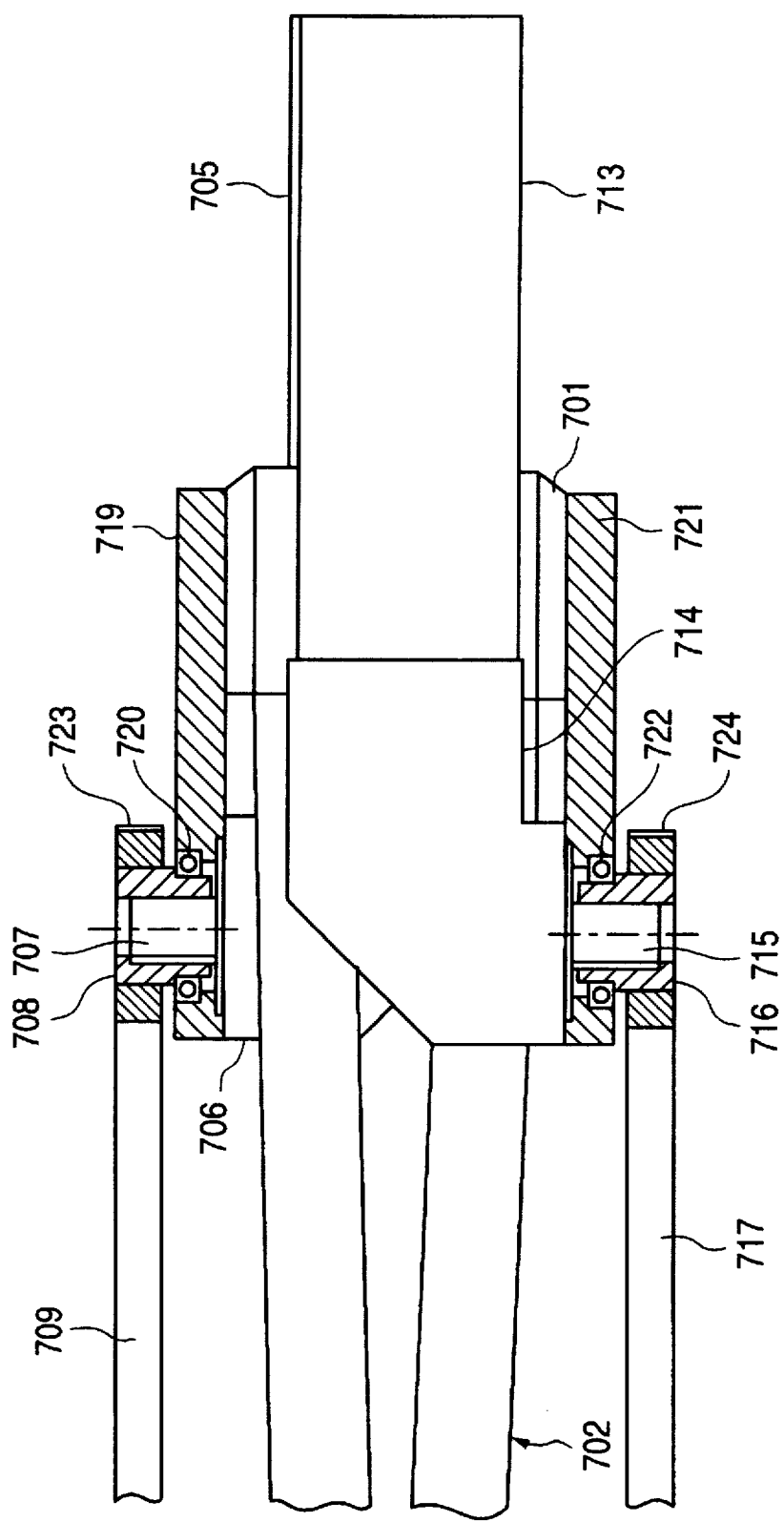
FIGS. 7B and 7C are detailed views of the drive portion and driven portion, respectively, of the arm of FIG. 7A.
Figure 7C:
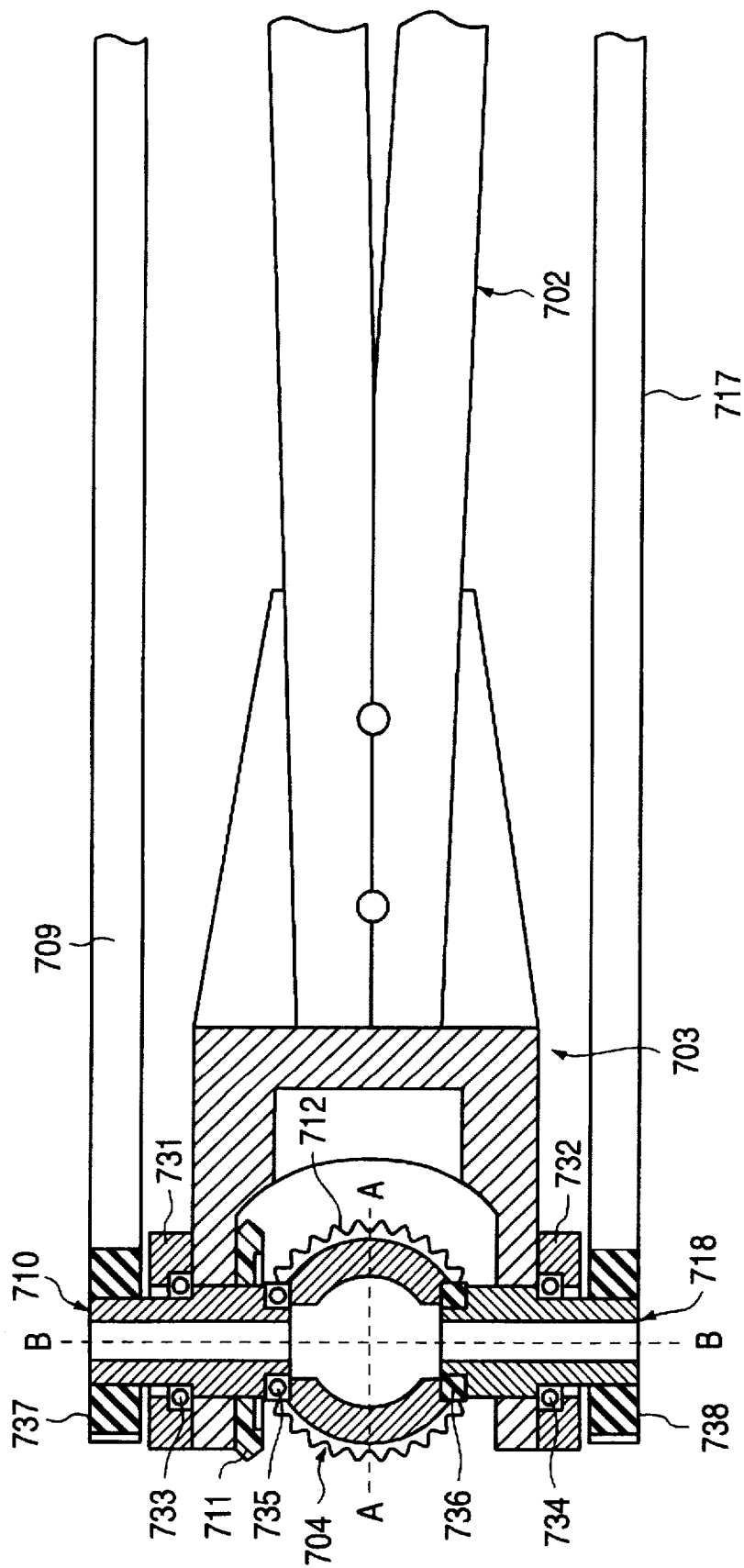

FIG. 7A is a side view, partially cut away to show certain cross-sections, of an articulated arm 700 ("servo arm") including a servo-driven wrist that can be used with the apparatus of FIG. 1A instead of the centrifugal arm 125. FIGS. 7B and 7C are detailed views of the drive portion and driven portion, respectively, of the servo arm 700. With minor modification to accommodate the presence of the additional servomotors used to drive the servo arm 700, the apparatus 100 described above can be used with the servo arm 700, i.e., the servo arm 700 simply substitutes for the centrifugal arm 125.

The servo arm 700 includes four sections—a mounting boss 701, an extension section 702, a gripper control section 703 and a gripper 704—that are the same as or similar to corresponding sections of the centrifugal arm 125. The boss 701 can be the same as the boss 201 (FIG. 2) of the arm 125 and, like the boss 201, can be keyed to rigidly attach the boss 701 to the shaft 126 (not shown in FIG. 7A). One end of the extension section 702 is rigidly attached (by, for example, welding) to the boss 701. The opposite end of the extension section 702 is, in turn, rigidly attached (by, for example, using nuts and bolts) to an end of the gripper control section 703. The gripper 704 is rotatably attached to the opposite end of the gripper control section 703.

Like the arm 125, when the shaft 126 is rotated to cause the arm 700 to swing, the mounting boss 701, extension section 702 and gripper control section 703 rotate directly with the shaft 126. As described in more detail below, the gripper 704 can rotate with respect to the gripper control section 703. Thus, like the arm 125, the arm 700 simulates the motions of a swinging human arm that is held fixed at the elbow, the relative rotation between the gripper 704 and the gripper control section 703 simulating wrist motion of a human arm during a swing. However, unlike the arm 125, the rotation of the gripper 704 can be directly controlled during the swing in any desired manner. In contrast, in the arm 125, the gripper 204 generally rotates freely with respect to the rest of the arm 125, and the rotation of the gripper 204 can be controlled only indirectly (aside from the restraints imposed by the latches 208 and 209) by controlling the velocity and acceleration of the arm 125 about the shaft 126. As will be seen in the description below, each of the rotations of the gripper 704 with respect to the rest of the arm 700 can be controlled independently of the rotation of the arm 700 and independently of each other.

In the arm 700, the extension section 702 is formed of two plates 702a and 702b attached together in a V shape. Illustratively, the two plates 702a and 702b can be made of chromalloy or aluminum and can be attached by, for example, welding. Generally, the extension part 702 can be constructed in any manner, of any material and with any geometry that has sufficient strength to withstand the stresses resultant from swinging the arm 700, and sufficient rigidity to remain unbent during the swing.

The gripper control section 703 (shown partially in cross-section in FIG. 7A) can be the same as, or similar to, the gripper mount 224 of the centrifugal arm 125, described above. Like the gripper mount 224, the gripper control section 703 can be made of any sufficiently strong material, and can be formed of any appropriate shape that provides sufficient strength and rigidity, and that does not interfere with the movement of the gripper 704. The gripper control section 703 is advantageously made of aluminum because of its light weight. The gripper 704 can be the same as the gripper 204 of the arm 125.

In addition to the mounting boss 701, extension section 702, gripper control section 703 and gripper 704, the arm 700 includes two servo-drive mechanisms for controlling the rotation of the gripper 704 (and, thus, the rotation of the implement being swung) with respect to the rest of the arm 700. The first servo-drive mechanism controls the rotation of the gripper 704 about the axis A—A in FIG. 7A (and FIG. 7C) that is parallel to the swing plane and in substantially the same direction as the axis along which the arm 700 extends.

When the arm 700 is swinging a golf club, rotation of the gripper 704 about the axis A—A causes the face of the clubhead to "open" or "close" with respect to a "square" position during the swing. The second servo-drive mechanism controls the rotation of the gripper 704 about the axis B—B in FIG. 7A (and FIG. 7C) that is substantially parallel to the axis of rotation of the arm 700. When the arm 700 is swinging a golf club, rotation of the gripper 704 about the axis B—B causes the clubhead to "lead" or "lag" the rest of the club during the swing. The characteristics and effect of these rotations are discussed below. Here it is noted that the servo-drive mechanisms can be used to manipulate a golf club so that the clubhead has any desired position with respect to the rest of the club, and the clubface any orientation with respect to the swing plane, at any point in a swing, regardless of the manner in which the arm 700 is swung.

The first drive mechanism includes a servomotor 705 mounted on the boss 701. A servocontroller is used to control the servomotor 705 to drive a shaft (not visible in FIG. 7A) to rotate. The shaft transmits its rotation through a gearbox 706 to a shaft 707. A shaft adapter 708 is rigidly attached to the shaft 707 so that the shaft adapter 708 rotates with the shaft 707. A pulley 723 is rigidly attached to the shaft adapter 708. Rotation of the shaft adapter 708 causes the pulley 723 to drive a belt 709. As the belt 709 is driven, a pulley 737 is rotated. Rotation of the pulley 737 causes a drive shaft 710 to rotate. A gear 711 is rigidly attached to the drive shaft 710 so that the gear 711 rotates with the drive shaft 710. The gear 711 engages with another gear 712 that is rigidly attached to the gripper 704. Rotation of the gear 711 causes the gear 712 and, thus, the gripper 704 to rotate. The operation of the gears 711 and 712 is the same as that described above for the gears 321 and 322 (FIG. 3B) of the centrifugal arm 125. In the servo arm 700, the gears 711 and 712 (and, therefore, the rotation of the gripper 704 about the axis A—A) can be controlled to rotate in any desired manner during a swing by the servomotor 705. In contrast, in the arm 125, the gears 321 and 322 can only rotate the gripper 204 according to the fixed gear ratio of the gears 321 and 322 and the position of the face angle plate 318 specified before the swing.

The second drive mechanism includes similar components and operates in a similar manner to the first drive mechanism. A servomotor 713 is mounted on the boss 701. The servomotor 713 is mounted on a side of the boss 701 opposite that on which the servomotor 705 is mounted. This was done to reduce the contribution by the servomotors 705 and 713 to the inertia of the arm 700. A servocontroller is used to control the servomotor 713 to drive a shaft (not shown) to rotate another shaft 715 through a gearbox 714. A shaft adapter 716 rigidly attached to the shaft 715 rotates a pulley 724 that, in turn, drives a belt 717. Motion of the belt 717 causes a pulley 738 to rotate, thereby rotating a drive shaft 718 to which the pulley 738 is attached. The drive shaft 718 is rigidly attached to the gripper 704 so that rotation of the drive shaft 718 causes the gripper 704 to rotate about the axis B—B.

FIG. 7B shows the drive portions of the first and second drive mechanisms in more detail. Gearbox mount plates 719 and 721 are mounted coaxially on the shaft 126 and rigidly attached (by, for instance, welding) to the mounting boss 701. Each of the gearboxes 706 and 714 are mounted on the corresponding gearbox mount plate 719 or 721, respectively (using, for example, nuts and bolts). The servomotors 705 and 713 are attached (by, for example, bolting) to the gearboxes 706 and 714, respectively, and coupled to the corresponding gear boxes 706 and 714 in a conventional manner. The drive shafts 707 and 715 are each keyed to the corresponding drive shaft adapters 708 and 716. Bearings 720 and 722 are disposed between corresponding ones of the gearbox mount plates 719 and 721 and drive shaft adapters 708 and 716 to allow the latter to rotate. The pulleys 723, 724, 737 and 738 are attached to the corresponding shaft adapter or shaft using, for example, set screws and keys.

FIG. 7C shows the driven portions of the first and second drive mechanisms in more detail. Drive shaft retention plates 731 and 732 are fixedly attached (by, for example, welding) to the gripper control section 703. Bearings 733 and 734, respectively, are disposed between the drive shafts 710 and 718 and corresponding drive shaft retention plates 731 and 732 to allow rotation of the drive shafts 710 and 718. An insert 736 holds the gripper 704 in place with respect to the drive shaft 718. A bearing 735 is disposed between the gripper 704 and the drive shaft 710 to allow the drive shaft 710 to rotate with respect to the gripper 704.

Figure 8:
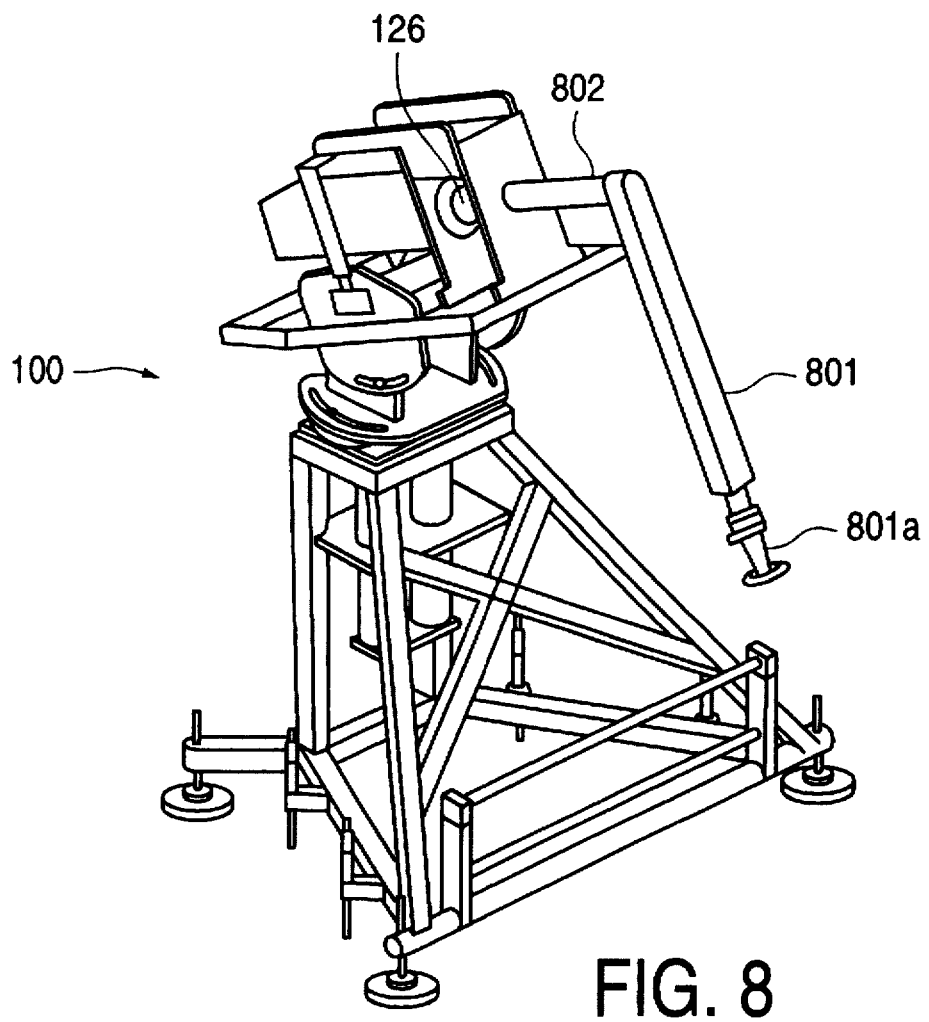
FIG. 8 is a perspective view of an apparatus similar to that of FIG. 1A, the apparatus including a rigid arm rather than an articulated arm as in the apparatus of FIG. 1A.

FIG. 8 is a perspective view of the apparatus 100, in which the apparatus 100 includes a rigid arm 801 rather than an articulated arm, e.g., the arms 125 (FIGS. 1A and 2) or 700 (FIGS. 7A, 7B and 7C), as described above. Except as described below, the apparatus 100 is constructed and operated in the same manner as described above and will not be described again here. Any minor differences that may exist between the appearance of the apparatus 100 in FIG. 8 and FIG. 1A, except as discussed below, are inadvertent or are not important to the invention.

As the name implies, no part of the rigid arm 801 bends during a swing, unlike the arms 125 and 700 which are constructed so that the associated gripper 204 or 704 can be rotated with respect to the rest of the arm 125 or 700. The rigid arm 801 thus simulates the motion of a swinging human arm that is held completely rigid, i.e., without the wrist motion that is simulated by the arms 125 and 700. When an apparatus according to the invention is used for swinging a golf club to hit a golf ball, such a swing simulation is useful, for example, in replicating the type of swing that occurs when putting or chipping. The motor 127 can be operated as necessary to produce appropriate swings for a putter or various types of chip shots.

The rigid arm 801 is formed as an integral structure having, at one end, a gripper 801a similar to the grippers 204 (FIGS. 2 and 3A through 3D) and 704 (FIG. 7B) described above. The gripper 801a operates to hold an implement in the same manner as described above with respect to FIG. 3C for the gripper 204. The rigid arm 801 is formed of any suitable material and with any geometry and dimensions that ensure that the rigid arm 801 remains rigid during a swing.

Typically, the rigid arm 801 will be swung with a short swing. Additionally, the implement (e.g., golf club such as a putter or wedge) that is swung by the rigid arm 801 will often be shorter than other implements swung by the apparatus of the invention. Further, when using the rigid arm 801 to swing particular implements such as a putter, it may be desirable to remove the platform 103 and hit a ball as the ball sits on the ground.

To accommodate the above particular characteristics, it may be necessary to make one or more of the following adjustments to the apparatus 100. For example, it may be necessary to adjust the angle of the arm 801 with respect to the platform 103 (not shown in FIG. 8) or ground by appropriately adjusting the position of the swivel plates 119a and 119b (see FIG. 1A). This would typically be necessary when swinging a putter to ensure that the bottom of the putter head is positioned parallel to the ground. Or, it may be necessary to operate the appropriate motor to move the mounting posts 115a and 115b to raise or lower the swinging mechanism to an appropriate height. This may be necessary to accommodate the typically shorter length of implements swung with the rigid arm 801 or to hit a ball on the ground.

Additionally, typically, as shown in FIG. 8, the rigid arm 801 is attached to a shaft extension 802 that is rigidly attached to the shaft 126 to extend the rigid arm 801 further away from the rest of the apparatus 100 than is typically the case with the arms 125 and 700. This may be necessary, as above, to accommodate the typically shorter length of implements swung with the rigid arm 801 or to hit a ball on the ground with a putter. The shaft extension 802 can be rigidly attached to the shaft 126 in any suitable manner, such as, for example, by keying the shaft 126 and shaft extension 802 and using set screws to hold the shaft extension 802 in place longitudinally with respect to the shaft 126. The rigid arm 801 can be attached to the shaft extension 802 in any suitable manner (such as, for example, by using nuts and bolts).

Alternatively, rather than using a rigid arm formed as an integral structure, such as the rigid arm 801, the servo-driven arm 700 (FIG. 7A) can be operated as a "rigid" arm. This can be accomplished by controlling the servomotors 705 and 713 to position the gripper 704 appropriately with respect to the rest of the arm 700, and not using the motors 705 and 713 to rotate the gripper 704 during the swing, so that the gripper 704 remains in position with respect to the rest of the arm 700 during the swing. Too, typically, the motor 127 that drives the shaft 126 to cause rotation of the arm 700 is driven at a constant speed to more accurately simulate the types of swings that are made with a rigid arm.

The ability to swing an implement with a rigid arm (either the rigid arm 801 or the servo-driven arm 700 with the gripper 704 held rigidly in place) enables short, slow swings to be made, such as are commonly made when swinging a putter or wedge. This is an important capability that the prior swinging machines described above do not have. The above-described machines having a centrifugally driven wrist require that the arm be swung at a relatively high velocity and over a relatively large swing arc in order to operate properly, thus precluding the possibility of making the short, slow swings possible with a rigid arm according to the invention. The above-described machine having a linkage wrist does not allow the wrist to remain stationary during the swing, so that the machine can not accurately simulate the type of "fixed wrist" swing that is typically made with a putter or wedge and that is possible with a rigid arm according to the invention.

Figure 9A:
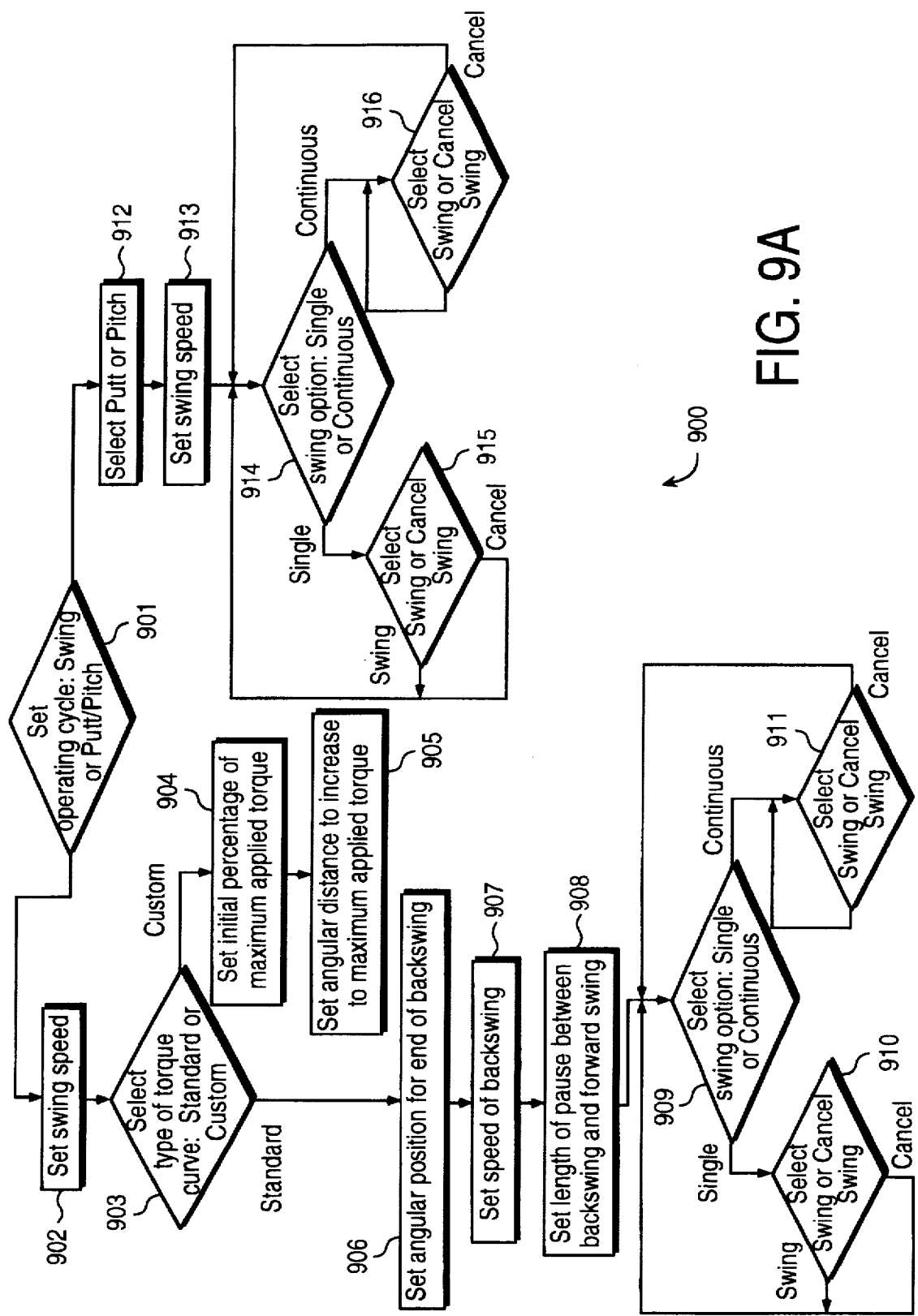
FIG. 9A is a flow chart of a method according to the invention for controlling an apparatus including an arm having a centrifugally driven wrist, such as that shown in FIG. 1A, to swing a golf club to hit a golf ball.

FIG. 9A is a flow chart of a method 900 according to the invention for controlling an apparatus, such as the apparatus 100 shown in FIG. 1A, to swing a golf club to hit a golf ball. The method 900 can be used with an apparatus that includes a centrifugal arm, such as the centrifugal arm 125 described with respect to FIGS. 2 and 3A through 3D. With appropriate modification to incorporate steps for effecting control of the servo-driven wrist, one example of such steps being shown in FIG. 9B, the method 900 can also be used with a servo arm, such as the servo arm 700 of FIGS. 7A and 7B. The method 900 can be implemented, for example, on an appropriately programmed digital computer, in a manner known by those skilled in the art of computer programming. Such a computer can be part of a control stand used to operate the apparatus according to the invention, e.g., the control stand 150 (FIG. 1A), as discussed above.

In step 901, an operating cycle is chosen. In the method 900, the operating cycle can either be Swing Cycle, in which a full golf swing is made, or Putt/Pitch Cycle, in which a truncated golf swing is made. In other embodiments of a method according to the invention, other operating cycles could be used. Depending upon the operating cycle chosen, particular steps of the method are executed. Typically, the particular steps executed for an operating cycle are unique to that operating cycle; however, this need not necessarily be the case.

In the method 900, if Swing Cycle is chosen, then, in step 902, the swing speed is specified. Swing speed refers to the rotational speed with which the arm is swung, not the implement, which can, as described elsewhere, rotate relative to the arm; at a particular time, the speed with which the implement swings can be more or less than the swing speed of the arm. As described herein, the arm of an apparatus according to the invention is driven to rotate by a motor. Consequently, the swing speed is controlled by appropriately controlling the operation of that motor. For example, the swing speed can be controlled by regulating the amount of torque supplied by the motor to the arm. The swing speed can be specified, for example, by specifying the maximum amount of torque to be applied to the motor during a swing, thus indirectly controlling the swing speed. It is important to note that the exact swing speed for a particular maximum torque will vary somewhat depending on the geometry and weight of the implement being swung, as well as the exact torque curve according to which the motor is operated. The specification of swing speed in step 902 corresponds generally to the overall level of speed achieved during the swing and approximately to the maximum speed achieved during the swing. The following description of the method 900 assumes that swing speed is specified in this way in step 902, i.e., by specifying the maximum motor torque during a swing. The particular manner in which such swing speed specification is made can vary. For instance, the swing speed could be specified by offering the user a choice between fast, medium and slow swings. Each of those choices would correspond to a particular maximum motor torque, the motor torque having been calibrated to produce swing speeds for the types of implements being swung that correspond to "typical" fast, medium and slow swings. Illustratively, when the method 900 is used to control an apparatus according to the invention to swing a golf club, the motor can be operated in Swing Cycle at swing speeds that produce clubhead speeds at impact with the ball of up to approximately 120 mph when swinging a wedge and up to approximately 140 mph when swinging a driver.

Next, in step 903, the type of torque curve is selected. The torque curve (i.e., change in torque applied to swing the arm as a function of the angular position of the arm) represents the manner in which force is applied by the motor to swing the arm. For the centrifugal arm, the torque curve affects the manner in which the entire implement swings. For the servo arm, the torque curve affects only the motion of the part of the implement being swung that is held by the gripper; the servomotors determine rotation of the implement with respect to the gripper (as explained in more detail above).

The method 900 allows selection of either a standard (i.e., predetermined) torque curve or a custom (i.e., user-specified during the method 900) torque curve. Any number of standard torque curves can be defined. If a standard torque curve is selected and more than one standard torque curve has been defined, step 903 requires a further choice of the particular standard torque curve desired. Generally, one or more standard torque curves are defined to simulate typical swings of various types.

If a custom torque curve is chosen in step 903, then, in step 904, the initial torque to be applied to rotate the arm is specified as a percentage of the maximum applied torque during the swing. The percentage can have any value between 0% and 100 %.

Once the initial torque is specified, the "ramp-up distance" is specified in step 905. The ramp-up distance is the angular distance between the start of the forward swing and the angular position at which the maximum applied torque is achieved. According to one embodiment of the invention, the torque increases linearly, as a function of angular distance, from the initial torque to the maximum applied torque as the club swings through the ramp-up distance.

Note that, in specifying the parameters to define a custom torque curve, a user can rely on past experience in operating the apparatus of the invention to enable the proper specification of parameters to produce a swing of a desired type.

Alternatively, if a standard torque curve is chosen instead of a custom torque curve, steps 904 and 905 are not performed. Rather, as indicated above, the parameters specified in those steps are predetermined to produce a torque curve of a particular type.

In step 906, the angular position of the arm at the end of the backswing is specified. According to one embodiment of the invention, this angular position must have a magnitude at least as great as the specified ramp-up distance, i.e., maximum torque cannot be reached after the arm has swung past the initial at-rest position (the "6 o'clock position" as shown in FIG. 1A).

Figure 10A:
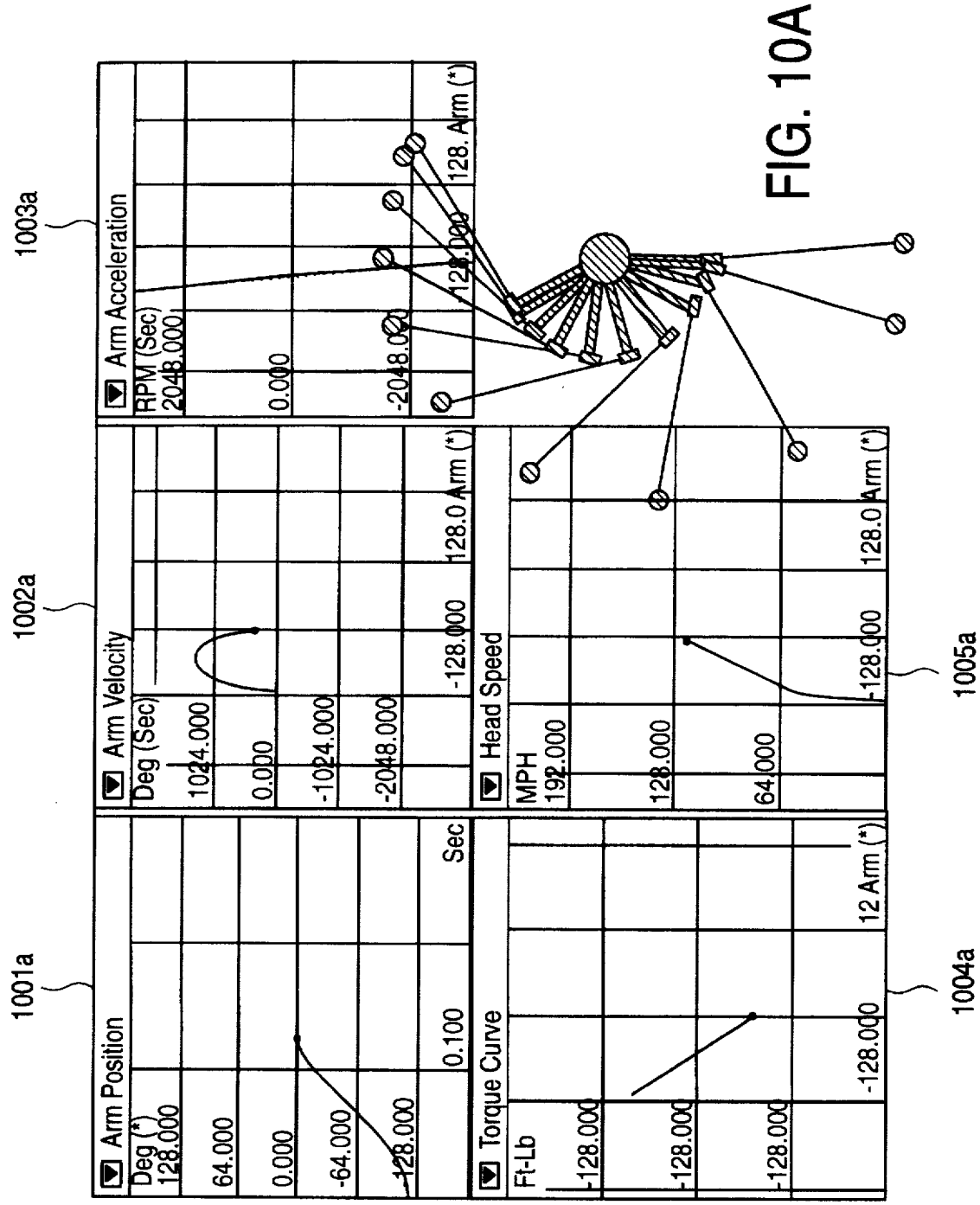
Figure 10B:
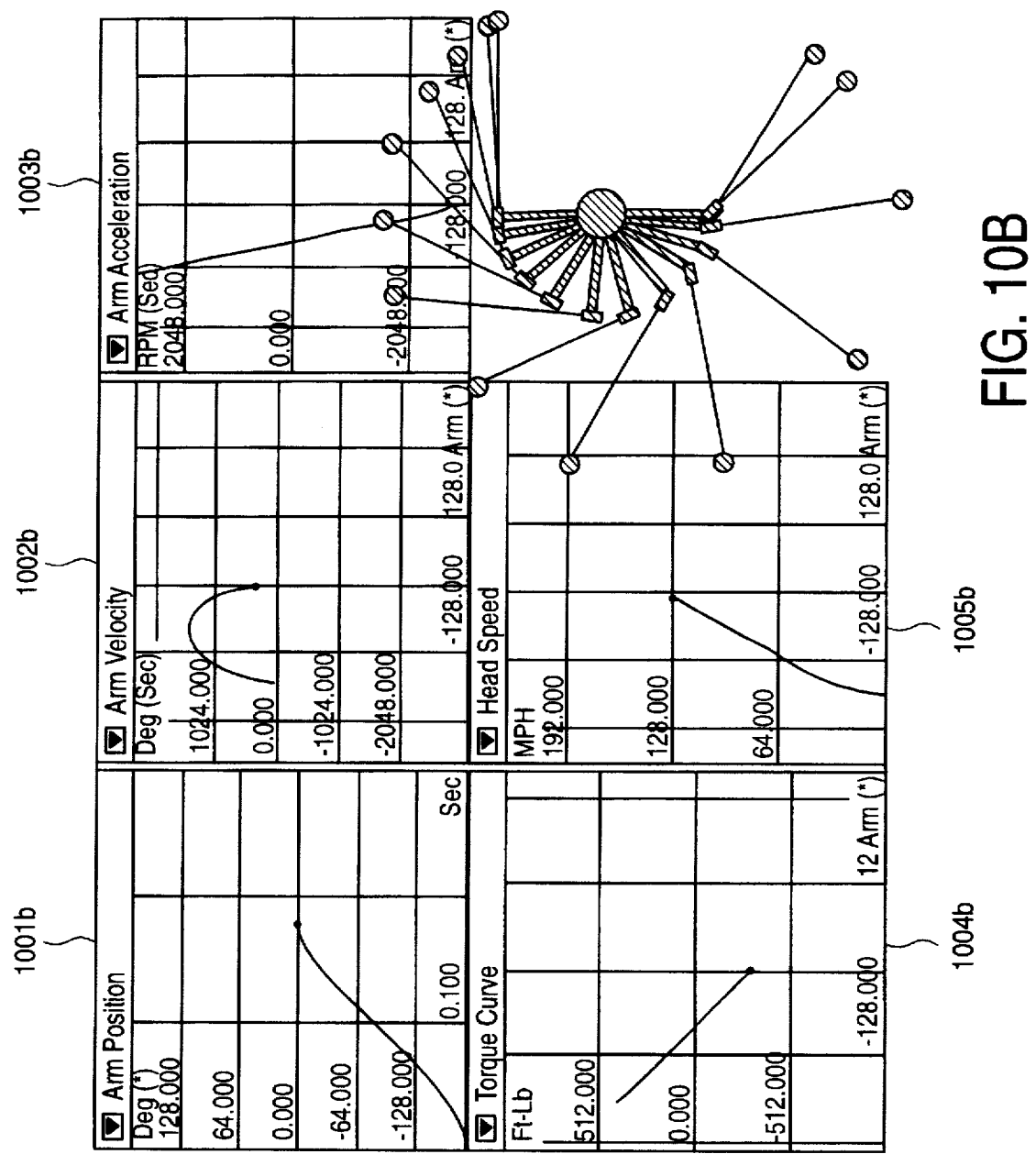

Specification of the maximum applied torque (step 902), the initial torque (step 904), the ramp-up distance (step 905), the length of the backswing (step 906) and the manner in which torque changes between the initial torque and maximum torque and between the maximum torque and the end of the swing, together define the swing characteristics of a swing. As previously noted, with the centrifugally driven wrist, the particular swing characteristics determine the relative rotation of the implement with respect to the arm (in the swing plane) during a swing. FIGS. 10A through 10C below illustrate examples of the different relative rotations that can result for several types of swings.

As described, in the Swing Cycle, the method 900 operates an apparatus according to the invention using open loop control (steps 902 through 905). Alternatively, closed loop control could be used. In that case, rather than steps 902 through 905, the method 900 would include steps which result in the specification of particular angular positions of the arm at particular times during the swing.

In step 907, the speed of the backswing is specified, and in step 908, the duration of the pause between the end of the backswing and the beginning of the forward swing is specified. These parameters enable control of the amount of oscillation of the implement at the end of the backswing. This can be important for controlling the stability of the implement at the end of the backswing. For example, a slower backswing speed will produce less oscillation at the end of the backswing. Or, a longer pause at the end of the backswing will increase the degree to which any oscillation dampens out. These parameters can also control whether the implement is in motion (oscillating) with respect to the arm at the time that the forward swing is begun, thereby potentially affecting the relative rotation of the implement with respect to the arm during the forward swing.

In step 909, a swing option is chosen. Either "Single Swing" or "Continuous Swing" can be chosen. Once a swing option is chosen, the user can either choose to execute or cancel the swing (step 910 or 911). For either Single Swing or Continuous Swing, if the swing is canceled, the method 900 returns to step 909 to allow the swing option to be reselected. This also occurs in Single Swing even if the swing is executed. However, in Continuous Swing, once the swing is executed, the user is immediately presented with a choice as to whether to swing again or cancel the swing.

The Single Swing option can be useful if it is desired to make some change between swings, such as switching clubs, changing the position of the club in the gripper, changing the height of the swinging mechanism with respect to the platform, or repositioning the apparatus so as to change the swing plane. Since Single Swing option requires the user to progress through two menus before swinging again, there is little chance that the apparatus will inadvertently be caused to swing while the desired change is being made. Additionally, the apparatus according to the invention can include an arm lockout mechanism that is activated after a swing made with the Single Swing option so that the arm cannot rotate, thereby providing additional safety.

The Continuous Swing option can be useful when the user desires to continue swinging the same club without making any changes to the swing configuration such as those described above. Since the Continuous Swing option requires the user to progress through only a single menu before swinging again, successive swings can be accomplished more rapidly than when the Single Swing option is used. However, as indicated above, there is more danger that the apparatus can be inadvertently caused to swing at an inopportune time.

In another embodiment of a method according to the invention, the method can include an option that causes the implement to automatically swing again, according to the swing specifications made during earlier steps of the method 900, without intervention by the user. Implementation of this option necessitates use of an automatic ball feeder (not shown in the Figures) that is used to place a new golf ball on the platform after each swing. This option can be useful in facilitating testing of a particular golf club by repetitively hitting golf balls without user intervention, thereby enabling the testing to be accomplished more rapidly.

Returning to step 901, Putt/Pitch Cycle can be selected instead of Swing Cycle. Putt/Pitch Cycle is used for making a short swing, such as made by a golfer during a putt or a chip shot. Such short swings are typically made with a stiff wrist. Therefore, if Putt/Pitch Cycle is to be selected, and a centrifugal arm (e.g., arm 125 shown in FIGS. 2 and 3A through 3D) is being used during the Swing Cycle, a rigid arm (e.g., the rigid arm 801 shown in FIG. 8) is substituted for the centrifugal arm. If a servo arm (e.g., arm 700 shown in FIGS. 7A and 7B) is used during the Swing Cycle, then, in Putt/Pitch Cycle, the servomotors used to move the gripper with respect to the rest of the servo arm are used to appropriately position the gripper, and the gripper is held in place during the swing, in order to simulate a rigid arm. Alternatively, if desired, a rigid arm could be substituted for the servo arm. Further, if a servo arm is being used in Putt/Pitch Cycle, a shaft extension (e.g., shaft extension 802 shown in FIG. 8) can be used to provide adequate extension of the servo arm from the rest of the apparatus.

In step 912, either Putt or Pitch is selected, depending on the type of shot desired. The swings for Putt and Pitch differ in the range of speeds that can be selected (see step 913 below) and in the magnitude of the arc of the swing. For Putt, the backswing extends 45 degrees back from the initial position of the arm and the forward swing extends to a position that is 45 degrees ahead of the initial position of the arm. For Pitch, the swing extends between positions that are 90 degrees back from, and ahead of, the initial position of the arm.

In step 913, the speed of the swing is selected. Usually, in Putt/Pitch Cycle of the method 900, rotation of the arm is controlled using closed loop control. Using closed loop control, the rotational speed increases linearly from zero at the beginning of the forward swing to the maximum speed (swing speed) at the point in the swing at which the implement strikes the object on the platform. The speed then decreases back to zero again at the end of the forward swing. Thus, only specification of the swing speed in step 912 is needed to fully define a swing in Putt/Pitch Cycle. Illustratively, when the method 900 is used to control an apparatus according to the invention to swing a golf club, the swing speed in Putt/Pitch Cycle can be controlled to achieve clubhead speeds at impact with the golf ball as high as 10 mph for Putt and 60 mph for Pitch.

Alternatively, the rotation of the arm in Putt/Pitch Cycle can be controlled using open loop control rather than closed loop control. In that case, the method 900 would include additional steps, similar to steps 902 through 906, that enable the user to specify appropriate parameters for effecting the open loop control.

In step 914, similar to step 909 in the Swing Cycle, either the "Single Swing" option or the "Continuous Swing" option is chosen. These swing options result in operation of the apparatus of the invention in steps 915 and 916 as described above with respect to the corresponding steps 910 and 911 in Swing Cycle.

Though not shown in FIG. 9A, in a typical implementation of the method 900, there is also a restart option that allows the user to start again at the beginning of the method 900, specifying a new swing cycle, swing parameters and swing option as desired. This restart option can be implemented in a manner that allows restart at any time during the method 900.

The method 900 does not include steps for adjusting the swing plane. For the embodiments of the invention described herein, these adjustments are made manually while the apparatus is at rest by adjusting the position of the vertical swivel plates 119a and 119b and the horizontal swivel plate 117, as described above with respect to FIG. 1C.

It may also be necessary to make appropriate adjustment to other parts of an apparatus according to the invention, such as the platform 103, to accommodate these adjustments. Other methods according to the invention could include steps for making these adjustments. As described elsewhere, adjustment of the swing plane enables simulation of a large variety of swing types.

Figure 9B:
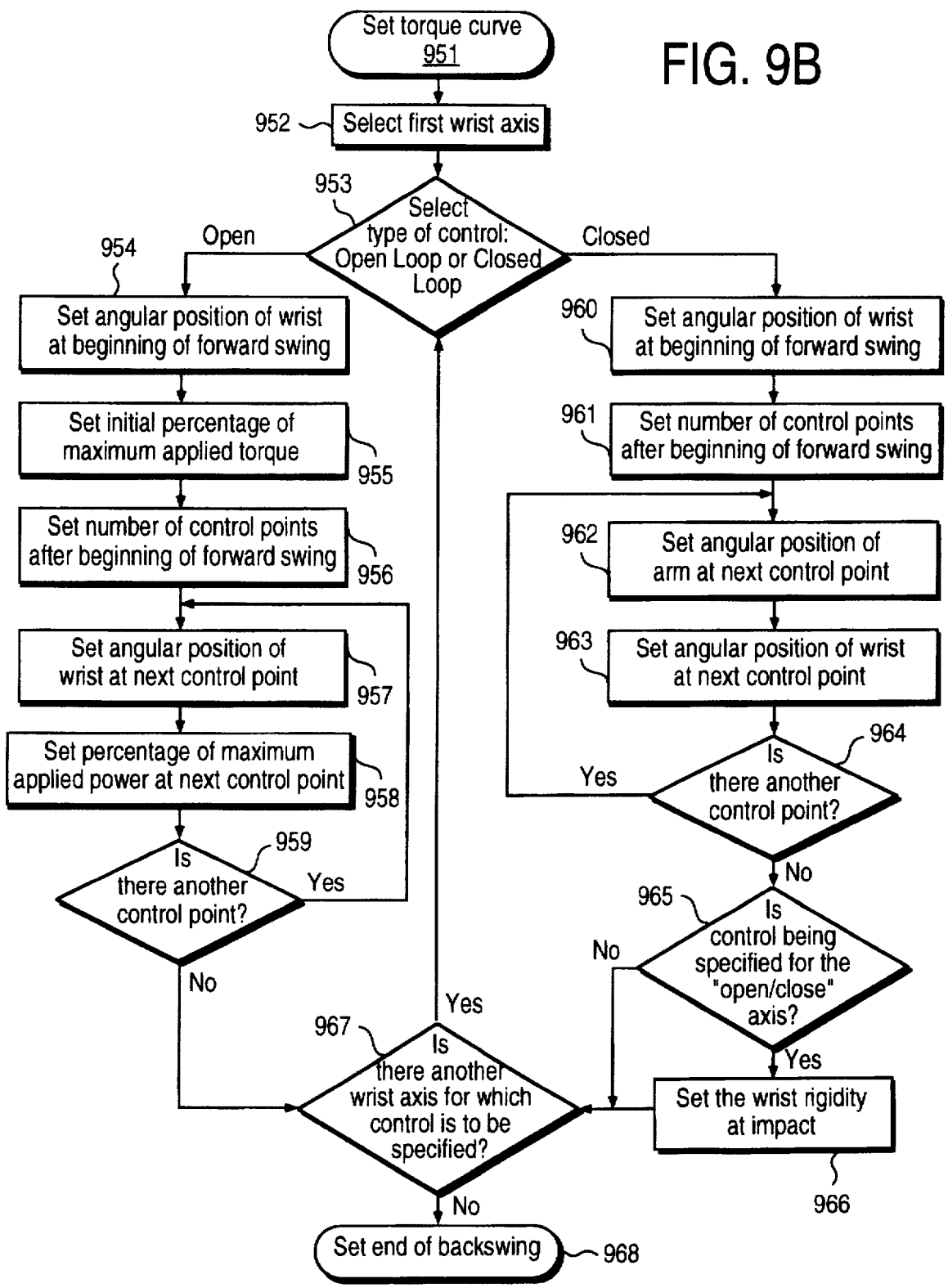
FIG. 9B is a flow chart of a series of steps that can be added to the method of FIG. 9A to effect control of an apparatus including an arm having a servo-driven wrist, such as that shown in FIGS. 7A through 7C, to swing a golf club to hit a golf ball.

As indicated above, with appropriate modification to incorporate steps for effecting control of the servo-driven wrist, the method 900 can also be used to control an apparatus including a servo arm. FIG. 9B illustrates one example of steps for controlling a servo-driven wrist. As shown by step 951, these steps are performed after the torque curve is established, i.e., just before step 906 (FIG. 9A) in which the length of the backswing is specified.

As described above with respect to FIGS. 7A and 7B, the servo arm 700 according to the invention can be driven to rotate about each of two axes (here termed "wrist axes"). One of the wrist axes (axis A—A in FIGS. 7A and 7C) is parallel to the swing plane and is in substantially the same direction as the axis along which the arm 700 extends. This wrist axis is referred to here as the "open/close axis" and the angle of the implement with respect to the arm measured about this wrist axis is referred to as the "open/close angle". The other wrist axis (axis B—B in FIGS. 7A and 7C is substantially parallel to the axis of rotation of the arm 700.

This wrist axis is referred to here as the "lead/lag axis" and the angle of the implement with respect to the arm measured about this wrist axis is referred to as the "lead/lag angle".

The steps shown in FIG. 9B result in the specification of various parameters that together effect control of movement of the gripper 704 with respect to the arm 700 during a swing. In step 952, one of the wrist axes is chosen for specification of control parameters. Either the lead/lag or open/close axis can be chosen first.

In step 953, the type of control is selected, either open loop or closed loop. In the same manner as described above with respect to rotation of the entire arm, open loop control of the gripper about one of the wrist axes means that control of the motion of the gripper about that wrist axis is effected by controlling the torque supplied from the appropriate servomotor as a function of the angular position of the gripper about the wrist axis. Closed loop control, on the other hand, means that the gripper motion is effected by applying torque from the servomotor to cause the gripper to traverse the entire extent of the motion about the wrist axis in a specified amount of time. Since rotation about each of the wrist axes can be controlled independently of rotation about the other wrist axis, open loop or closed loop control can be specified for a particular wrist axis independent of the type of control specified for the other wrist axis. As is evident from FIG. 9B, the type of control specified dictates which particular sequence of steps is followed to effect the desired control.

If open loop control is chosen for a particular wrist axis, then in step 954, the angular position of the wrist at the beginning of the forward swing (i.e., at the end of the backswing) is specified. For each wrist axis, the angular position is specified with respect to a predefined zero degree position. For example, if a golf club is being swung, the zero degree position for the open/close axis is specified so that the club face is perpendicular to the swing path. The zero degree position for the lead/lag axis is specified so that the club shaft is in line with the arm.

As described above with respect to FIGS. 6A through 6K, at the beginning of the forward swing of the centrifugal arm 125, the gripper 204 is held in position with respect to the rest of the arm 125 by engagement of the pin 226 with the deceleration latch 209 so that the lead/lag angle is 90 degrees. The magnitude of the lead/lag angle at the beginning of the forward swing is defined by the construction of the arm 125. Though, in general, the lead/lag angle at the beginning of the forward swing can have any magnitude, for any particular construction of a centrifugal arm according to the invention, the magnitude of the lead/lag angle at the beginning of the forward swing can have only one value.

Additionally, as described above, in the centrifugal arm 125, the magnitude of the open/close angle is established by the initial positioning of the implement in the gripper 204 and remains fixed throughout the swing. In contrast, a servo arm according to the invention allows the lead/lag and open/close angles to be varied to have any value at any time during the swing. In particular, in step 954, any desired magnitude of the lead/lag and open/close angles can be specified at the beginning of the forward swing.

In step 955, the initial percentage of maximum applied torque is specified. The purpose and effect of this step is similar to that of step 904 (FIG. 9A) in which the initial percentage of maximum applied torque is specified for rotation of the entire arm.

Rotation of the implement about the wrist axes using open loop control differs somewhat, however, from the use of open loop control to rotate the entire arm. Whereas, for rotation of the entire arm, the ramp-up distance is specified (step 905 in FIG. 9A), for rotation about the wrist axes, the applied torque at particular angular positions of the implement with respect to the rest of the arm is specified. In step 956, the number of control points is specified. In steps 957 and 958, the percentage of maximum applied torque is specified at each control point: the angular position of the wrist (i.e., position of the gripper—and, consequently, the implement—with respect to the rest of the arm) is specified in step 957 and the percentage of maximum applied torque at that angular position is specified in step 958. As indicated by step 959, specification of wrist positions and associated torque magnitudes continues until all control points have been defined.

If closed loop control is chosen for a particular wrist axis in step 953, then in step 960, the angular position of the wrist at the beginning of the forward swing is specified, as explained above with respect to step 954. In step 961, the number of control points is specified. In step 962, the angular position of the arm for a particular control point is specified. In step 963, the angular position of the wrist for the control point is specified. Step 964 causes steps 962 and 963 to be performed until all control points have been defined.

Steps 965 and 966 enable specification of the wrist rigidity at impact with the object being struck. As shown in FIG. 9B, the wrist rigidity can only be specified for the wrist motion about the open/close axis. (In other embodiments of the invention, wrist rigidity about the lead/lag axis could be specified.) Step 965 determines whether or not the axis for which control parameters are currently being specified is the open/close axis. If so, then in step 966, the wrist rigidity at impact is specified. For wrist motion about the open/close axis, "wrist rigidity at impact" refers to the resistance to twisting of the implement about the open/close axis as a result of making impact with the object being struck. For example, when a golfer swings a golf club to hit a golf ball, at impact with the ball the golf club has a tendency to twist in the golfer's hands. Specification of the wrist rigidity at impact seeks to emulate the capacity of a golfer to resist such twisting. In one embodiment, the wrist rigidity is specified by selecting a number between 1 and 10, 1 representing complete resistance to twisting of the implement about the open/close axis and 10 representing a relatively small predefined amount of resistance to such twisting. The resistance to twisting can be controlled by appropriate tuning of the servomotor (e.g., the servomotor 705 in FIG. 7A) used to rotate the gripper about the open/close axis. The tuning of the servomotor can be controlled by appropriately controlling the gain of a PIDF (Proportional Integral Derivative Feedback) loop used to control the servomotor, as known by those skilled in the art.

Once control parameters have been specified for one of the wrist axes, step 967 enables control parameters to be specified for the other wrist axis. If control parameters have been specified for both wrist axes, then, as shown by step 968 (or step 906 in FIG. 9A), the angular position of the end of the backswing is specified. The method 900 continues from that point as described above.

FIGS. 10A through 10C show various operating parameters during swings generated by different torque curves. In FIGS. 10A through 10C, graphs 1001a, 1001b and 1001c show the angular position of the arm as a function of time from the beginning of the forward swing (i.e., end of the backswing) to the point of impact with the ball (or other object being struck). Graphs 1002a, 1002b and 1002c show the arm velocity as a function of the angular position of the arm during the same portion of a swing. Graphs 1003a, 1003b and 1003c show the arm acceleration as a function of the angular position of the arm during the same portion of a swing. Graphs 1004a, 1004b and 1004c show the torque as a function of the angular position of the arm during the same portion of a swing. Finally, graphs 1005a, 1005b and 1005c show the head speed (i.e., the speed of the part of the implement being swung that strikes the object) as a function of the angular position of the arm during the same portion of a swing. Each of FIGS. 10A through 10C also show, for an apparatus including a centrifugal arm, the relative positions of the arm and the implement being swung at various positions during a swing having operating parameters that vary as shown.

In FIGS. 10A through 10C, the angular position of the arm at the beginning of the forward swing (i.e., the "release point") and the torque curve together define the swing characteristics. In each of FIGS. 10A through 10C, the torque at the beginning of the forward swing and at the point of impact is the same, and the torque varies linearly from the beginning of the forward swing to the point of impact. However, the release point varies among FIGS. 10A through 10C, thereby causing each of the torque curves shown in FIGS. 10A through 10C to be different from the torque curves shown in other of the FIGS. 10A through 10C. In FIG. 10A, the release point has been specified so as to produce a "square swing" with a centrifugal arm, i.e., a swing in which the clubhead neither leads ahead of, nor lags behind, the gripper holding the club (or, with a human golfer, ahead of or behind the golfer's hands). In FIG. 10B, the release point is made larger than that in FIG. 10A (other swing parameters affecting the swing characteristics remaining unchanged), thereby changing (lengthening) the torque curve and, as a consequence, causing the clubhead to lead the rest of the club at impact ("leading swing") when a centrifugal arm is used. In FIG. 10C, the release point is made smaller than that in FIG. 10A (other swing parameters affecting the swing characteristics remaining unchanged), thereby changing (shortening) the torque curve and, as a consequence, causing the clubhead to lag the rest of the club at impact ("lagging swing") when a centrifugal arm is used. As discussed, then, FIGS. 10A through 10C illustrate how the release point can be controlled to produce different types of swings with a centrifugal arm. (Note that use of the torque curves and release points shown in FIGS. 10A through 10C with a servo arm would not necessarily produce the positionings of the implement shown in FIGS. 10A through 10C, since the servo wrist of the servo arm is controlled independently of the control of the rotation of the arm. However, with appropriate control of the servo wrist, the same positionings of the implement could be obtained.)

In FIGS. 10A through 10C, the shape of the torque curve has been specified so that the torque varies linearly from the beginning of the forward swing to the point of impact. Generally, torque curves having any shape can be used. For example, the shape of the torque curve between the beginning of the forward swing and the point of impact could be specified so that the torque is i) linearly decreasing (shown in FIGS. 10A through 10C), ii) parabolically decreasing, iii) logarithmically decreasing, iv) linearly increasing, v) parabolically increasing, vi) logarithmically increasing, vii) linearly decreasing over the initial 20% of the distance and linearly increasing over the next 80% of the distance, or viii) parabolically increasing over the initial 75% of the distance and logarithmically decreasing over the next 25% of the distance. Varying the shape of the torque curve can also be used as a means for varying the particular swing characteristics, e.g., whether a square, leading or lagging swing is produced.

Above, the invention has been described primarily as implemented in an apparatus for swinging a golf club to hit a golf ball. However, as has been mentioned above, the invention can also be embodied in an apparatus ("batting machine") for swinging a bat to hit a baseball or softball. As will be apparent from the description below, such a batting machine is, in many respects, similar to the above-described apparatus 100.

Figure 11B:
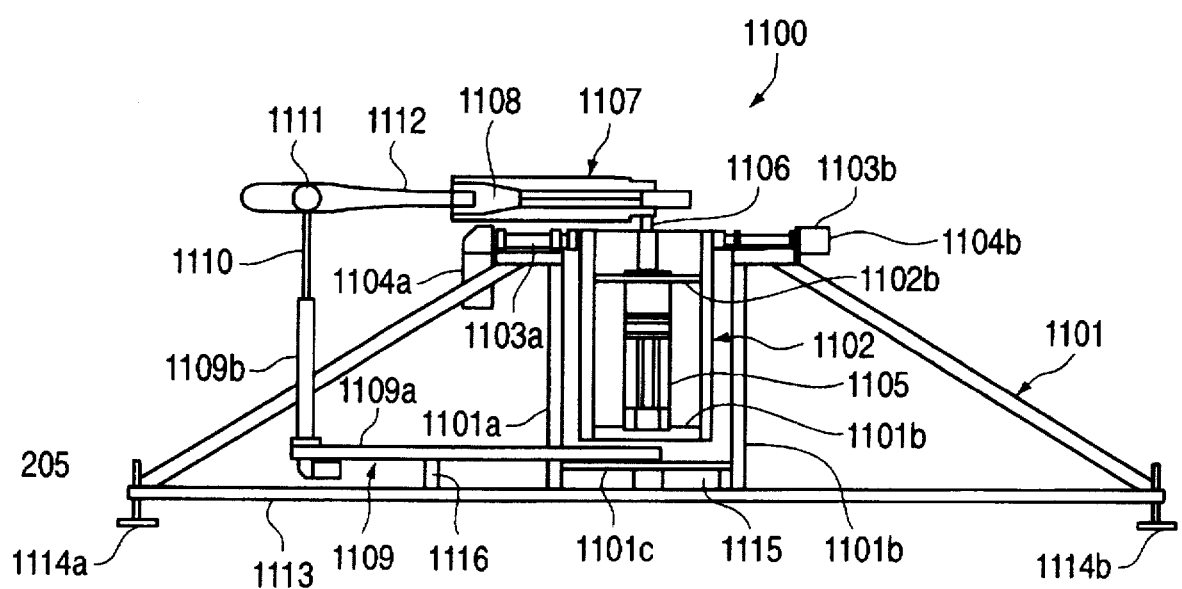

FIGS. 11A and 11B are a plan view and side view, respectively, of a batting machine 1100 according to the invention. The batting machine 1100 is adapted for hitting a ball 1111 off of a tee 1110 in a manner that simulates hitting a ball in the air, such as might be done in swinging a bat and hitting a baseball or softball. As shown in FIG. 11B, the batting machine 1100 is swinging a bat 1112.

The batting machine 1100 is constructed and operates in a manner similar to that of the apparatus 100 of FIG. 1A. The batting machine 1100 includes a frame 1101 that is supported by legs 1114a through 1114d. The frame 1101 and legs 1114a through 1114d can be the same as or similar to the frame 101 and legs 102a through 102c of the apparatus 100. In the batting machine 1100, the geometry of the frame 1101 differs somewhat from the frame 101, as apparent from FIGS. 11A and 11B, though the materials and construction techniques used are the same.

Each of two shafts 1103a and 1103b are rigidly attached to a carriage 1102 in any suitable manner as known by those skilled in the art. Each shaft 1103a and 1103b is rotatably mounted on a corresponding carriage mount extension 1101a or 1101b, respectively, of the frame 1101. A carriage positioning motor 1104a is mounted on a motor mounting plate of the carriage mount extensions 1101a such that the motor 1104a can be engaged with the corresponding shaft 1103a to rotate the shaft 1103a. The shaft 1103b is free-wheeling and rotates with rotation of the carriage 1102. As shown in FIG. 11A, the motor 1104a is a servomotor, a position encoder 1104b adjacent the shaft 1103b operating with the servomotor 1104a as known by those skilled in the art. Alternatively, the motor 1104a could be any other conventional motor. As described in more detail below, the carriage 1102 can be rotated to each of a multiplicity of orientations with respect to the frame 1101, in order to vary the manner in which the ball 1111 is struck by the bat 1112.

The carriage 1102 can be constructed in any manner which allows an arm 1107 of the batting machine 1100 to be rotatably mounted on the carriage 1102 such that the carriage 1102 does not interfere with motion of the arm 1107. As shown in FIGS. 11A and 11B, the carriage 1102 is constructed as a rectangular frame. The carriage 1102 can be constructed of any suitable material having adequate strength to support an arm swinging mechanism as described below. Illustratively, the carriage 1102 can be made of a structural steel.

The carriage 1102 includes a motor mounting plate 1102a. An arm swinging motor 1105 is mounted in any suitable manner on the motor mounting plate 1102a. A shaft 1106 is rotatably mounted at an end of the motor 1105 opposite the end attached to the motor mounting plate 1102a of the carriage 1102. The motor 1105 can engage the shaft 1106 to rotate the shaft 1106. The carriage 1102 also includes a stabilizer plate 1102b located near the end of the shaft 1106 engaged by the motor 1105. The shaft 1106 is journaled through a hole in the stabilizer plate 1102b, the stabilizer plate 1102b helping to hold the shaft 1106 stably in place during swinging of the arm 1107. The motor 1105 is also attached to the stabilizer plate 1102b (by, for example, bolting). The plates 1102a and 1102b are similar to the plates 123 and 124, respectively, of the apparatus 100 (FIG. 1A) and perform similar functions.

The arm 1107 is rigidly attached to the end of the shaft 1106 opposite the end engaged by the motor 1105 so that, when the motor 1105 is operated to rotate the shaft 1106, the arm 1107 is swung. Preferably, the motor 1105 is a servomotor, controlled by a servocontroller, that can be operated to swing the arm 1107 using either open loop control or closed loop control, as described above with respect to the apparatus 100. The shaft 1106 is of sufficient length to ensure that the carriage 1102 does not interfere with the arm 1107 when the arm 1107 is swung. The construction of the shaft 1106 and motor 1105, and the attachment of the arm 1107 to the shaft 1106 can be the same as that described above for the arm 125, shaft 126 and motor 127 of the apparatus 100. Generally, the arm 1107 can be either a centrifugal arm, such as the arm 125 (FIGS. 2 and 3A through 3D), or a servo arm, such as the arm 700 (FIGS. 7A, 7B and 7C). (A servo arm is shown in FIG. 11A.)

A gripper 1108 is attached at an end of the arm 1107 opposite the end of the arm 1107 attached to the shaft 1106. The gripper 1108 is hinged with respect to the arm 1107 to allow the bat 1112 to rotate with respect to the arm 1107. Generally, the construction of the gripper 1108, hinged attachment to the arm 1107 and movement of the gripper 1108 with respect to the arm 1107 can be the same as that of the gripper 204 (described in more detail above with respect to FIGS. 2 and 3A through 3D) of the arm 125, or the gripper 704 (described in more detail above with respect to FIGS. 7A, 7B and 7C) of the arm 700. As compared to the gripper 204 or 704, which, as shown and described above, are constructed to hold a golf club, the gripper 1108 need only be modified to hold a bat rather than a golf club. For example, the retention hole of the gripper 1108 must be made longer and wider than that of the gripper 204 or 704. Additionally, a damper (e.g., rubber cushion) can be inserted into the retention hole to provide protection from impact forces when the ball is hit, similar to the protection provided for a golf club by the rubber grip typically found on the handle of the club.

A tee mount 1109 supports the tee 1110 on which the ball 1111 is positioned. Generally, the tee mount 1109 can have any number of sections of any shape and length, subject only to the condition that an end of the tee mount 1109 be located at a position that is a proper distance away from the surface ("ground surface") on which the batting machine 1100 is mounted and from the carriage 1102, so that the bat 1112 contacts the ball 1111 when the arm 1107 is swung. As shown in FIG. 11B, the tee mount 1109 includes two sections 1109a and 1109b. The section 1109a is movably attached, as explained in more detail below, to a tee mount attachment plate 1101c that is part of the frame 1101. The section 1109a extends for a distance in a direction parallel to the ground surface, then the section 1109b extends in a direction perpendicular to the ground surface. The section 1109b is formed with a hollow passage into which a portion of the tee 1110 fits. The tee mount 1109 is made of any suitable material, such as structural steel, having adequate strength and stiffness to ensure that the ball 1111 does not move during operation of the batting machine 1100 until struck by the bat 1112.

A ball positioning motor 1113 is attached, in any suitable manner, to the section 1109a of the tee 1109. The motor 1113 can be any conventional motor or servomotor. The portion of the tee 1110 that fits within the tee mount 1109 is movably attached (by, for example, a rack or drive screw) to the tee mount 1109 so that the tee 1110 can translate with respect to the tee mount 1109 in a direction perpendicular to the ground surface. The motor 1113 is operably connected to the rack or screw to enable the motor 1113 to move the tee 1110 with respect to the tee mount 1109 to vary the distance of the ball 1111 from the ground surface. One end ("ball mount") of the tee 1110 is adapted to hold the ball 1111 in a fixed position until the ball 1111 is struck by the bat 1112. Preferably, a portion of the tee 1110 extending down from the ball mount is made flexible so that the flexible portion can bend upon impact of the bat 1112 with the ball 1111. Illustratively, the flexible portion can be made of rubber. As described in more detail below, the adjustability of the distance of the ball 1111 from the ground surface enables the manner in which the bat 1112 hits the ball 1111 to be varied to cause the ball 1111 to be hit in a desired way.

While the motor 1113 enables the tee 1110 to be conveniently moved, the motor 1113 need not necessarily be present. Alternatively, the motor 1113 could be eliminated and the tee 1110 held in place with an adjustable mechanical mechanism that enables the position of the tee 1110 to be changed manually. For example, a hole can be formed through the tee mount section 1109b and a multiplicity of corresponding holes can be formed through a shaft portion of the tee 1110 (that fits into the tee mount section 1109b) at various longitudinal positions along the shaft of the tee 1110. A pin can then be inserted through corresponding holes in the tee 1110 and tee mount section 1109b to hold the tee 1110 in place with respect to the tee mount 1109. The position of the tee 1110 could then be manually changed by removing the pin, moving the shaft of the tee 1110 to a different position within the hollow tee mount section 1109b, and reinserting the pin through another hole of the tee 1110 and the hole of the tee mount section 1109b to hold the tee 1110 in place in the new position.

A motor 1115 (which can be a conventional motor or servomotor) is mounted on a surface of the tee mount attachment plate 1101c opposite the surface on which the tee mount 1109 is attached. The motor 1115 is operably connected to an end of a shaft that is journaled in a hole in the plate 1101c. An opposite end of the shaft is rigidly attached (by, for instance, welding) to the tee mount section 1109a. The motor 1115 can be operated to rotate the shaft to cause the tee mount 1109 to move to any of a number of positions. A series of possible positions 1117a through 1117e are shown in FIG. 11A. Movement of the tee mount 1109 in this manner enables the position of the ball 1111 to be varied so that the bat 1112 can hit the ball 1111 in any of a wide variety of directions. A stabilizing bar 1116 is rigidly attached to the frame 1101 to provide additional support for the tee mount section 1109a. Preferably, a cushioning material such as rubber is provided on the surface of the stabilizing bar 1116 that contacts the frame 1101.

A batting machine as described above can be useful either as a tool to aid baseball players in fielding practice or as a tool with which to test different bats. For example, a batting machine according to the invention can be controlled to hit balls to a fielder or fielders in a desired manner to enable the fielder or fielders to practice fielding balls hit in a particular manner. The same type of batted ball can be hit repetitively, or batted balls of different types can be hit at random or according to a prescribed pattern. Or, if desired, the batting machine can be controlled to reproduce the batted balls from a particular game. Generally, the batting machine can be controlled to hit fly balls, ground balls, line drives or pop ups having any direction, distance, trajectory and speed. The apparatus according to the invention is particularly advantageous because it can hit balls with greater precision than can be produced by a human batter, thereby providing more effective fielding practice and providing such practice more efficiently. Further, since the apparatus actually hits the ball, the apparatus provides the visual and aural cues that a fielder encounters when fielding a ball in an actual game, thereby providing a practice experience that accurately reproduces game conditions.

Generally, the batting machine 1100 is controlled to produce the desired type of batted ball by appropriate control of the motors 1104a, 1105, 1113 and 1115. This control can be either automatic or manual. Automatic control of a batting machine according to the invention can be effected by, for example, an appropriately programmed digital computer. Below, a method according to the invention, which could be implemented on a digital computer for automatic control of a batting machine according to the invention, is described with respect to FIG. 12. Use of a digital computer to automatically control a batting machine according to the invention increases the ease with which the machine can be controlled by the user to hit balls in a desired manner. In particular, the computer control can be implemented in a manner that minimizes the complexity of the operation of the machine so that technologically unsophisticated users can easily operate the machine.

The rotational speed of the motor 1105 is controlled to control the acceleration with which the bat 1112 is swung. The greater the acceleration of the bat 1112 at the point of contact with the ball 1111, the harder the ball 1111 is hit and, therefore, the farther the ball will travel for a given trajectory and amount of contact between the bat 1112 and ball 1111. Further, if the arm 1107 is a centrifugal arm, e.g., the centrifugal arm 125 (FIGS. 2 and 3A through 3D), the manner in which the arm 1107 is accelerated by the motor 1105 determines the position of the gripper 1108 with respect to the arm 1107 at the point of contact with the ball 1111 and, therefore, the direction in which the ball 1111 is hit. If the arm 1107 is a servo arm, e.g., the servo arm 700 (FIGS. 7A, 7B and 7C), then the arm 1107 will include additional motors that can be used to directly control the position of the gripper 1108 with respect to the arm 1107 to control the direction in which the ball 1111 is hit, i.e., the manner in which the motor 1105 drives the arm 1107 does not control the direction in which the ball 1111 is hit. As indicated above, the direction in a which a ball is hit is controlled primarily by the position of the tee mount 1109 (e.g. positions 1117a through 1117c in FIG. 11A) as controlled by the motor 1115.

The motor 1104a is operated to control the angular position of the shaft 1103a to establish the swing plane of the arm 1107, i.e., the orientation of the carriage 1102 with respect to the frame 1101 and, more particularly, the ground surface. The angle of attack of the bat 1112 as the bat 1112 hits the ball 1111 varies as the swing plane of the arm 1107 varies. Different angles of attack of the bat 1112 cause the ball 1111 to be initially directed with different trajectories, i.e., at different angular orientations with respect to the ground surface. Thus, the motor 1104a is controlled to cause the batting machine 1100 to hit either a fly ball, line drive, ground ball or pop up. It should also be noted that, since the swing plane is offset from the axes of rotation of the shafts 1103a and 1103b, operating the motor 1104a to change the swing plane of the arm 1107 also causes the bat 1112 to strike the ball 1111 at a different location. If the batting machine 1100 and the height of the tee 1110 are configured so that, for a swing plane that is parallel to the ground surface, the bat 1112 contacts the middle of the ball 1111, then rotating the swing plane so that the arm 1107 swings down toward the ground surface causes the bat 1112 to contact a lower part of the ball 1111, while rotating the swing plane so that the arm 1107 swings up away from the ground surface causes the bat 1112 to contact an upper part of the ball 1111. As described below, the position of the tee 1110 can be adjusted to ensure that the bat 1112 contacts the ball 1111 at a desired part of the ball 1111, regardless of the swing plane of the arm 1107.

The motor 1113 is operated to move the tee 1110 with respect to the tee mount 1109, i.e., to control the distance of the ball 1111 from the ground surface. For a particular swing plane of the arm 1107, as the ball mount is moved closer to the ground surface, the bat 1112 hits the ball 1111 at an increasingly higher part of the ball 1111, i.e., a part farther from the ground surface, generally causing the bat 1112 to hit the ball 1111 more toward the ground surface and imparting forward spin to the ball 1111. Conversely, as the ball mount is moved farther from the ground surface, the ball 1112 hits the ball 1111 at an increasingly lower part of the ball 1111, i.e., a part closer to the ground surface, generally causing the bat 1112 to hit the ball 1111 more away from the ground surface and imparting backward spin to the ball 1111. In other words, moving the ball mount closer to the ground surface causes the batting machine 1100 to tend to hit a ground ball, while moving the ball mount farther from the ground surface causes the apparatus to tend to hit a fly ball. As indicated above, since the axes of rotation of the shafts 1103a and 1103b are offset from the swing plane of the arm 1107, each time the carriage 1102 is rotated to a new position, the tee 1110 must be repositioned in order to cause the bat 1112 to hit the same part of the ball 1111 as would have occurred before the change in position of the carriage 1102.

In summary, the motors 1104a, 1105, 1113 and 1115 (and, if a servo arm is used, the motors used to control the servo-driven wrist) are controlled to produce a batted ball of a particular type according to the following principles. Generally, the more that the carriage 1102 is oriented so that the bat 1112 is swung in an upward direction, the greater the likelihood that the ball 1111 will be hit up into the air. As the carriage 1102 is oriented so that the bat 1112 is swung in an increasingly downward direction, the ball 1111 is more likely to be hit on the ground. Further, positioning the tee 1110 so that a relatively low portion of the ball 1111 is struck tends to cause the ball 1111 to be hit into the air. Positioning the tee 1110 so that a relatively high portion of the ball 1111 is struck tends to cause the ball 1111 to be hit toward the ground. The position of the carriage 1102 and the height of the tee 1110 with respect to the ground surface are controlled together to control the trajectory of the batted ball, and to control the amount and type of spin imparted to the ball 1111 when the ball 1111 is hit. Variations in the acceleration of the arm 1107 affect how far the batted ball travels and, when the arm 1107 includes a centrifugally driven wrist, the direction in which the ball 1111 is hit. When the arm 1107 includes a servo-driven wrist, the servomotors controlling the wrist motion can be used to affect the direction in which the ball 1111 is hit. The angular position of the tee mount 1109 is controlled to primarily affect the direction in which the ball 1111 is hit.

For example, orienting the carriage 1102 so that the swing plane is tilted in an upward direction, i.e., the bat 1112 swings in an upward direction, and positioning the tee 1110 so that the bat 1112 contacts the lower part of the ball 1111 will result in popping the ball 1111 up high into the air. Keeping the same orientation of the swing plane, but causing the ball 1111 to be struck at a higher location on the ball 1111 will cause a fly ball to be hit. Hitting the ball 1111 at a still higher location, while maintaining the same orientation of the swing plane, will cause a ground ball with topspin to be hit. Increasing the force with which the bat strikes the ball causes either a very high pop fly, a long fly ball, or a hard ground ball; decreasing the swinging speed of the bat 1112 produces the opposite effects.

Alternatively, orienting the carriage 1102 so that the swing plane is tilted downward and positioning the tee 1110 so that the bat 1112 contacts the lower part of the ball 1111 can result in popping the ball 1111 up into the air, albeit with less force than if the swing plane were oriented in an upward direction. Keeping the same orientation of the swing plane, but causing the ball 1111 to be struck at a higher location on the ball 1111 will cause a ground ball to be hit. Hitting the ball 1111 at a still higher location, while maintaining the same orientation of the swing plane, will cause a ground ball with lots of topspin to be hit. Again, varying the force with which the bat 1112 strikes the ball 1111 causes the distance that the ball is hit to vary.

Though not shown in FIGS. 11A and 11B, an automatic ball feeder could be located proximate to the tee 1110 and used to feed balls on to the tee 1110. A ball feeder is not a necessary part of this or any other embodiment of the invention. However, as will be better appreciated from the description below, the ball feeder can be useful in conjunction with a system for automatically controlling the batting machine 1100 to enable a series of balls to be hit automatically according to a predefined set of instructions. The ball feeder could be automatically controlled, for example, by a digital computer that may also control operation of the batting machine 1100. It is also possible that the ball feeder not be automatic, but rather be controlled manually to feed balls on to the tee 1110. The ball feeder can be constructed in any suitable manner. Generally, the ball feeder will include a storage compartment for storing a large number of balls, a ball pick mechanism that takes a ball out of the storage compartment, and a ball placement mechanism that places a ball on the tee. The ball pick mechanism and ball placement mechanism might be, for example, a single robotic arm that is controlled in an appropriate manner to pick up and place a ball.

FIG. 12 is a flow chart of a method 1200 according to the invention for controlling a batting machine such as the batting machine 1100 (FIGS. 11A and 11B). The method 1200 can be used with either the centrifugal arm 125 (FIGS. 2 and 3A through 3D) or the servo arm 700 (FIGS. 7A, 7B and 7C). As indicated above, the method 1200 can be implemented, for example, on an appropriately programmed digital computer, in a manner known by those skilled in the art of computer programming. Such a computer can be part of a control stand used to operate the apparatus according to the invention, e.g., the control stand 150 (FIG. 1A), as discussed above.

At step 1201, the method 1200 for controlling a batting machine begins. As will be better understood from the description below, the method 1200 makes use of predetermined information that enables the batting machine to use information input by the user of the machine to cause the baseball or softball to be hit in an appropriate manner as desired by the user. In an embodiment of the invention in which the method 1200 is implemented on a digital computer, the information is entered using an input device, such as a touch screen, keyboard or mouse, of the digital computer. Further, a display device, such as a conventional computer display terminal, of the computer can be used to present choices for the user to aid in inputting the necessary information.

Figure 13:
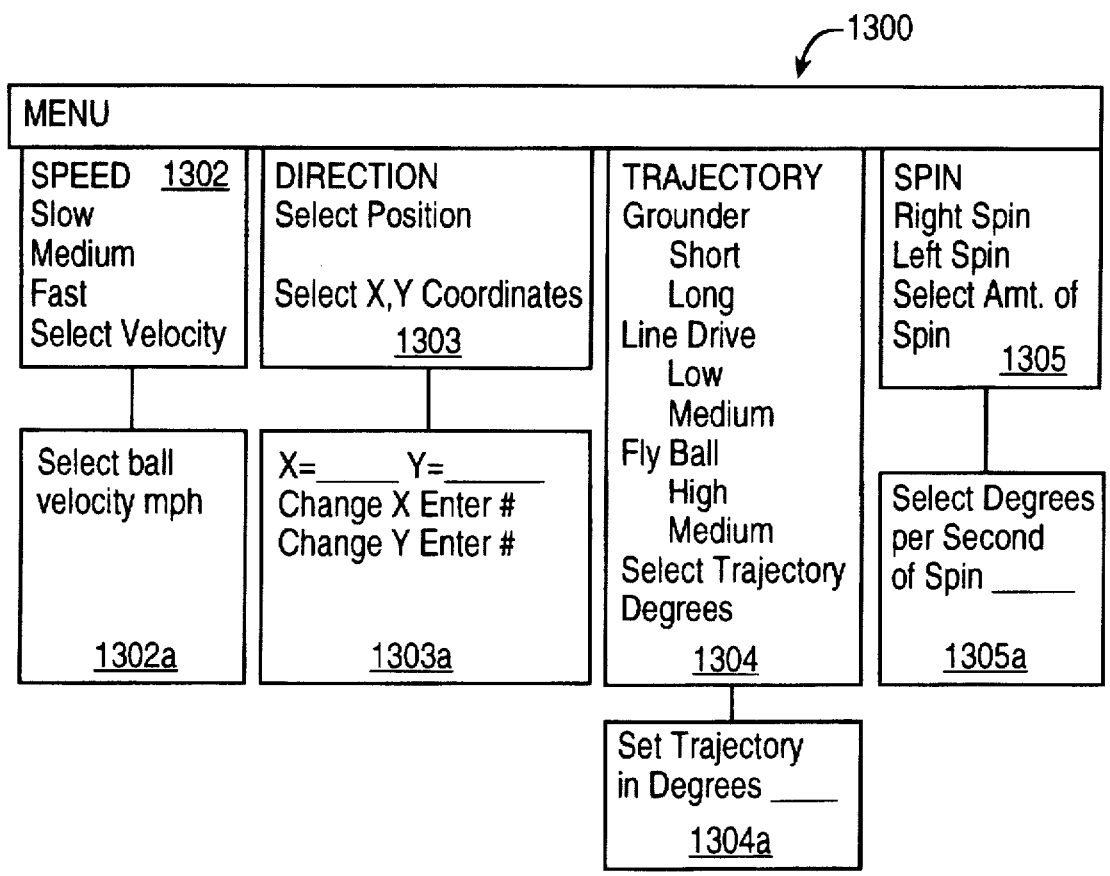
FIG. 13 is a view of a graphical user interface that can be used to control a batting machine.

FIG. 13 is a view of a graphical user interface 1300 that can be used to enable a user to input instructions to a digital computer to effect control of a batting machine. The interface 1300 can be used, for example, with the method 1200 (FIG. 12). The interface 1300 can be implemented with a display device having a touch screen or light-sensitive screen, as known by those skilled in the art of displays, that enables the user to input commands to the computer by activating a particular location on the screen. Alternatively, the interface 1300 can be implemented on a conventional computer display, commands to the computer being input using, for example, a keyboard or mouse to move a cursor within the interface 1300.

The interface 1300 includes a field display 1301 and several pull-down menus 1302, 1303, 1304 and 1305. The speed menu 1302 is used to control the speed with which the ball is hit. The direction menu 1303 is used to control the direction in which the ball is to be hit. The trajectory menu 1304 is used to control the trajectory with which the ball is hit. The spin menu 1305 is used to control the amount of sidespin to be imparted to the ball. The use of the interface 1300 is described in more detail below as such occurs during the method 1200.

Returning to the method 1200 (FIG. 12), in step 1202, the direction in which the ball 1111 is to be hit is entered. This can be done using the direction menu 1303. As shown in FIG. 13, the direction menu 1303 enables direction to be specified in one of two ways. The first way is by selecting a position on the field display 1301, using the "Select Position" choice, so that the ball is hit in a line extending from the home plate representation in the field display 1301 (at which the batting machine is defined to be located) through the selected position. The x-y coordinates of the selected position appear on the interface 1300. The second way is by entering a set of x-y coordinates using the "Select X,Y Coordinates" choice. This can be done by making the appropriate selection from the direction menu 1303, then entering the coordinates in the pull-down menu 1303a that appears when this selection is made. The coordinates are specified with respect to an origin defined to be the location of home plate in the field display 1301. The user can also use the pull-down menu 1303a to change the x-y coordinates of a position after selecting it on the field display 1301. Note that the specification of direction does not mandate that the ball be hit any particular distance.

In step 1203, the speed with which the ball 1111 is to be hit is entered. This can be done using the speed menu 1302. As shown in FIG. 13, the speed menu 1302 enables one of a set of predetermined speeds to be selected, using the "Slow", "Medium" or "Fast" menu choices, or a specific speed to be specified, using the "Select Velocity" choice. If the "Select Velocity" choice is selected, then the pull-down menu 1302a appears, prompting the user to enter the particular speed desired. The speed represents the speed of the ball 1111 immediately after impact with the bat 1112. Illustratively, the "Slow", "Medium" or "Fast" menu choices can correspond to speeds of approximately 30 mph, 50 mph and 70 mph, respectively. The user-specified speed is used to determine—taking into consideration other user-specified parameters, the physical characteristics of the bat used and the dynamics of the batting machine—the manner (in particular, the speed with which the bat is swung) in which the batting machine is operated, so that the appropriate ball speed will be produced.

Alternatively, with appropriate modification of the look-up tables, taking into consideration the physical parameters outlined above, a speed menu for use with the invention could allow the user to specify the bat speed at impact rather than the speed with which the ball is to be hit.

In step 1204, the trajectory with which the ball 1111 is to be hit is entered. Herein, when used to describe a batted ball, "trajectory" refers to the angle that the ball 1111 makes with the ground surface when the ball 1111 first leaves the tee 1110 after being hit by the bat 1112. The trajectory can be entered using the trajectory menu 1304. As shown in FIG. 13, the trajectory menu 1304 enables one of a set of predetermined trajectories to be selected, using the "Grounder" ("Short" or "Long"), "Line Drive" ("Low" or "Medium") or "Fly Ball" ("High" or "Medium") menu choices, or a specific trajectory can be specified using the "Select Trajectory Degrees" choice. If the "Select Trajectory Degrees" choice is selected, then the pull-down menu 1304a appears, prompting the user to enter the trajectory in degrees. As described above, the trajectory is controlled in the batting machine 1100 by operating the motor 1104a to tilt the carriage 1102 in a manner that causes the bat 1112 to hit the ball 1111 with the appropriate trajectory. Illustratively, the "Grounder—Short", "Grounder—Long", "Line Drive—Low", "Line Drive—Medium", "Fly Ball—High" and "Fly Ball—Medium" choices correspond to trajectories of −10 degrees, −4 degrees, 0 degrees, 10 degrees, 50 degrees, and 30 degrees, respectively.

In step 1205, the amount and direction of sidespin with which the ball 1111 is to be hit is entered. This can be entered using the spin menu 1305. Herein, when used to describe a batted ball, "sidespin" refers to the spin of the ball 1111 about an axis that is perpendicular to the ground surface. The amount of sidespin can be specified, for example, as the number of degrees per second. As shown in FIG. 13, the spin menu 1305 enables a predetermined sidespin to be selected, using the "Right Spin" or "Left Spin" choices, or amount of sidespin can be specified using the "Select Amount of Spin" choice. If the "Select Amount of Spin" choice is selected, then the pull-down menu 1305a appears, prompting the user to enter the spin in degrees per second. Right or left spin is specified as either negative or positive spin, depending upon the directional convention selected. The amount of spin can be controlled by appropriate positioning of the tee mount 1109 (controlled by the motor 1115) and orientation of the bat 1112 at impact (controlled as appropriate for the centrifugal arm or servo arm).

In steps 1206, 1207, 1208 and 1209, the distance of the ball 1111 from the ground surface, the angular position of the tee mount 1109, the angle of the swing plane with respect to the ground surface, and the manner in which the arm 1107 is to be swung, respectively, are determined. These quantities can be determined from the specified direction, trajectory, bat speed and sidespin in any suitable manner. For example, determination of these quantities could be made using the laws of physics to develop a set of equations which could be used to make the appropriate calculations. Alternatively, these quantities could be determined using one or more look up tables. The specified direction, trajectory, bat speed and sidespin would be used to access appropriate entries in the look up table or tables, the entry or entries specifying the appropriate information, i.e., the distance of the ball 1111 from the ground surface, the angular position of the tee mount 1109, the angle of the swing plane with respect to the ground surface, and the manner (i.e.,  acceleration profile for both the arm 1107 and the gripper 1108) in which the arm 1107 is to be swung. The entries in the look up table or tables could be determined, for instance, empirically by recording, for each of multiple combinations of direction, trajectory, bat speed and sidespin, the corresponding values of the output quantities that result when the batting machine 1100 is used to swing a particular bat 1112 to hit a particular ball 1111.

Once the above-described determinations are made in steps 1206, 1207, 1208 and 1209, then, in steps 1210, 1211, 1212 and 1213, the motors 1104a, 1105, 1113 and 1115 are operated to produce the characteristics prescribed by the determinations. In step 1210, the ball positioning motor 1113 is operated to position the ball mount so that the ball 1111 is at the proper distance from the ground surface. In step 1211, the tee mount motor 1115 is operated to position the tee mount 1109 in the proper angular position. In step 1212, the carriage positioning motor 1104a is operated to rotate the carriage 1102 so that the swing plane has the proper orientation with respect to the ground surface. Once the motors 1113 and 1104a have properly positioned the tee 1110 and the carriage 1102, then, in step 1213, the arm swinging motor 1105 is operated to swing the arm 1107 so that the ball 1111 is hit by the bat 1112 with the proper amount of force and, if the arm 1107 has a centrifugally driven wrist, to hit the ball 1111 in the proper direction. If the arm 1107 has a servo-driven wrist, then, in step 1213, one or more servo-motors on the arm 1107 are also operated to move the wrist in an appropriate manner to cause the ball 1111 to be hit in the correct direction and, accounting for the acceleration of the arm 1107 by the motor 1105, to hit the ball 1111 with the proper force. As indicated above, the motor 1105 can be a servomotor that can be operated using either open loop or closed loop control. Such control can be effected in a manner similar to that described elsewhere (for instance, with respect to FIG. 9A), as will be appreciated by those skilled in the art.

Once the ball 1111 has been hit, then, in step 1214, the arm 1107 is returned to the initial position, i.e., the position in which the arm 1107 rests while waiting to be swung (shown in FIG. 11A).

In step 1215, a determination is made as to whether another ball is to be hit. This can determination can be made automatically by the computer, according to a pre-specified instruction or instructions, or this determination can be made by a user after each ball is hit, an appropriate command being input to the computer by the user to control further operation of the batting machine according to the method 1200.

Once a determination is made that no more balls are to be hit, then, as shown by step 1216, the method 1200 ends.

It should be noted that, while the method 1200 is particularly useful when implemented on a digital computer to control a batting machine according to the invention, the method could equally well be implemented without the use of the computer, by deciding upon a desired direction, trajectory, bat speed and sidespin, making the appropriate determinations regarding swing plane angle, angular position of the tee mount 1109, height of the tee 1110 and manner of swinging the arm 1107, and operating the motors 1104a, 1105, 1113 and 1115 as required to control the batting machine according to those determinations.

Various embodiments of the invention have been described. The descriptions are intended to be illustrative, not limitative. Thus, it will be apparent to one skilled in the art that certain modifications may be made to the invention as described without departing from the scope of the claims set out below. Further, while certain uses of the invention have been described herein, the invention is not limited to those uses and can generally be used for any appropriate purpose.

For example, the invention has been particularly described herein as used to hit a ball and the invention has particular utility for that purpose. However, it is to be understood that the invention could be used to strike other objects and is broad enough to cover uses other than hitting a ball. More generally, the invention may be used in situations in which no object is struck, but it is desired to simulate a swinging human arm for some purpose.

We claim:

1. An apparatus for swinging an implement to strike an object, comprising:
   a frame;
   an arm for holding the implement, the arm being rotatably attached to the frame such that the arm can be rotated to swing the implement to strike the object; and
   drive means adapted to rotate the arm having means for applying torque to the arm that varies in a predetermined manner that defines torque directly as a function of the angular position of the arm during the swing, the manner in which said torque varies being independent of the type of implement being swung.

2. An apparatus as in claim 1, wherein the predetermined torque curve is established by specifying: i) an angular distance from the beginning of the swing to the point of impact with the object, ii) a minimum torque that is applied to the arm at the beginning of the swing, iii) a maximum torque to be applied during the swing, iv) the angular position at which the maximum torque is to be applied, and v) the shape of the torque curve between the beginning of the swing and the angular position at which the maximum torque is to be applied, and between the angular position at which the maximum torque is to be applied and the end of the swing.

3. An apparatus as in claim 1, wherein the drive means further comprises:
   a servomotor; and
   a servocontroller that controls the amount of torque supplied by the servomotor.

4. An apparatus as in claim 3, wherein the drive means further comprises a digital computer that is programmed to control the servocontroller to cause the torque produced by the servomotor to conform to the predetermined torque curve.

5. An apparatus as in claim 1, wherein:
   the arm further comprises:
      a first section; and
      a second section rotatably attached to the first section so that the second section can rotate with respect to the first section; and
      the second section of the arm rotates with respect to the first section in response to the predetermined torque curve.

6. An apparatus as in claim 1, wherein:
   the implement has a first end that is held by the arm and a second end opposite the first end; and
   the predetermined torque curve is specified so that, when the object is struck, the second end is at an angular position with respect to the axis of rotation of the arm that is ahead, in the direction of rotation of the arm, of the first end.

7. An apparatus as in claim 1, wherein:
   the implement has a first end that is held by the arm and a second end opposite the first end; and
   the predetermined torque curve is specified so that, when the object is struck, the second end is at an angular position with respect to the axis of rotation of the arm that is behind, in the direction of rotation of the arm, the first end.

8. An apparatus as in claim 1, wherein:
   the implement has a first end that is held by the arm and a second end opposite the first end; and
   the predetermined torque curve is specified so that, when the object is struck, the second end is at an angular position with respect to the axis of rotation of the arm that is substantially the same as that of the first end.

9. An apparatus as in claim 1, wherein the arm further comprises a first section and a second section rotatably attached to the first section so that the second section can rotate with respect to the first section and further comprising second drive means adapted to rotate the second section with respect to the first section during rotation of the arm.

10. An apparatus as in claim 9, wherein the second drive means rotates the second section with respect to the first section about a first axis, and the arm further comprises a third drive means for rotating the second section with respect to the first section about a second axis.

11. An apparatus as in claim 10, wherein:
    the second drive means rotates the arm about a third axis;
    the first axis is substantially parallel to the third axis; and
    the second axis is substantially perpendicular to the third axis.

12. The apparatus of claim 1, wherein said means for applying torque comprises an open loop mechanism.

13. An apparatus for swinging an implement to strike an object, comprising:
    a frame;
    an arm for holding the implement, the arm being rotatably attached to the frame such that the arm can be rotated to swing the implement to strike the object, the arm further comprising:
       a first section;
       a second section rotatably attached to the first section so that the second section can rotate with respect to the first section; and
       first drive means adapted to rotate the second section with respect to the first section during rotation of the arm; and
    second drive means adapted to rotate the arm having an open-loop mechanism.

14. An apparatus as in claim 13, wherein the first drive means rotates the second section with respect to the first section about a first axis, and the arm further comprises a third drive means for rotating the second section with respect to the first section about a second axis.

15. An apparatus as in claim 14, wherein:
    the second drive means rotates the arm about a third axis;
    the first axis is substantially parallel to the third axis; and
    the second axis is substantially perpendicular to the third axis.

16. An apparatus as in claim 14, wherein the first drive means is adapted to allow reverse rotation of the second section with respect to the first section in a direction opposite that in which the first drive means rotates the second section with respect to the first section, the reverse rotation occurring in response to contact between the implement and the object, the first drive means being tuned to control the reverse rotation in a predefined manner.

17. An apparatus as in claim 13, wherein the first drive means is adapted to allow reverse rotation of the second section with respect to the first section in a direction opposite that in which the first drive means rotates the second section with respect to the first section, the reverse rotation occurring in response to contact between the implement and the object, the first drive means being tuned to control the reverse rotation in a predefined manner.

18. An apparatus as in claim 13, wherein:

the first drive means further comprises:
a first servomotor; and
a first servocontroller that controls the amount of torque supplied by the first servomotor; and the second drive means further comprises:
a second servomotor; and
a second servocontroller that controls the amount of torque supplied by the second servomotor.

19. An apparatus as in claim 18, wherein:

the arm has a first end that is attached to the frame and a second end opposite the first end that holds the implement; and the first and second servomotors are mounted on the arm proximate to the first end.

20. An apparatus as in claim 19, wherein the first and second servomotors are mounted on opposite sides of the arm.

21. The apparatus of claim 13, wherein said open loop mechanism comprises means for applying torque to the arm that varies in a predetermined manner as a function of the angular position of the arm.

22. An apparatus for swinging an implement to strike an object, comprising:

a frame;

an arm for holding the implement, the arm being rotatably attached to the frame such that the arm can be rotated to swing the implement to strike the object, the arm further comprising:
a first section;
a second section rotatably attached to the first section so that the second section can rotate in a first direction with respect to the first section; and
means for rotating the second section with respect to the first section in a second direction that is opposite to the first direction, the rotation in the second direction occurring in response to contact between the implement and the object, the means for rotating in a second direction being tuned to control the rotation in the second direction in a predefined manner; and drive means adapted to rotate the arm having a open loop mechanism.

23. An apparatus of claim 22, wherein said open loop mechanism comprises means for applying torque to the arm that varies in a predetermined manner as a function of the angular position of the arm.

24. An apparatus for swinging an implement to strike an object, the object being positioned on a surface, comprising:

a frame;

an arm for holding the implement, the arm being rotatably mounted to the frame such that the arm can be rotated in a swing plane to swing the implement to strike the object;

drive means adapted to rotate the arm having an open loop mechanism; and means for changing the orientation of the swing plane.

25. An apparatus as in claim 24, wherein the means for changing the orientation of the swing plane further comprises means for changing the orientation of the swing plane about an axis that is substantially perpendicular to the surface.

26. An apparatus as in claim 25, wherein the means for changing the orientation of the swing plane further comprises means for changing the orientation of the swing plane about a second axis that is substantially parallel to the surface.

27. An apparatus as in claim 24, wherein the means for changing the orientation of the swing plane further comprises means for changing the orientation of the swing plane about an axis that is substantially parallel to the surface.

28. The apparatus of claim 24, wherein said open loop mechanism comprises means for applying torque to the arm that varies in a predetermined manner as a function of the angular position of the arm.

29. An apparatus for swinging a golf club to strike a golf ball, comprising:

a frame;

an arm for holding the golf club, the arm being rotatably mounted to the frame such that the arm can be rotated to swing the golf club to strike the golf ball, the arm being constructed or operated so that the arm remains rigid throughout the swing; and drive means adapted to rotate the arm having an open loop mechanism.

30. An apparatus as in claim 29, wherein the arm includes a single section that remains rigid throughout the swing.

31. An apparatus as in claim 29, wherein the arm further comprises:

a first section; and a second section rotatably attached to the first section so that the second section can rotate with respect to the first section; and means for holding the second section fixed with respect to the first section throughout the swing.

32. The apparatus of claim 29, wherein said open loop mechanism comprises means for applying torque to the arm that varies in a predetermined manner as a function of the angular position of the arm.

33. An apparatus for hitting a ball with an implement, comprising:

a frame positioned on a surface;

an arm rotatably mounted to the frame and including means for gripping the implement, wherein the arm is mounted so that the plane of rotation of the arm is substantially parallel to the surface; and drive means adapted to rotate the arm having an open loop mechanism, such that when the arm is rotated, the implement hits the ball.

34. An apparatus as in claim 34, further comprising means for varying the manner in which the ball is hit.

35. An apparatus as in claim 34, wherein the means for varying the manner in which the ball is hit further comprises means for varying the distance of the ball from the plane of rotation of the arm.

36. An apparatus as in claim 34, wherein the means for varying the manner in which the ball is hit further comprises means for varying the direction, in the plane of rotation, in which the ball is hit.

37. An apparatus as in claim 34, wherein the means for varying the manner in which the ball is hit further comprises means for varying the orientation of the plane of rotation of the arm about an axis that is substantially parallel to the surface.

38. An apparatus as in claim 34, wherein the means for varying the manner in which the ball is hit further comprises means for varying the force with which the ball is hit.

39. An apparatus as in claim 34, wherein the means for varying the manner in which the ball is hit further comprises:
 means for varying the distance of the ball from the plane of rotation of the arm;
 means for varying the direction, in the plane of rotation, in which the ball is hit;
 means for varying the orientation of the plane of rotation of the arm about an axis that is substantially parallel to the surface; and
 means for varying the force with which the ball is hit.

40. An apparatus as in claim 34, further comprising means for controlling the means for varying the manner in which the ball is hit so that the ball is hit in a predetermined manner.

41. An apparatus as in claim 40, wherein the means for controlling operates automatically according to one or more pre-specified instructions.

42. An apparatus as in claim 41, further comprising an automatic ball feeder that, after a ball has been hit, automatically positions another ball so that the ball can be hit by the implement.

43. An apparatus as in claim 33, wherein the implement is a bat.

44. An apparatus as in claim 33, wherein the drive means can be operated to apply torque to the arm during the swing according to a predetermined torque curve.

45. An apparatus as in claim 44, wherein the drive means further comprises:
 a servomotor; and
 a servocontroller that controls the amount of torque supplied by the servomotor.

46. An apparatus as in claim 33, wherein:
 the arm further comprises:
  a first section; and
  a second section rotatably attached to the first section so that the second section can rotate with respect to the first section; and
 the second section of the arm rotates with respect to the first section in response to the rotation of the arm.

47. An apparatus as in claim 33, wherein the arm further comprises a first section and a second section rotatably attached to the first section so that the second section can rotate with respect to the first section and further comprising second drive means adapted to rotate the second section with respect to the first section during rotation of the arm.

48. An apparatus as in claim 47, wherein the second drive means rotates the second section with respect to the first section about a first axis, and the arm further comprises a third drive means for rotating the second section with respect to the first section about a second axis.

49. An apparatus as in claim 48, wherein:
 the second drive means further comprises:
  a first servomotor; and
  a first servocontroller that controls the amount of torque supplied by the first servomotor; and
 the third drive means further comprises:
  a second servomotor; and
  a second servocontroller that controls the amount of torque supplied by the second servomotor.

* * * * *